(12) United States Patent
Ulrich et al.

(10) Patent No.: US 6,369,789 B1
(45) Date of Patent: Apr. 9, 2002

(54) REDUCTION OF IONIC MEMORY EFFECT IN FERROELECTRIC LIQUID CRYSTAL MATERIAL

(75) Inventors: Diana Cynthia Ulrich, Oxford; Paul Bonnett, Littlemore; Michael John Towler, Botley, all of (GB); Masaaki Kabe, Kashiwa (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/310,812

(22) Filed: May 12, 1999

(30) Foreign Application Priority Data

May 16, 1998 (GB) .............................................. 9810469

(51) Int. Cl.$^7$ ................................................. G09G 3/36
(52) U.S. Cl. ........................................... 345/97; 345/96
(58) Field of Search ............................... 345/87, 97, 88, 345/89, 94, 95, 96, 98, 99, 100, 208, 209, 211

(56) References Cited

U.S. PATENT DOCUMENTS

| 5,227,904 A | 7/1993 | Nakanowatari |
| 5,990,856 A | * 11/1999 | Takeda et al. ................. 345/97 |

FOREIGN PATENT DOCUMENTS

| GB | 2262831 | 6/1994 |
| GB | 2313205 | 11/1997 |
| GB | 2328773 | 3/1999 |
| JP | 4215616 | 8/1992 |

OTHER PUBLICATIONS

"Addressing Cycles for Fast Settling Shades in Ferroelectric Liquid Crystal Matrices", Paolo Maltese, et al.; *Ferroelectrics* 1988 vol. 85 pp. 265–274.

"The Joers/Alvey" Ferroelectric Multiplexing Scheme; P. W. H. Surguy, et al.; *Ferroelectrics*, 1991, vol. 122, pp. 63–79.

"Electrooptic Characteristics of a Charge–Transfer Complex–Doped Surface–Stabilized Ferroelectric Liquid Crystal Device " M. Nitta et al. *Japanese Journal of Applied Physics*, vol. 27, No. 4, Apr., 1988, pp. 1477–1478.

"Electroopic Bistability of a Ferroelectric Liquid Crystal Device Prepared Using Charge–Transfer Complex–Doped Polymide–Orientation Films"; K Nakaya et al. *Japanese Journal of Applied Physics*, vol. 28, No. 1, Jan. 1989, pp. 1116–1118.

"Inversion of Contract in Ferroelectric Smectic C Liquid Crystal Displays"; J. R. Hughes, et al.; *Liquid Crystals*, 1988, vol. 3, No. 10, pp. 1401–1410.

"Key Technologies for τ $\nabla$ MIN Ferroelectric Liquid Crystal Displays"; M. J. Bradshaw, et al.; 1997 SID, pp. L–16–L17.

* cited by examiner

Primary Examiner—Xiao Wu
(74) Attorney, Agent, or Firm—Renner, Otto, Boisselle & Sklar

(57) ABSTRACT

Reduction of ionic memory effect in ferroelectric liquid crystal material. A method of reducing the effects of ionic memory in a ferroelectric liquid crystal (FLC) material to which a switching pulse is applied comprises the steps of: a) adding an ionic dopant to the FLC material, the ionic dopant providing ions having a fast response to an applied electric field; and b) following said switching pulse by a first pulse of opposite polarity to said switching pulse, in such a way that said first pulse reduces any ionic reversal field created by said switching pulse, but does not destabilize the state to which the FLC material is switched by said switching pulse.

66 Claims, 38 Drawing Sheets

Relationship between reverse switching threshold and greylevel dependance on previous states Portion of cell measured:

Portion of cell measured

Optical response to 10 frames white; 10 frames grey;
10 frames black; 10 frames grey;

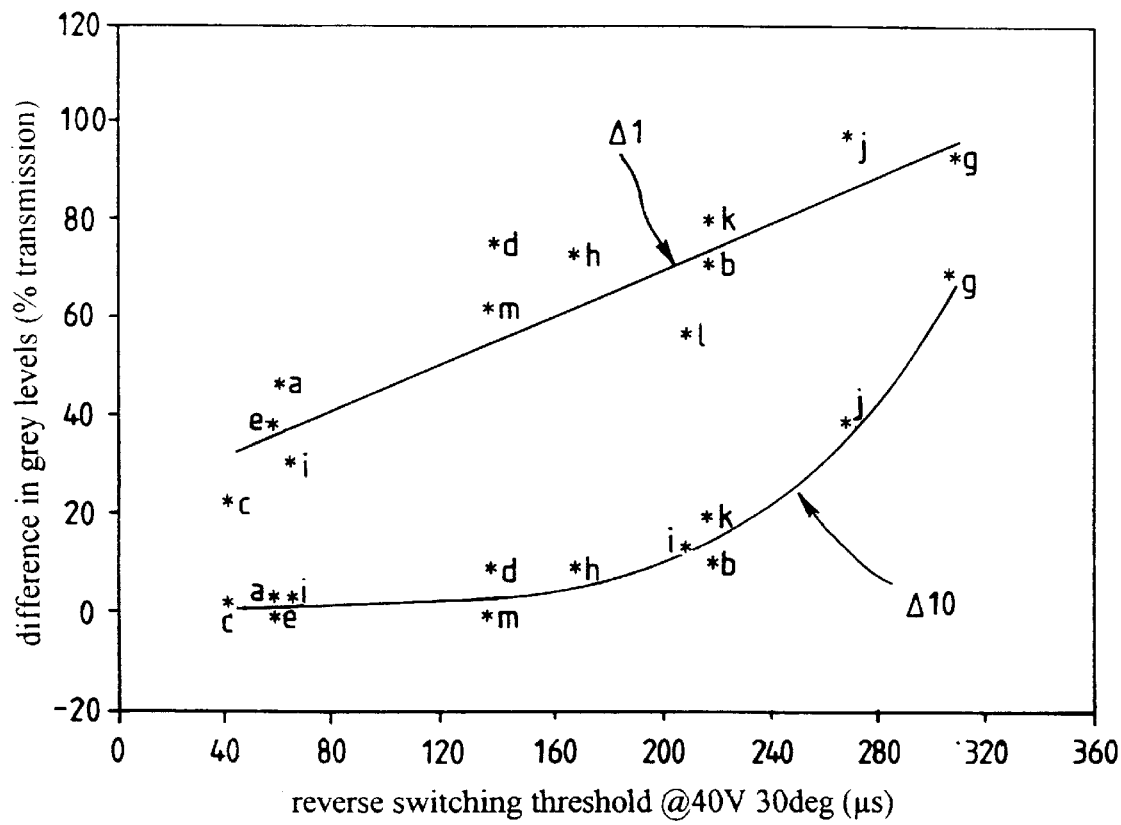

Relationship between reverse switching threshold and grey level dependance on switch history $\Delta 1$ = {(1st grey frame after white ) - (1st grey frame after black)}
$\Delta 10$ = {(10th grey frame after white ) - (10th grey frame after black)}

| | | | |
|---|---|---|---|
| a | Cell 2 Position 1 | h | Cell 5 Position 2 |
| b | Cell 2 Position 2 | i | Cell 5 Position 1 |
| c | Cell 1 Position 1 | j | Cell 6 Position 1 |
| d | Cell 1 Position 2 | k | Cell 6 Position 2 |
| e | Cell 3 Position 1 | l | Cell 7 Position 3 |
| f | Cell 3 Position 4 | m | Cell 7 Position 2 |
| g | Cell 4 Position 2 | | |

FIG.9

—●— 100% switching from switching resultant
··○·· 0% switching from non-switching resultant
—▼— 0% reverse switching from switching resultant

- —●— 100% switching from switching resultant
- ··○·· 0% switching from non-switching resultant
- —▼— 0% reverse switching from switching resultant — ● — 100% switching from switching resultant
··○·· 0% switching from non-switching resultant
— ▼ — 0% reverse switching from switching resultant

- ●— 100% switching from switching resultant
- ··○·· 0% switching from non-switching resultant
- ▼— 0% reverse switching from switching resultant

REDUCTION OF IONIC MEMORY EFFECT IN FERROELECTRIC LIQUID CRYSTAL MATERIAL

FIELD OF THE INVENTION

The invention relates to reducing the effects of ionic memory in ferroelectric liquid crystal (FLC) materials.

BACKGROUND OF THE INVENTION

Liquid crystal devices incorporating a ferroelectric smectic liquid crystal material (FLCDS) are particularly suitable for use in displays and shutters in which their fast switching times and memory characteristics are of advantage. Because of the bistable nature of the material, it is not necessary to continue to apply an electric field to the material in order to maintain the material in a given switched state. A conventional FLCD comprises a layer of ferroelectric smectic liquid crystal material between two parallel glass substrates, electrode structures being typically provided on the inside facing surfaces of the glass substrates in the form of row and column electrodes (on opposite sides of the liquid crystal material) which cross one another to form a matrix array. The intersections of the electrodes define an array of pixels within the material. As is well known, pulses are applied to the row and column electrodes in order to produce electric fields which switch the molecules within the material between two polar states having different molecular orientations. As a result of the different light transmitting properties of the two molecular orientations, when the material is disposed between two polarizers having polarizing axes which are arranged transversely to one another, a display element or pixel at the intersection of two electrodes will appear dark or light depending on the state to which the molecules of the pixel have previously been switched by the electric field due to the voltage difference between the pulses applied to the relevant row electrode on one side of the layer and the relevant column electrode track on the other side of the layer.

Some prior art documents will now be discussed. P Maltese. J. Dijon, T. Leroux, D. Sarrasin, Ferroelectrics (1988), vol. 85, p26s discusses the use of blanking periods containing multiple up and down voltage pulses to provide an improved erasure of previous states. It mentions the problem of using blanking pulses with large V·t products of the same polarity. The opposite polarity pulses substantially cancel out any ionic build-up, however both polarities cause full switching of the FLC and the total blanking period is impracticably long. It does not discuss any modification of either the switching pulse itself or the time periods following it.

British Patent No. 2 262 831 seeks to speed up the addressing time of FLCDS whilst improving their contrast ratio. It describes extending the strobe (row or scan) voltage beyond the select period of the row to which it is applied, so as to temporally overlap with the select period of the strobe voltage applied to subsequent row or rows. Regards these extended strobe waveforms it states that "Each strobe pulse may be immediately followed by a pulse of opposite sign", no reason for this is given, although in Table 15 a result is given that shows for two field operation of Malvern 2.1 a larger operating window is obtained than with Malvern 2.0.

M. Nitta, N. Ozaki, H. Suenaga, K. Nakaya and S. Kobayashi 'Electrooptic Characteristics of a Charge-Transfer Complex-Doped Surface-Stabilized Ferroelectric Liquid Crystal Device' Japanese Journal of Applied Physics (1988) vol. 27, no. 4 pL477–L478 describes an improvement of bistability and response speed obtained by doping an FLC material with a charge-transfer complex. The FLC material showed a minimum in response time for both the doped and undoped cases. In the case of the doped material the device exhibited only reverse switching to a single polarity pulse which was faster than forward switching in the undoped material. There is no discussion on the effect this could have on analogue or digital grayscale.

K. Nakaya, B. Y. Zhang, M. Yoshida, I. Isa, S. Shindoh and S. Kobayashi 'Electrooptic Bistability of a Ferroelectric Liquid Crystal Device Prepared Using Charge-Transfer Complex-Doped Polyimide-Orientation Films' Japanese Journal of Applied Physics (1989) vol. 28, pL116–L118 describes an enhancement of bistability and response speed obtained by doping the polyimide alignment layer in an FLC device with charge transfer complex. The FLC material used is the same as in (iii) and therefore shows a minimum in response time. The improvement is attributed to neutralization of accumulated surface charge from the spontaneous polarization. There is no discussion on the effect this could have on analogue or digital grayscale.

K. Nakaya, B. Y. Zhang, M. Yoshida, I. Isa, S. Shindoh and S. Kobayashi 'Electrooptic Bistability of a Perroelectric Liquid Crystal Device Prepared Using Charge-Transfer Complex-Doped Polyimide-Orientation Films' Japanese Journal of Applied Physics (1989), vol. 28 pL116–L118 describes an enhancement of bistability and response speed obtained by doping the polyimide alignment layer in an FLC device with charge transfer complex. The FLC material used is the same as in (iii) and therefore shows a minimum in response time. The improvement is attributed to neutralization of accumulated surface charge from the spontaneous polarization. There is no discussion on the effect this could have on analogue or digital grayscale.

J. R. Hughes and F. C. Saunders 'Inversion of contrast in ferroelectric smectic C liquid crystal displays' Liquid Crystals (1988), vol. 3 p1401–1410 describes two switching regimes when using two slot bipolar multiplex waveforms. At lower voltages and longer slot times the switching occurs due to the trailing pulse while at higher voltages and shorter slot times the switching occurs due to the leading pulse. The strobe waveform during the line address period is made up of equal and opposite pulses and no pulses are extended beyond this period.

P. W. H. Surguy, et al. Ferroelectrics (1991), vol. 122, p63 describes the JOERS/Alvey addressing scheme for FLC displays with $\tau$-V min characteristics.

Japanese Patent Publication No. 215616/1992 describes a method to prevent reverse switching by applying an opposite polarity voltage pulse after the first applied pulse.

It is well documented that the performance of ferroelectric liquid crystal devices is significantly affected by ionic contamination: Firstly, ionic response to the internal dipole field causes memory of previous states. This is a particular problem when stable analogue gray levels, which utilize the partial switching behavior of the FLCD, are sought. Ionic memory can also cause problems when temporal dither is used to achieve gray levels because the transmission level in each subframe will depend on the previous subframes even if only the two bistable states are addressed.

Secondly, ionic response to an external applied field destabilizes the switched state and can cause reverse switching after field removal (Ionic Field Latching Effect). If this behavior occurs following a strobe pulse then the operating drive window is cut off by the switching resultant failing to switch at longer pulse widths. If this behavior occurs following a blanking pulse then the operating window is reduced because it causes the non-switching resultant to switch at a lower threshold.

The solution to the first of these problems might be to compensate for previous state dependence by appropriate modification of the data. This requires a real-time computation of the data required to achieve a particular gray level as well as a means of storing the switch history of each pixel. If the dependence on previous states accumulates over several frame times this could require multiple frame stores and becomes impractical to both evaluate and implement. Another solution to this problem is to use longer duration and larger amplitude blanking pulses to reset the ionic field to a uniform state (see prior art (i)). Both of these solutions are limited by the response time of the ions to both external fields and the internal field from the spontaneous polarization. In order to make practical either of these solutions or to resolve the problem of ionic memory altogether it is necessary to reduce the ionic response time. A method to do this is to introduce into the FLC layer a concentration of ionic species which have a faster response time than the intrinsic impurities found in these devices.

One limitation of adding ionic species to the FLC device is that the second of the problems described above becomes worse (i.e. there is a direct correlation with the ionic response time and the threshold for reverse switching). Here we show that this problem can be reduced by applying an opposite polarity voltage pulse immediately after the switching pulse hereafter referred to as the TRIFLE (Technique to Reduce the Ionic Field Latching Effect) pulse. This pulse acts to reduce the ionic reversal field built up by the switching pulse but is carefully optimized so that it does not itself destabilize the switched state.

In order to completely erase the ionic field built up by the switching pulse, a TRIFLE pulse would need to have an equivalent V·t product (assuming linearity in the ionic field response). In the simplest model of FLC switching (which considers the ferroelectric torque alone) switching time is inversely proportional to the applied field. Therefore equivalent V·t products would be expected to cause the same amount of switching and the TRIFLE pulse would always destabilize the switched state. There is however a significant elastic torque which acts to oppose the switching due to the TRIFLE pulse if the TRIFLE pulse is applied immediately after the switching pulse.

The nature of the chevron layer structure within FLC cells results in different director profiles for field on and field off states. When a field is applied the majority of liquid crystal directors can reorient to a fully switched position. However due to pinning" of directors at the surfaces and chevron interface this switched state is elastically stressed and relaxation takes place after field removal. Since the starting position of the director profile affects the switching time (i.e. it is much easier to switch from a relaxed state than from a fully switched state (see FIG. 3 and the paper by Hughes and Saunders mentioned above)) the duration of TRIFLE pulse which doesn't switch can be longer if applied immediately after the switching pulse than if applied to an unstressed state.

This technique has been employed in Japanese Patent Publication No 4-215616 mentioned above to overcome reverse switching from the strobe pulse due to the intrinsic ionic impurities. However in this invention we intend to significantly lower the reverse switching threshold by introducing a large concentration of ions into the FLC layer. When this is done the V·t product of the TRIFLE pulse must be similar to the V·t product of the strobe pulse which produced the unwanted ionic field. Due to the significantly larger ionic field from the blanking and strobe pulses we require a torque greater than the elastic torque to prevent switching from the larger TRIFLE pulses. This can be achieved by using materials with large dielectric biaxiality.

The dielectric biaxiality of some FLC materials results in a characteristic minimum in the switching time versus voltage curve (FIG. 3a). At high fields this dielectric torque becomes significant and initially opposes the ferroelectric switching torque. Therefore if the amplitude of the TRIFLE pulse is greater than the switching pulse, it is possible to apply equivalent V·t products whereby the switching pulse is above the switching curve (FIG. 3($a$) circle) and the TRIFLE pulse is below it (FIG. 3($a$) cross). (Note that the ionic reversal field built up by the switching pulse constructively adds to the TRIFLE pulse amplitude thus helping to increase the opposing dielectric torque).

The combined effect of the elastic and dielectric torques provides a window of pulses which can be applied to erase the ionic field built up by the switching pulse or blanking pulse without destabilizing the switched state. This is especially useful when the ionic concentration is doped to be significantly larger than the intrinsic ionic concentration of FLC devices.

SUMMARY OF THE INVENTION

It is proposed to address fast reverse switching FLC devices which exhibit τ-Vmin characteristics by applying a TRIFLE pulse after either the blanking pulse or the switching pulse or both where the magnitude of this TRIFLE pulse is greater in magnitude than 0.5×Vs and preferably $\geq$1×Vs where Vs is the magnitude of the strobe voltage. Fast reverse switching is defined as $\tau_{100\%rev}/\tau_{0\%sw}$ <50 and preferably <30 at some voltage below Vmin where $\tau_{100\%rev}$ is the minimum duration of a monopolar voltage pulse required to achieve 100% reverse switching and $\tau_{0\%sw}$ is the duration of a monopolar voltage pulse at which forward switching begins (i.e. nucleation of domains). In particular these fast reverse switching devices and addressing means are applied to situations where grayscale is obtained by temporal dither and or analogue means in order to reduce the error in the gray levels due to ionic memory.

According to the invention there is provided a method of reducing the effects of ionic memory in a ferroelectric liquid crystal (FLC) material to which a switching pulse is applied, the method comprising the steps of:

a) adding an ionic dopant to the FLC material, the ionic dopant providing ions having a fast response to an applied electric field; and b) following said switching pulse by a first pulse of opposite polarity to said switching pulse, in such a way that said first pulse reduces any ionic reversal field created by said switching pulse, but does not destabilize the state to which the FLC material is switched by said switching pulse.

In one embodiment of the invention said ions introduced by said ionic dopant have a faster response time than ions in the FLC material due to intrinsic impurities therein.

Preferably, said FLC material is a τ-V min material, where the minimum duration of a monopolar voltage pulse which achieves forward switching of said FLC material occurs when the amplitude of said monopolar voltage pulse is Vmin.

Preferably, $\tau_{100\%rev}/\tau_{0\%sw}$ <50 at a voltage below Vmin, where $\tau_{100\%rev}$ is the minimum duration of a monopolar voltage pulse required to achieve 100% reverse switching of said FLC material containing said dopant, and $\tau_{0\%sw}$ is the duration of a monopolar voltage pulse at which forward switching of said FLC material containing said dopant begins.

Most preferably, $\tau_{100\%rev}/\tau_{0\%sw} < 30$ at a voltage below Vmm.

In a further embodiment of the invention, said first pulse immediately follows said switching pulse. In a further embodiment of the invention, the Vt product of said first pulse (being the product of the amplitude and duration thereof is substantially equivalent to the Vt product of said switching pulse.

In a further embodiment of the invention, the amplitude of said first pulse is greater than half the amplitude of said switching pulse. In a further embodiment of the invention, the amplitude of said first pulse is greater than the amplitude of said switching pulse.

In a further embodiment of the invention, the amplitude and duration of said first pulse are such that said first pulse lies below the stressed switching curve (as herein defined) of the FLC material containing said dopant.

Said switching pulse may be a blanking or strobe pulse. Alternatively, said first pulse may follow both blanking and strobe pulses.

The invention also provides a ferroelectric liquid crystal (FLC) cell comprising a layer of FLC material enclosed between two substrates and addressed by at least one switching electrode, for applying a switching pulse, and at least one data electrode, for applying a data pulse, wherein the effects of ionic memory in the FLC material are reduced by carry out the method described above.

The invention also provides a light modulating device comprising a FLC cell as described above, and addressing circuitry for addressing said switching and data electrodes.

The invention also provides a ferroelectric liquid crystal (FLC) device comprising a τ-V min FLC material, at least one switching electrode, for applying a switching pulse, and at least one data electrode, for applying a data pulse, wherein:

a) said FLC material is such that at voltages below Vmin, $\tau_{100\%rev}/\tau_{0\%sw} < 50$, where $\tau_{100\%rev}$ is the minimum duration of a monopolar voltage pulse required to achieve 100% reverse switching of said FLC material, and $\tau_{0\%sw}$ is the duration of a monopolar voltage pulse at which forward switching of said FLC material begins; and b) said switching pulse is followed by a first pulse of opposite polarity to said switching pulse.

At voltages below Vmin, $\tau_{100\%rev}/\tau_{0\%sw}$ may be less than 30.

The invention also provides a light modulating device comprising a FLC device as described above, wherein said FLC material is in the form of a layer, said switching electrode is one of a plurality of such switching electrodes on one side of said layer, said data electrode is one of a plurality of such data electrodes on the other side of said layer, and a plurality of pixels are defined in said layer at the intersections of said switching and data electrodes.

BRIEF DESCRIPTION OF THE DRAWINGS

The invention will now be more particularly described, by way of example only, with reference to the following drawings, in which:

FIG. 9 shows results for different positions (having different doping levels) of seven different FLC cells when the waveforms of FIG. 8 are applied as in FIGS. 7(e) and 7(f);

Figure 14A:
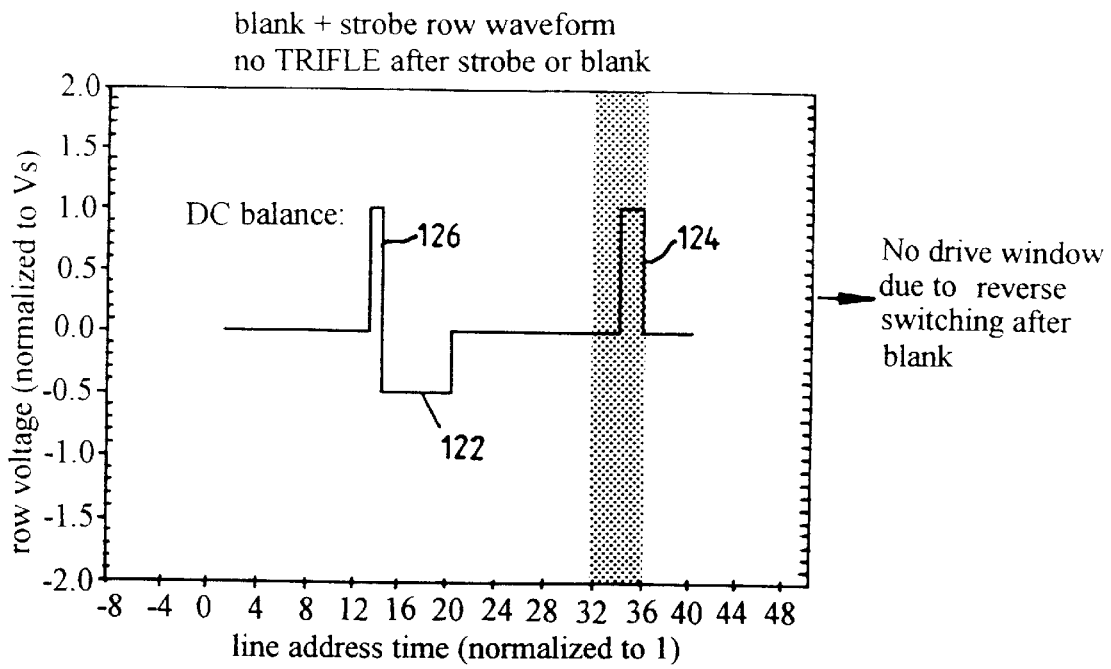
FIGS. 14(a), (b) and (c) show three row waveforms using a blanking pulse before the strobe pulse, all of which fail to produce a drive window for a cell with a fast ion dopant as a result of reverse switching.
Figure 14B:
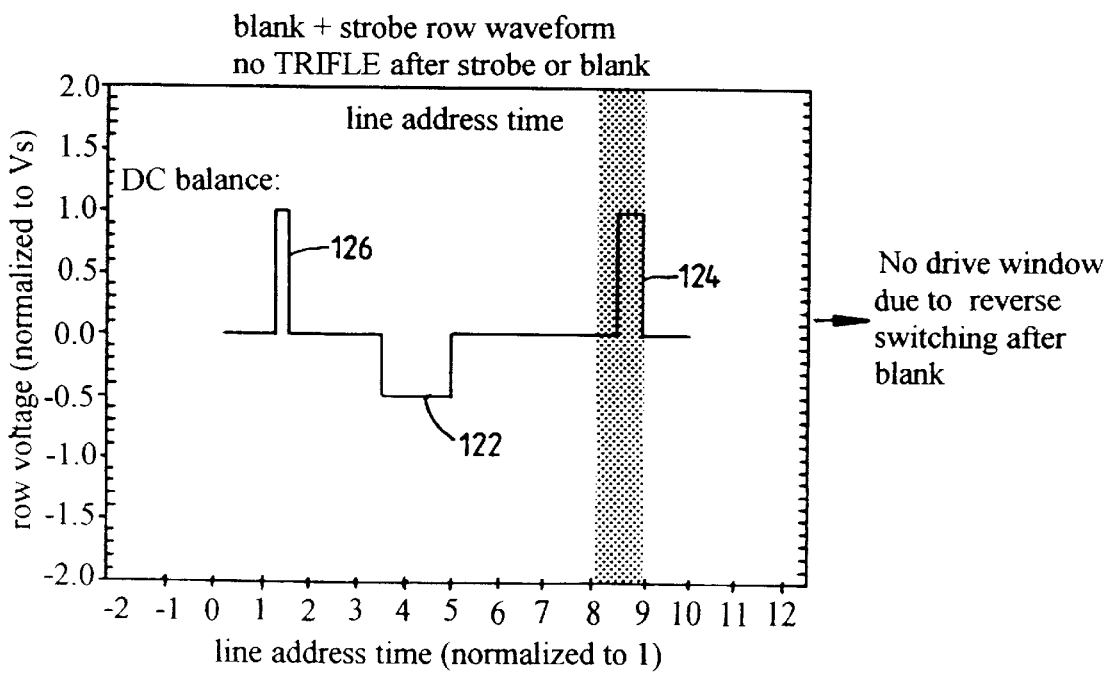
Figure 15A:
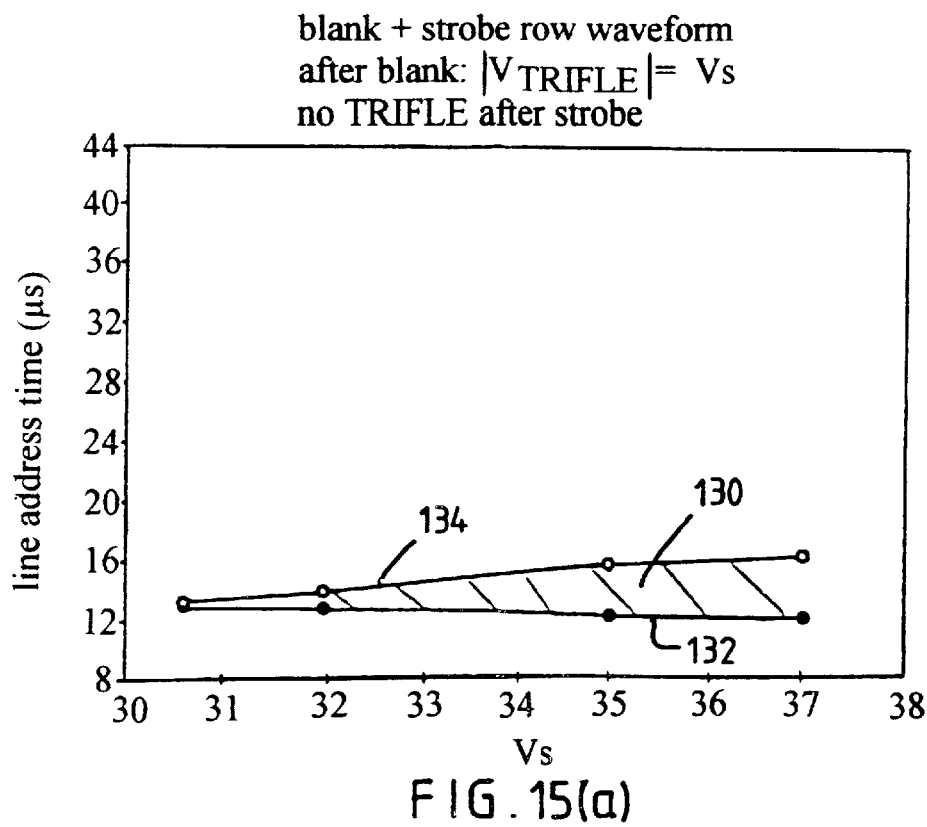
FIGS. 15(a), (b) and (c) show, the drive windows created by the row waveforms (shown in FIGS. 15(d), (e) and (f))
Figure 15B:
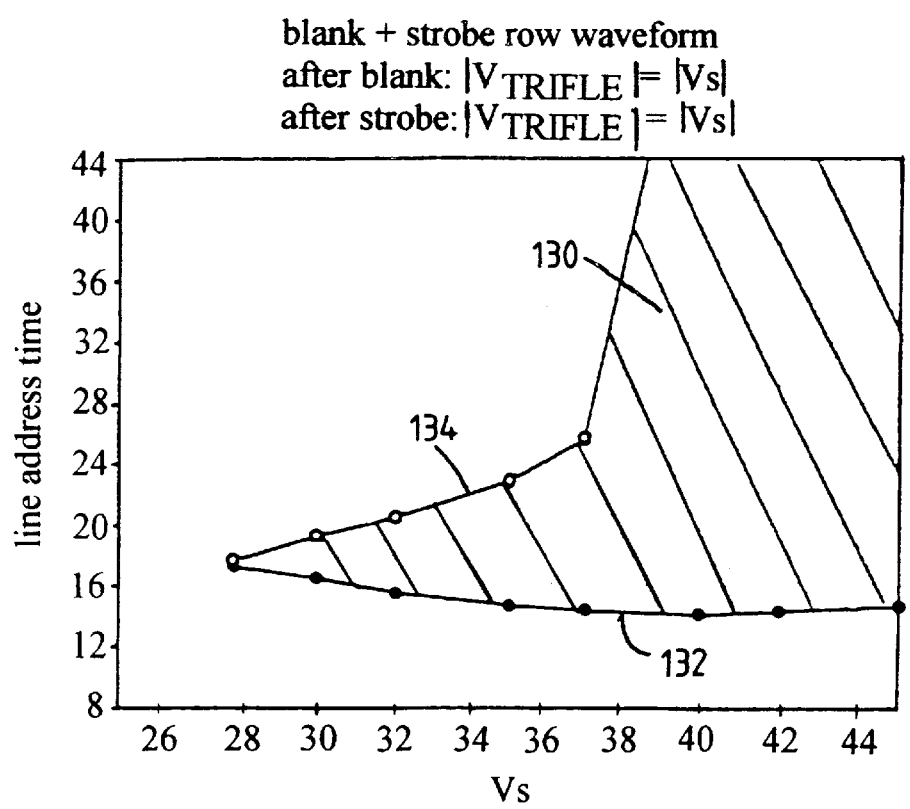
FIGS. 15(d), (e) and (f) show the row waveforms, these waveforms being based on those shown in FIGS. 14(a) to (c)
Figure 15C:
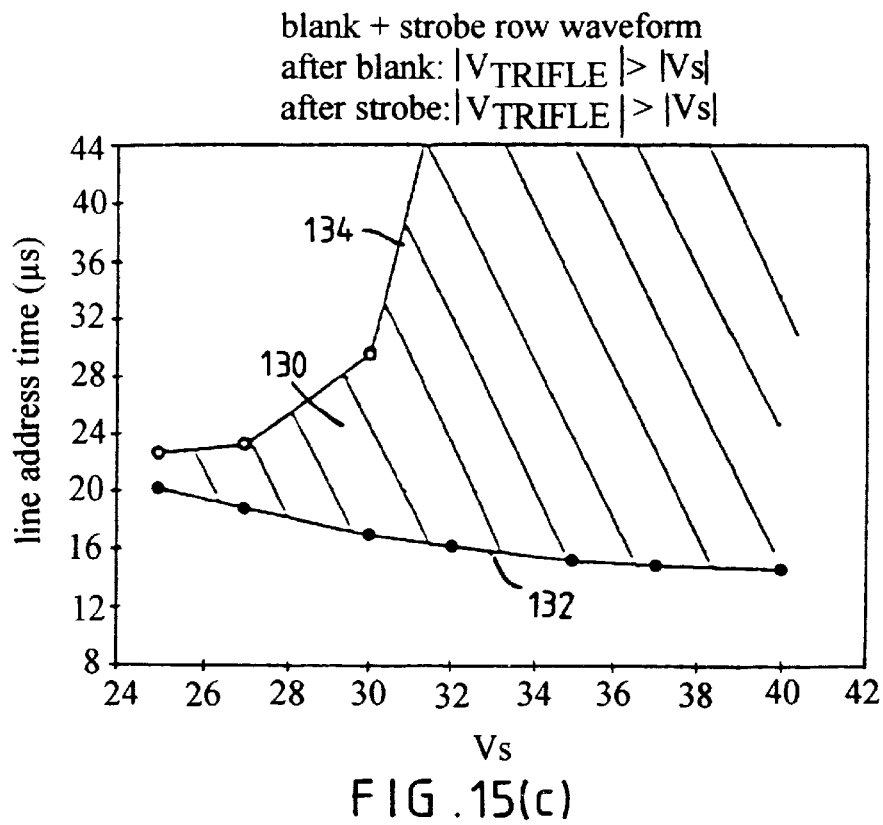
Figure 15D:
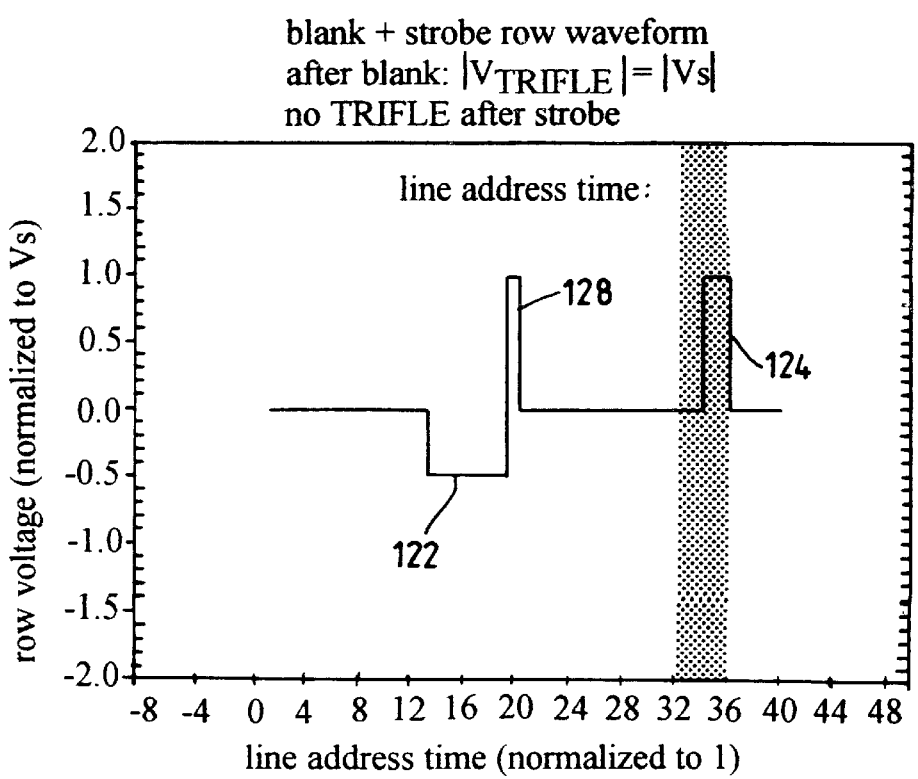
Figure 15E:
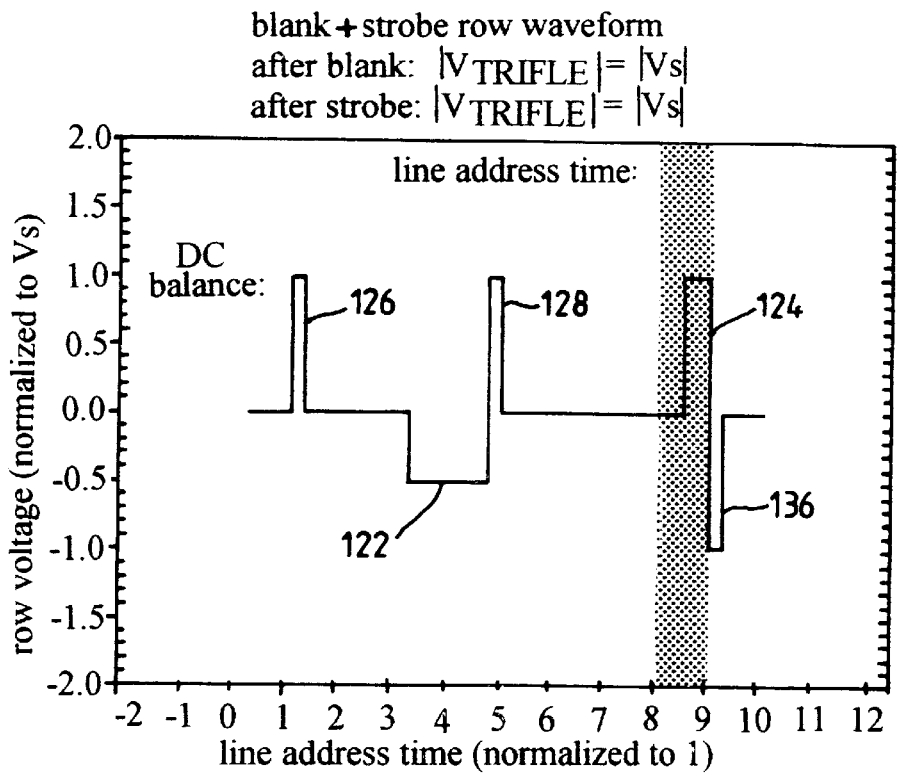
Figure 16A:
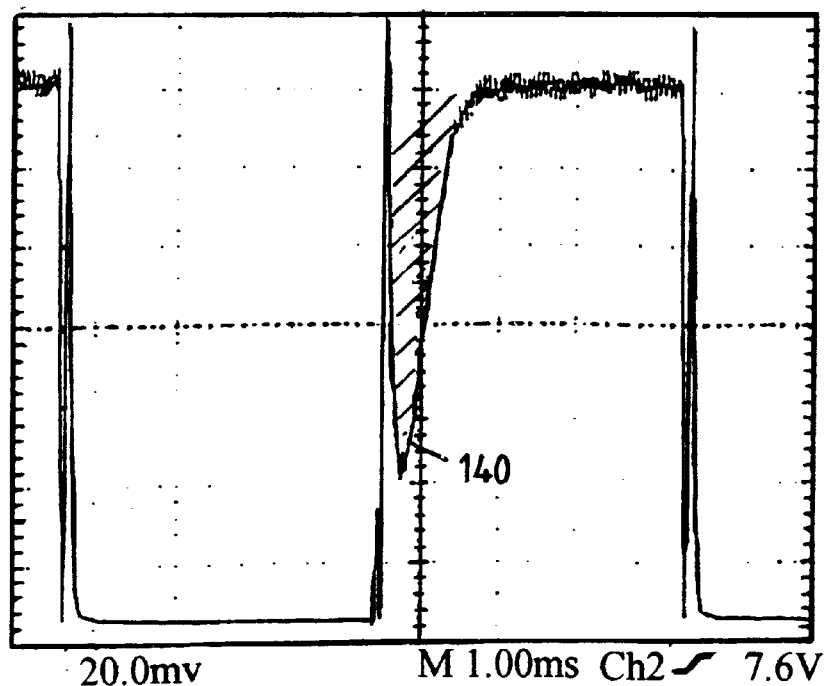
Figure 16B:
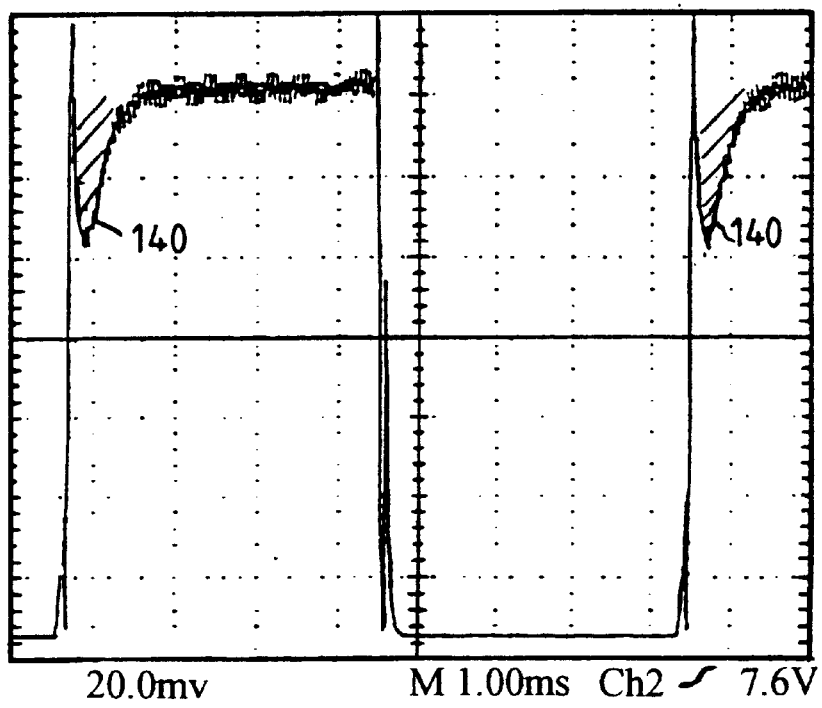
Figure 16C:
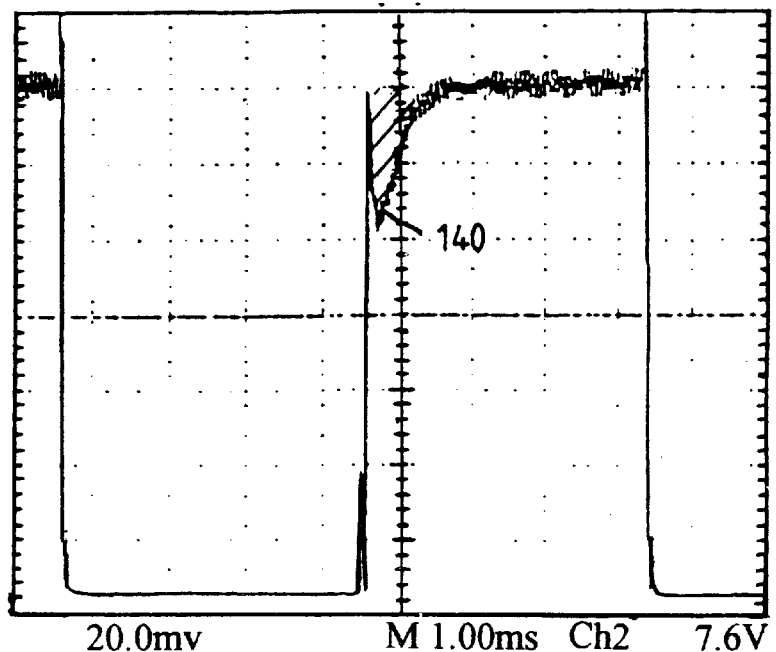
Figure 16D:
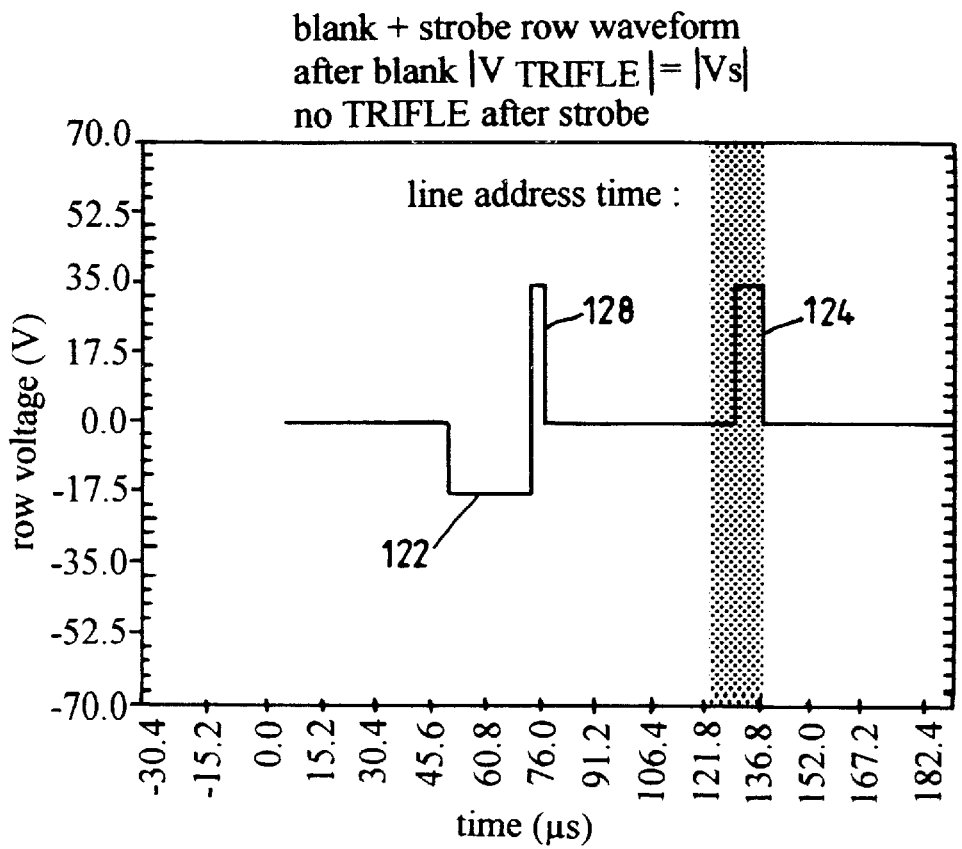
Figure 16E:
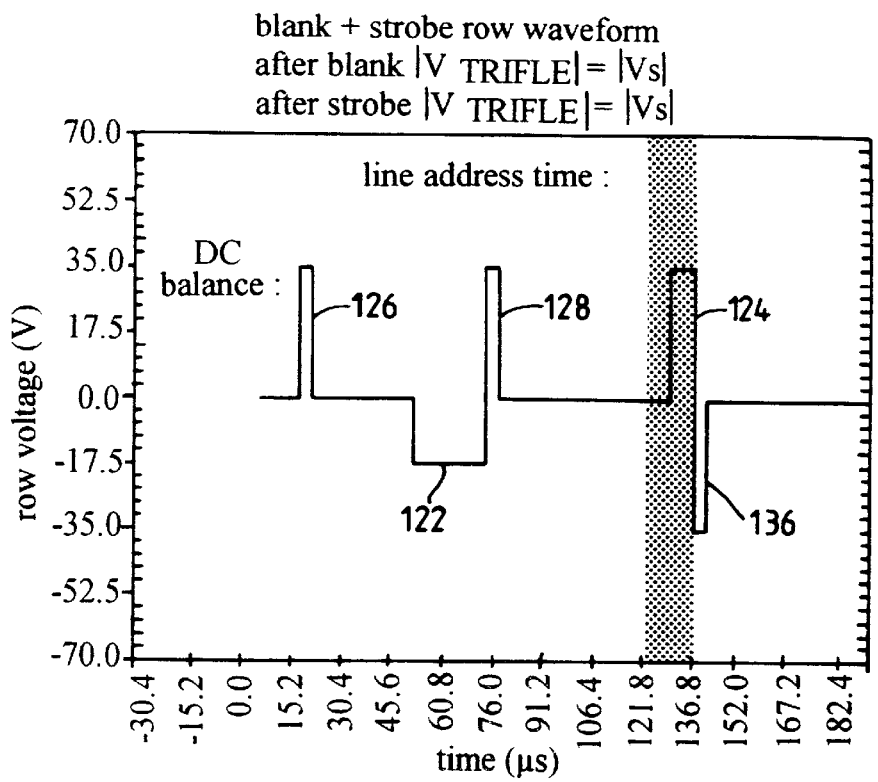
Figure 16F:
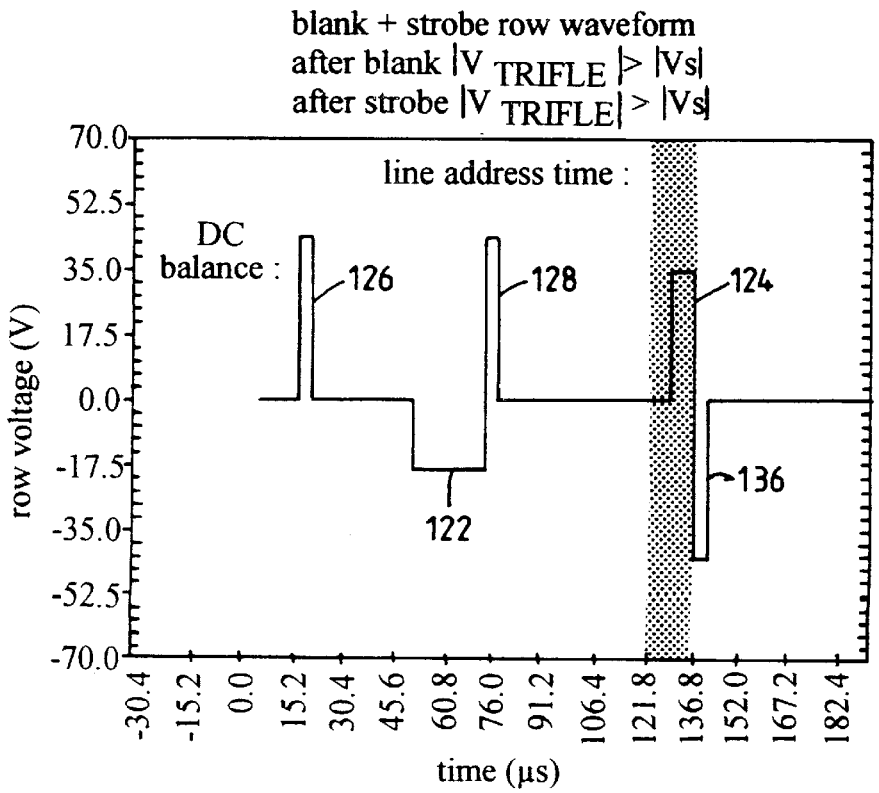
Figure 17A:
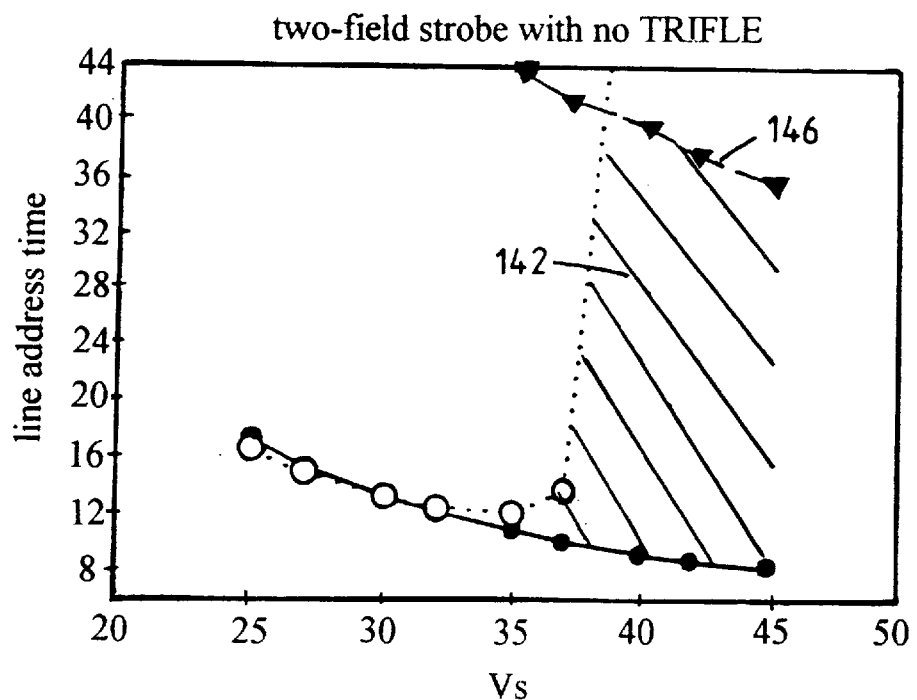
Figure 17B:
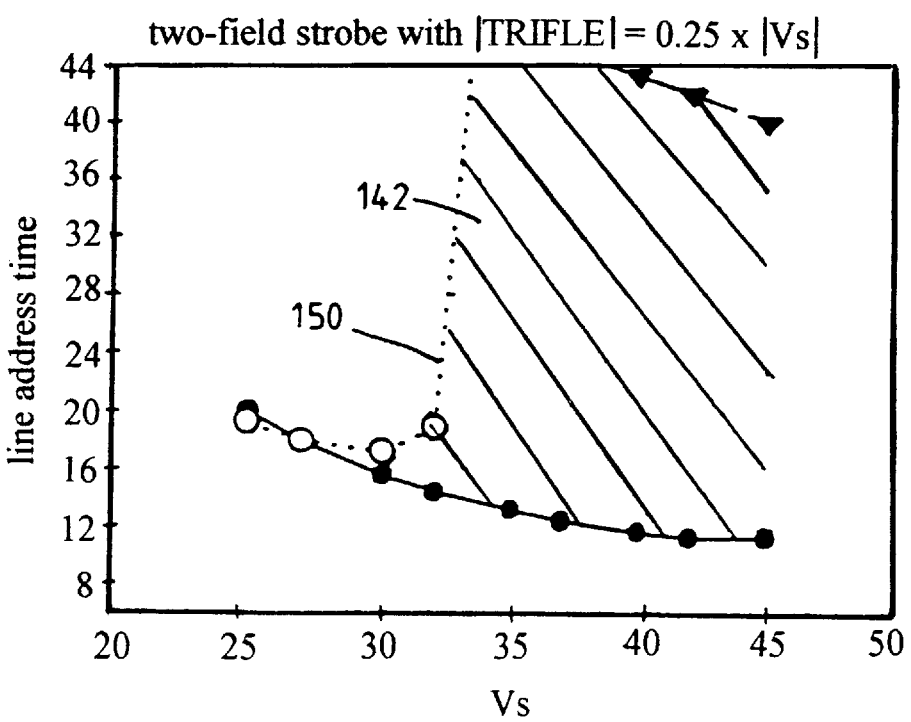
Figure 17C:
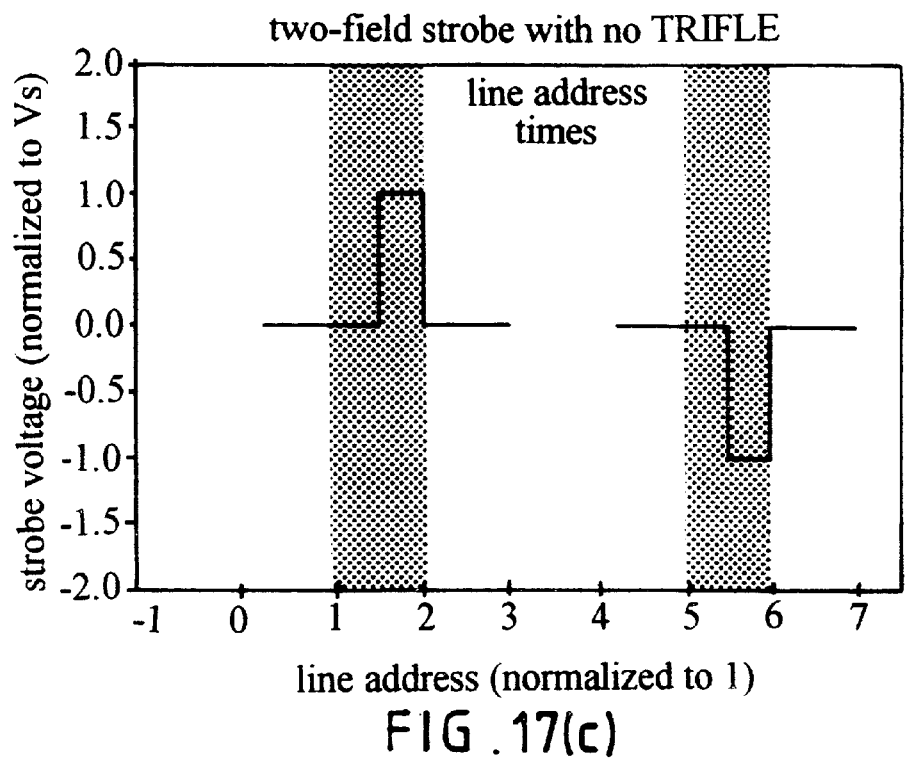
Figure 17D:
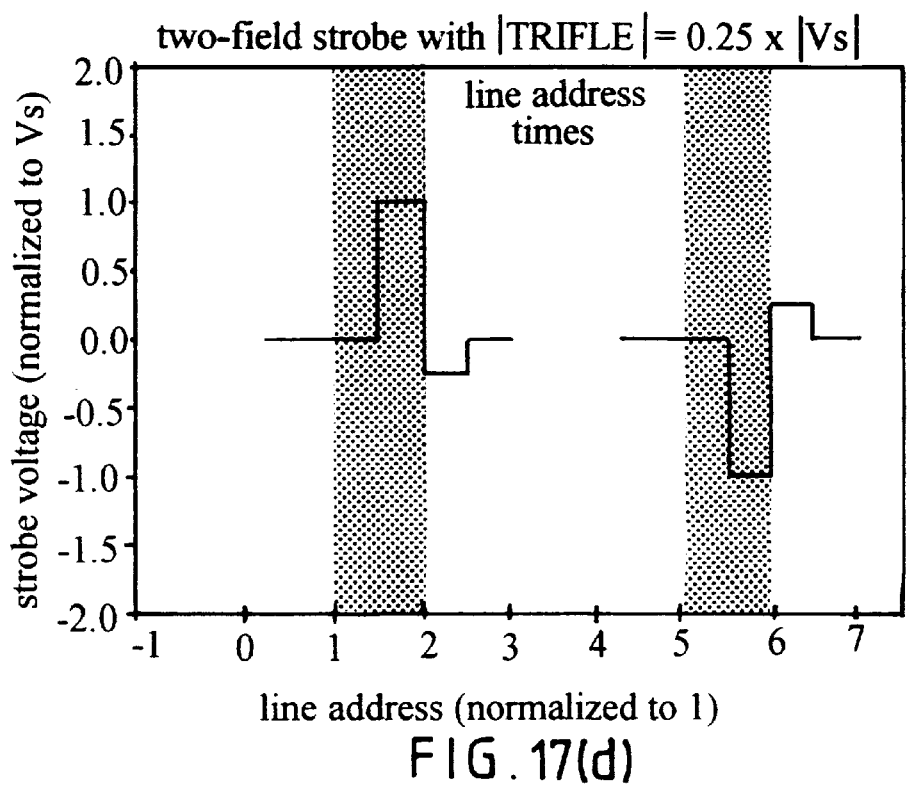
Figure 18A:
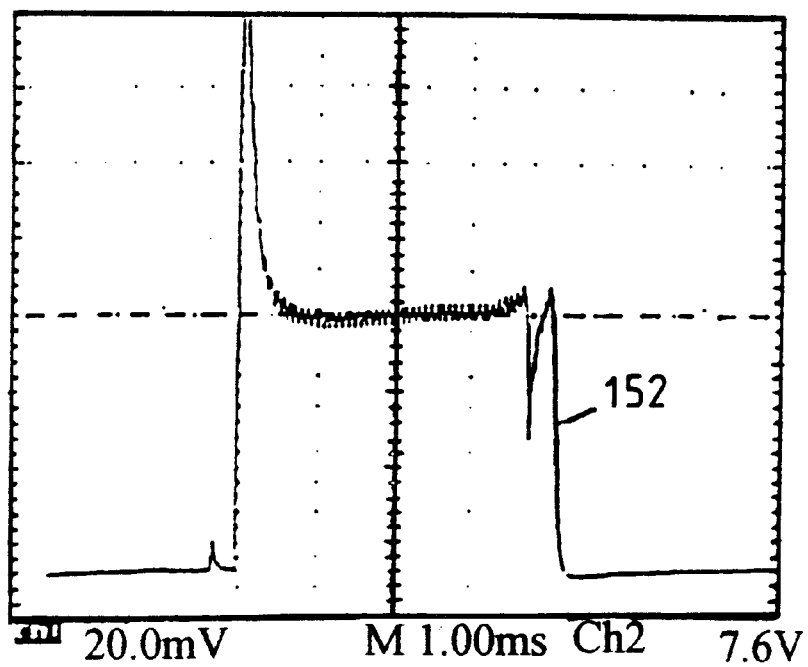
Figure 18B:
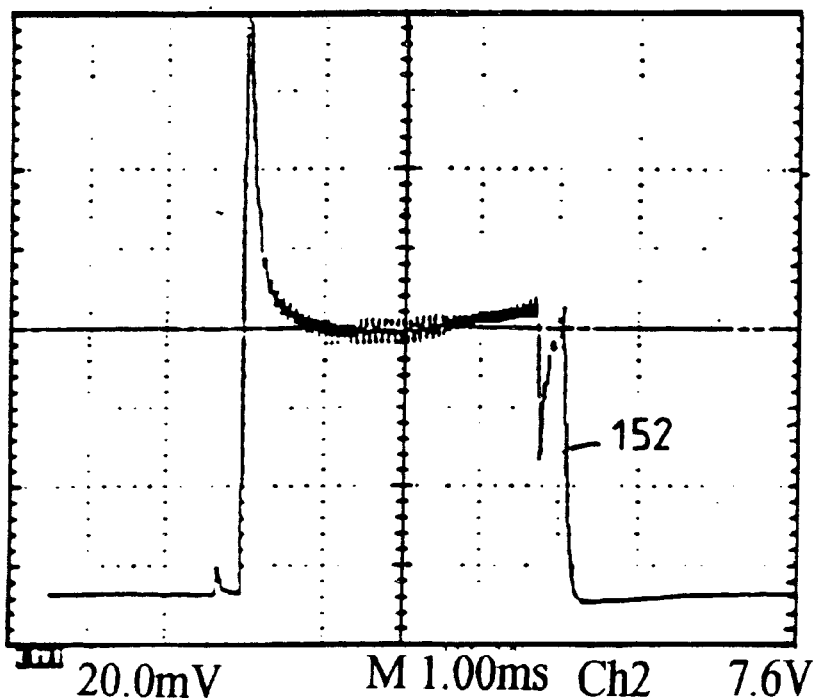
Figure 18C:
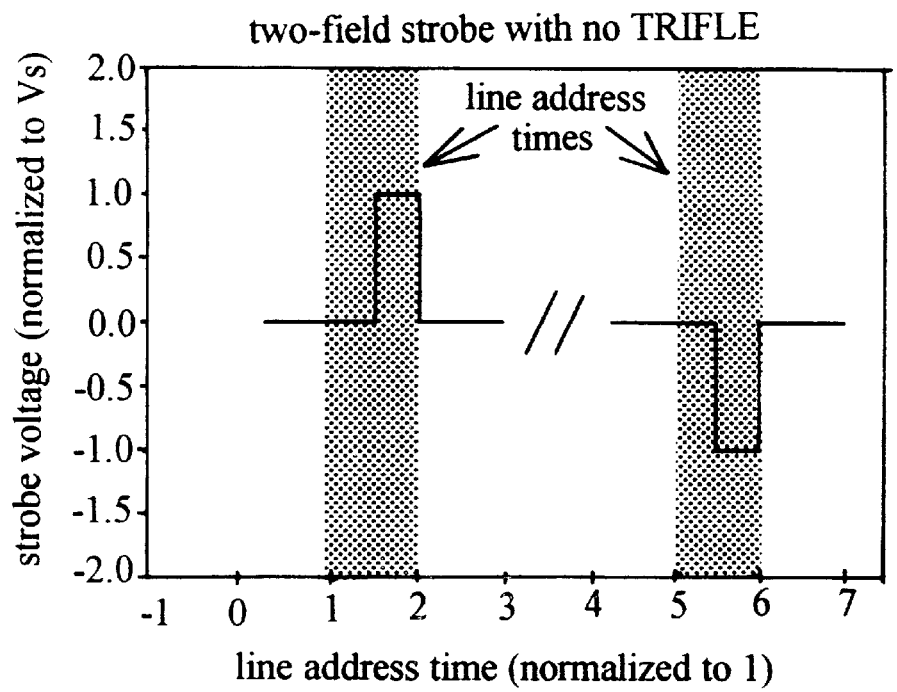
Figure 18D:
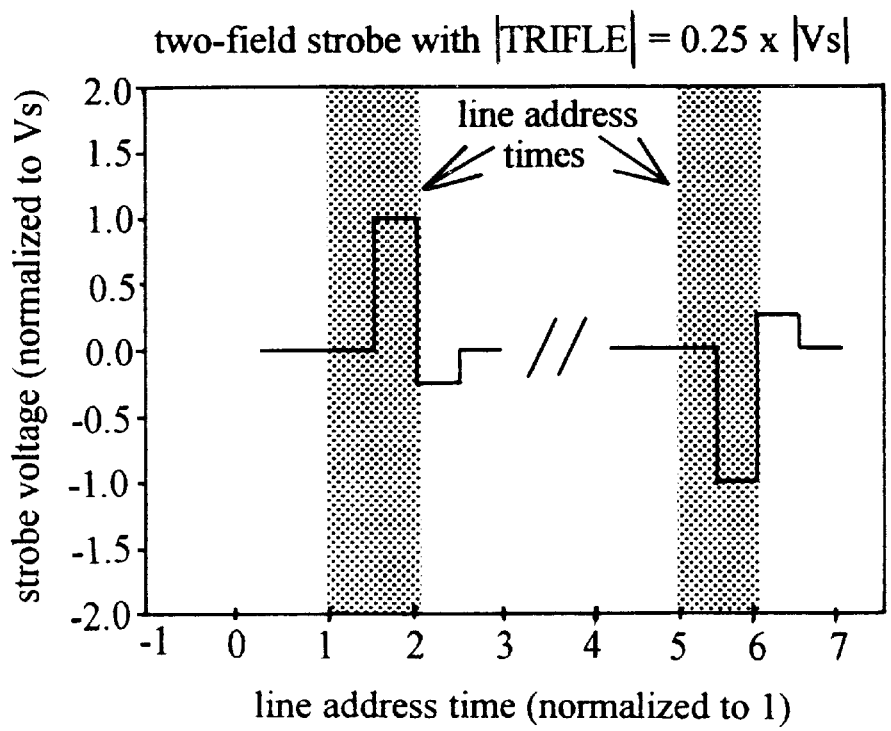
Figure 19A:
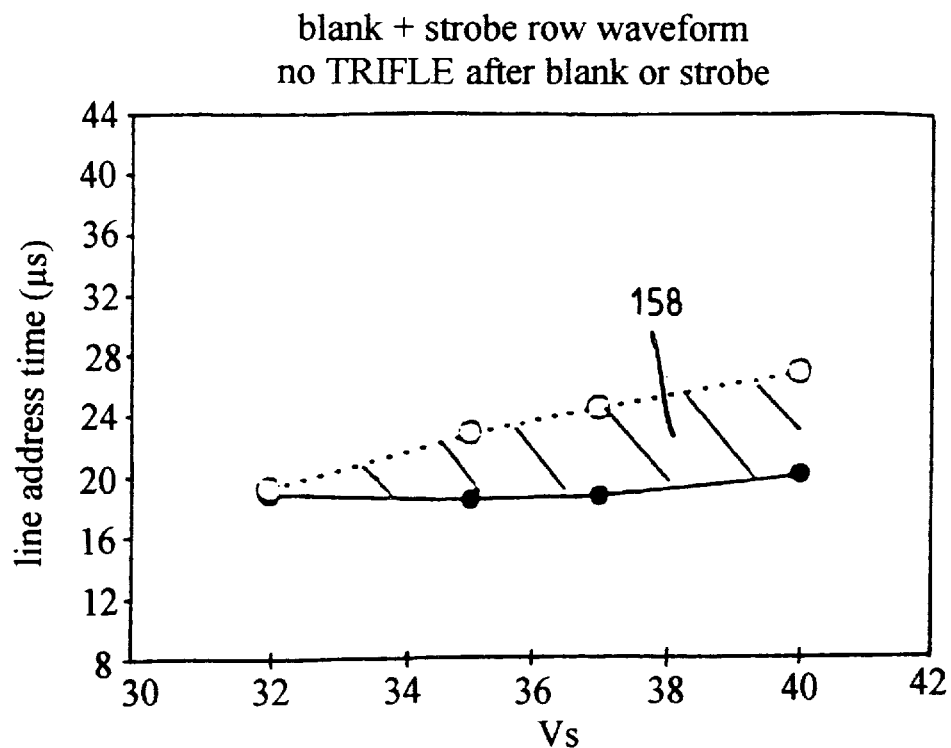
Figure 19B:
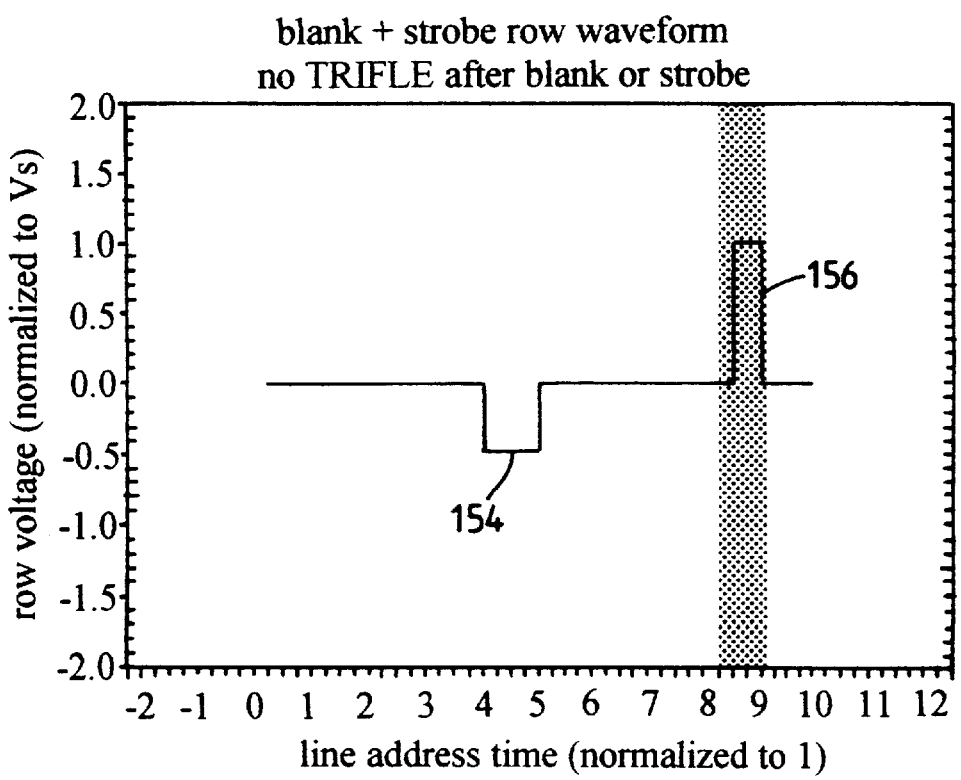
Figure 20A:
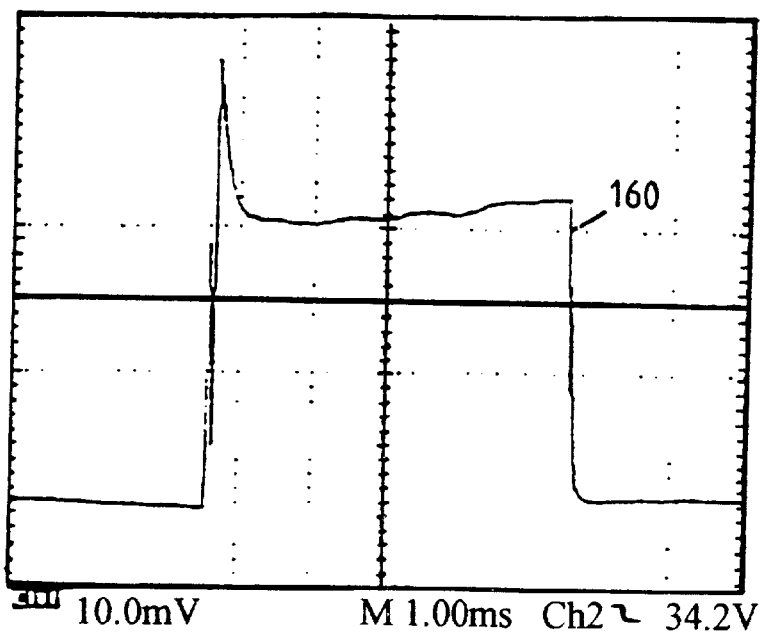
Figure 20B:
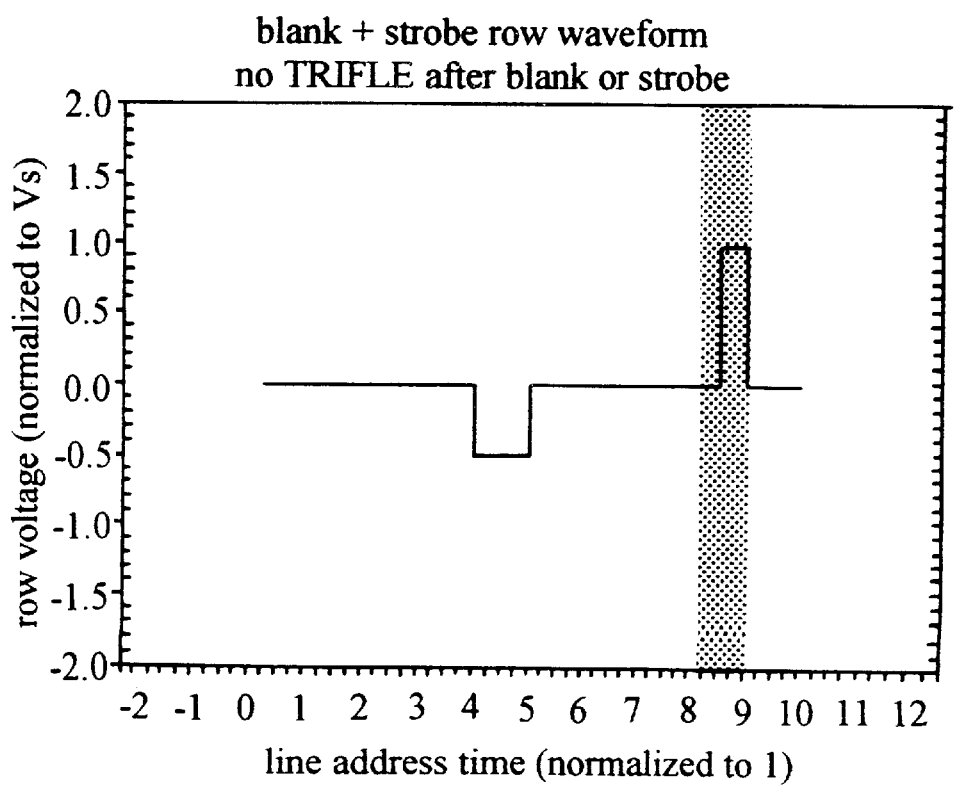
Figure 21A:
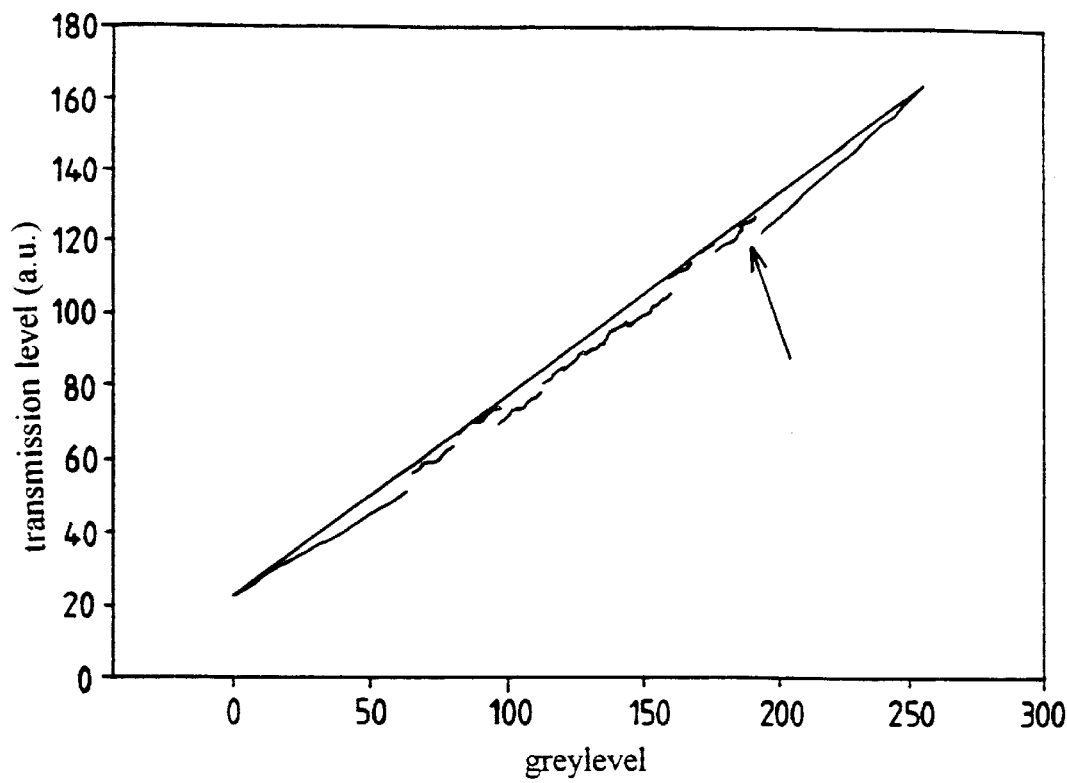
Figure 21B:
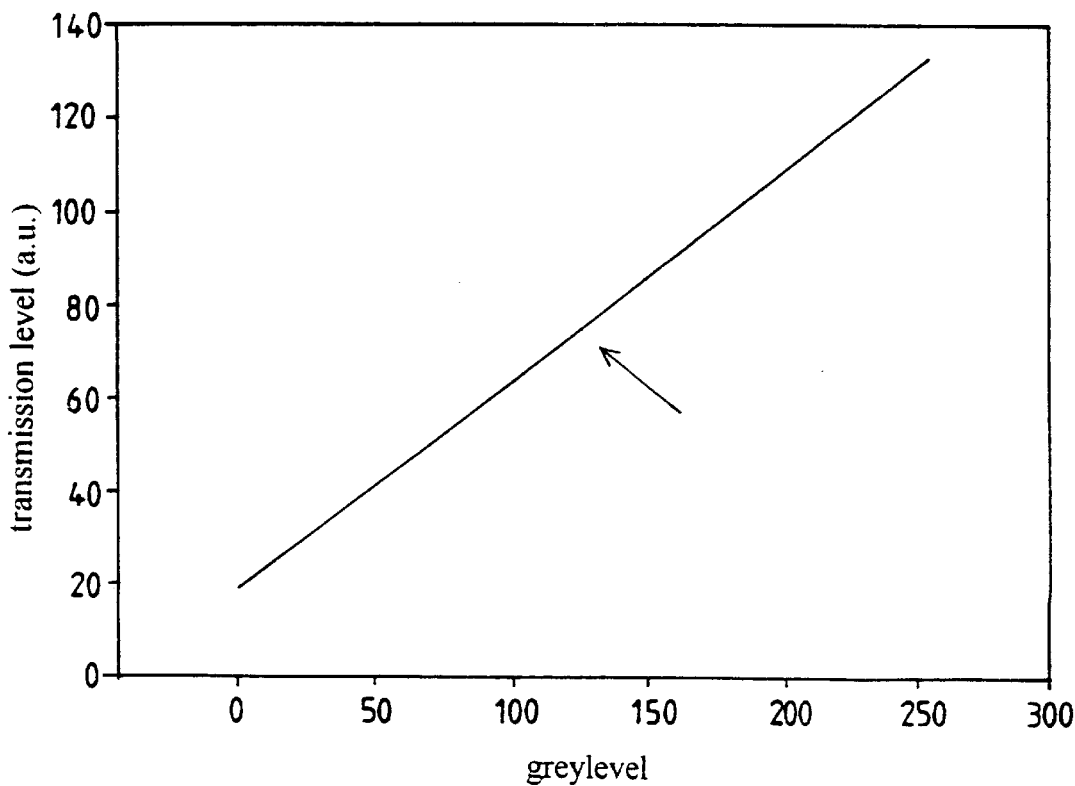
Figure 21C:
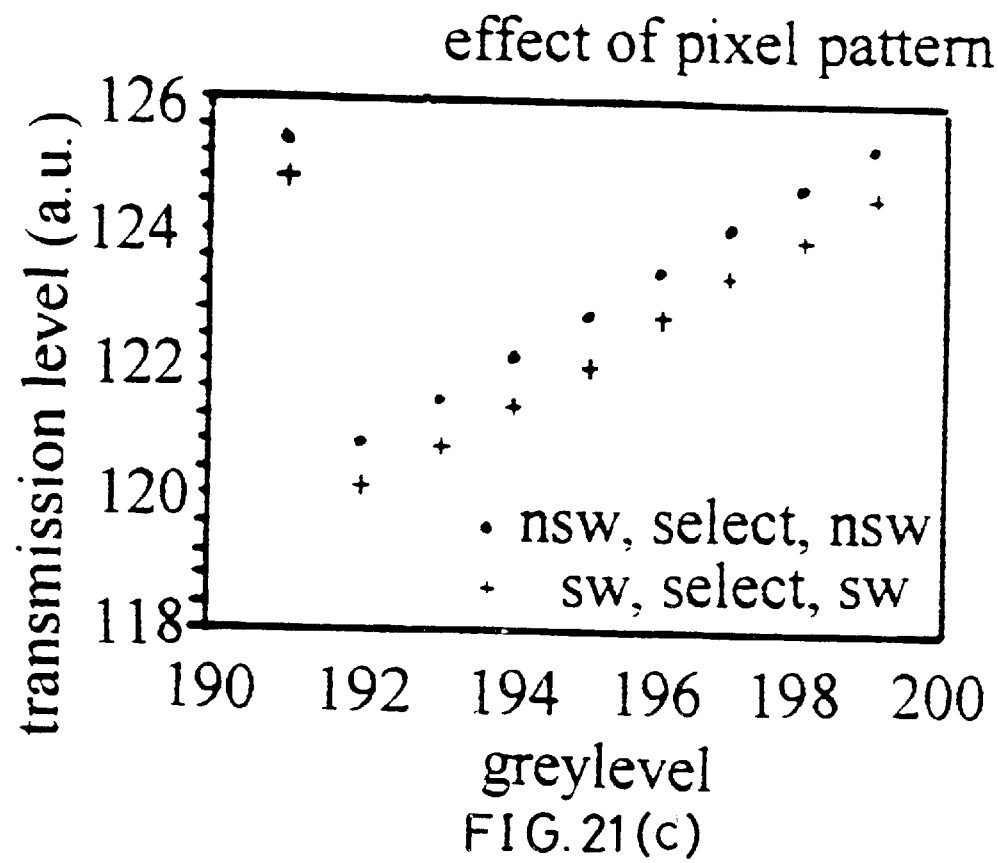
Figure 21D:
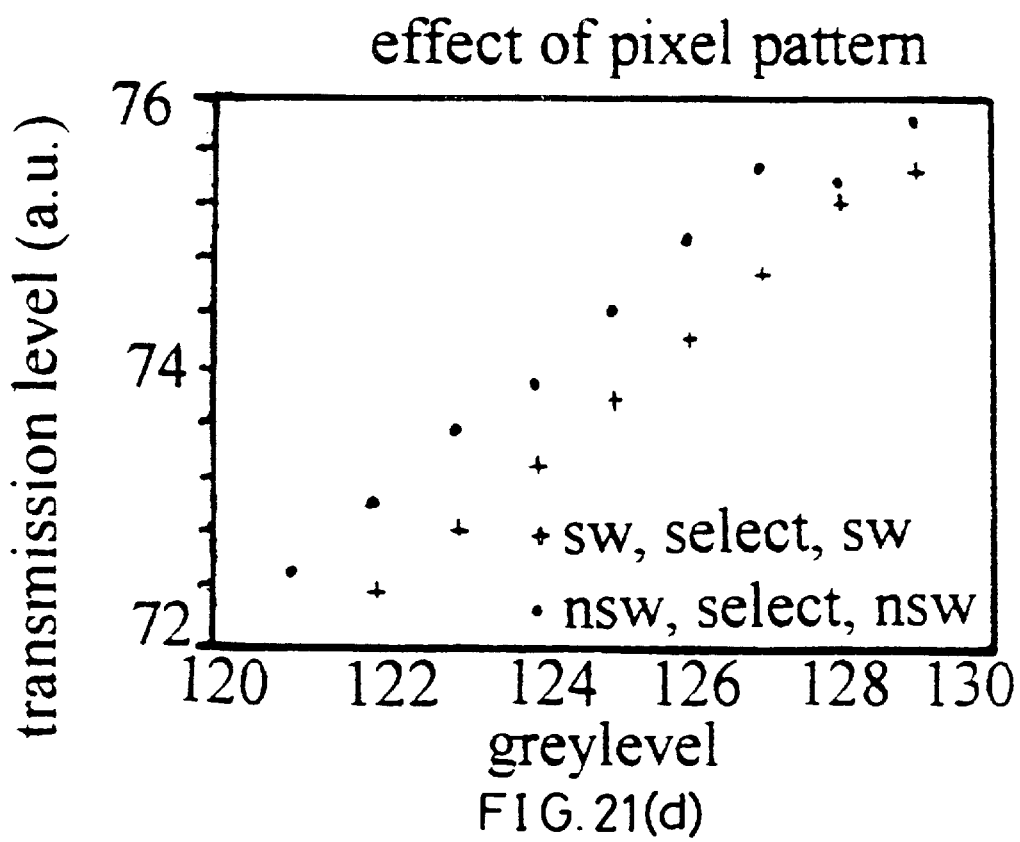

but also having "TRIFLE" pulses added after the blanking and strobe pulses;

FIGS. 16(a), (b) and (c) show the optical response for the row waveforms of FIGS. 15(d), (e) and (f) respectively;

FIGS. 16(d), (e) and (f) show row waveforms, these row waveforms being those shown in FIGS. 15(d), (e) and (f) respectively;

FIGS. 17(a) and (b) relate to Cell 10, which has no ionic dopant added, and show the drive windows produced by the two field row waveforms shown in FIGS. 17(c) and (d);

FIGS. 17(c) and (d) show the two field row waveforms;

FIGS. 18(a) and (b) show, the optical responses for Cell 10 for the row waveforms (shown in FIGS. 18(c) and (d), and also shown in FIGS. 17(c) and (d) respectively);

FIG. 19(a) shows that a typical blanking row waveform does produce a drive window for a cell with no ionic dopant, unlike in the case of FIGS. 14(a), (b) and (c), and FIG. 19(b) shows the row waveform;

FIG. 20(a) shows the optical response corresponding to FIG. 19(a), and FIG. 20(b) shows the row waveform of FIG. 19(b);

FIG. 21(a) shows the transmission levels of 256 gray levels for Cell 10, which is a cell with slow reverse switching (ie no ionic dopant added), when the Cell is addressed using 4 bit temporal dither (TD) in the ratios 1:4:16:64 and 2 bit spatial dither (SD) in the ratio 1:2; FIG. 21(b) shows the transmission levels of 256 gray levels for Cell 9, which is a cell with fast reverse switching (ie ionic dopant added), when the cell is addressed in the same way as FIG. 21(a);

FIGS. 21(c) and 21(d) are enlarged views that respectively show portions indicated by arrows in FIGS. 21(a) and 21(b).

Figure 22A:
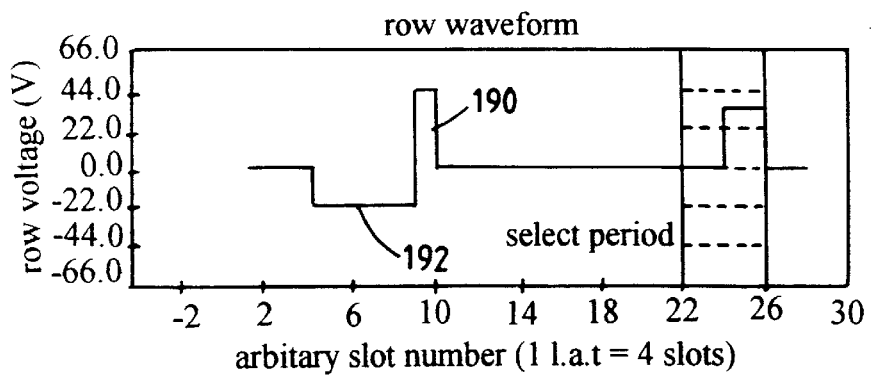
Figure 22B:
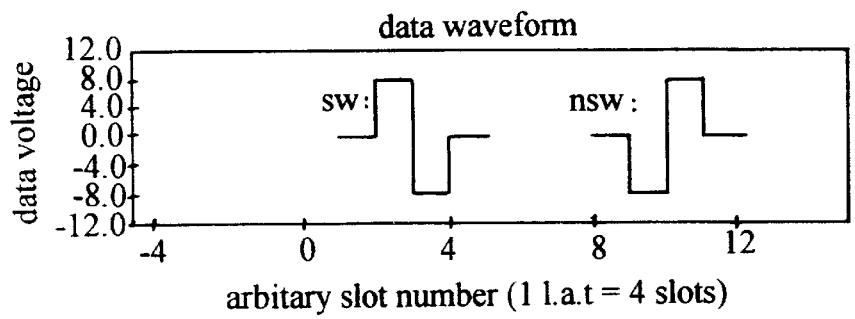
Figure 22C:
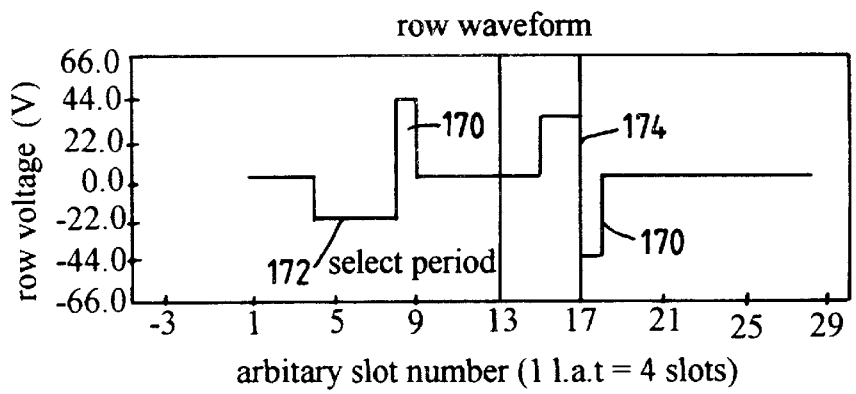
Figure 22D:
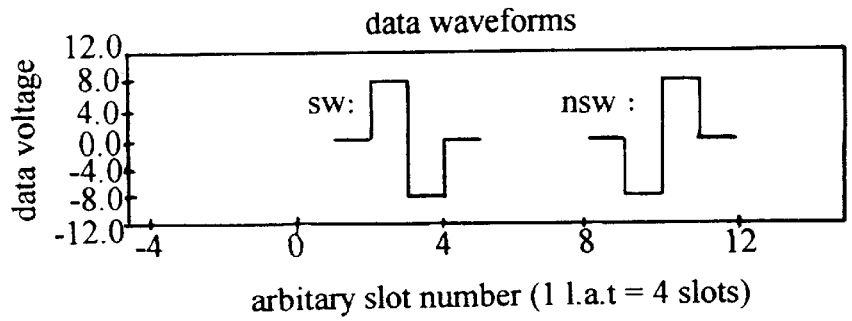
Figure 23A:
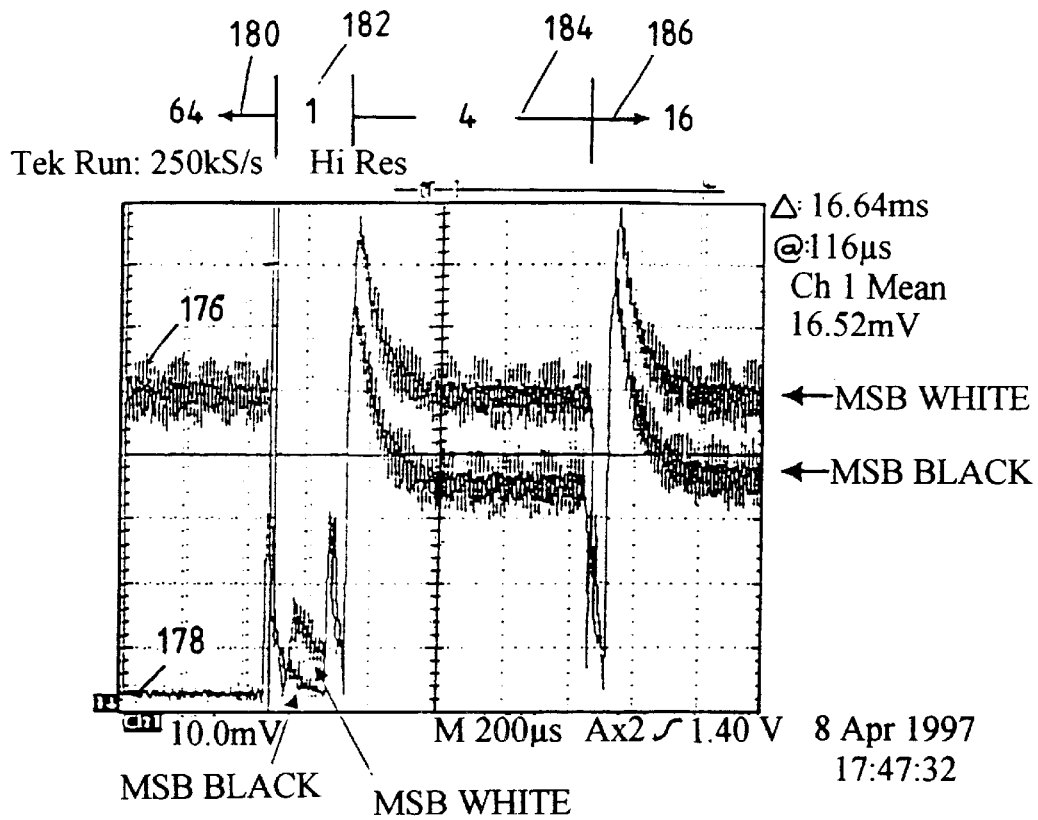
Figure 23B:
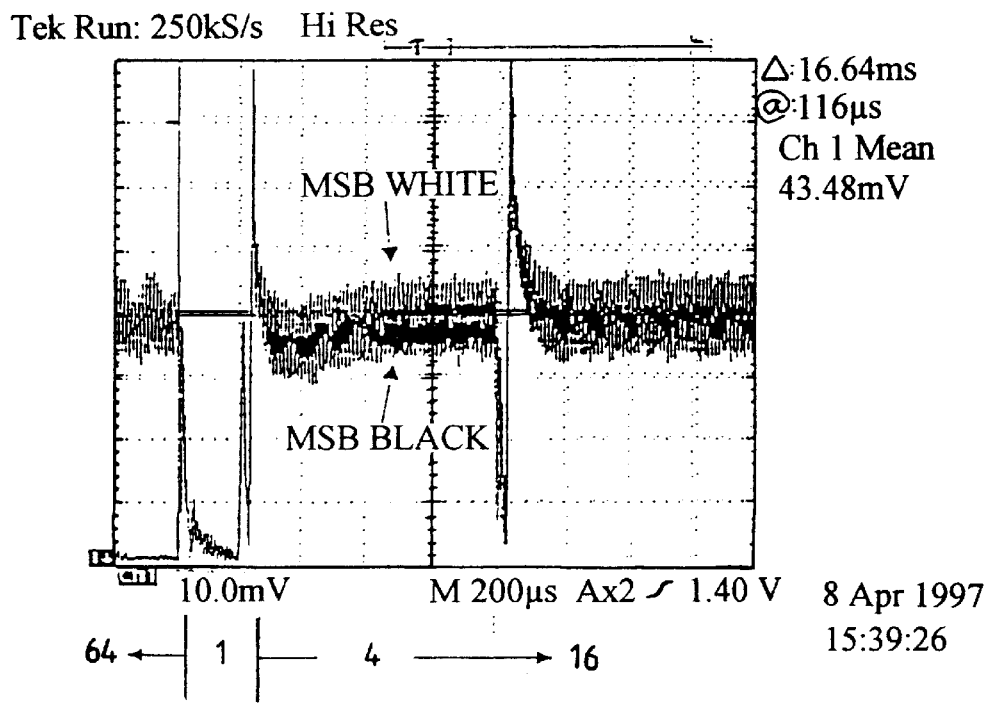
Figure 24A:
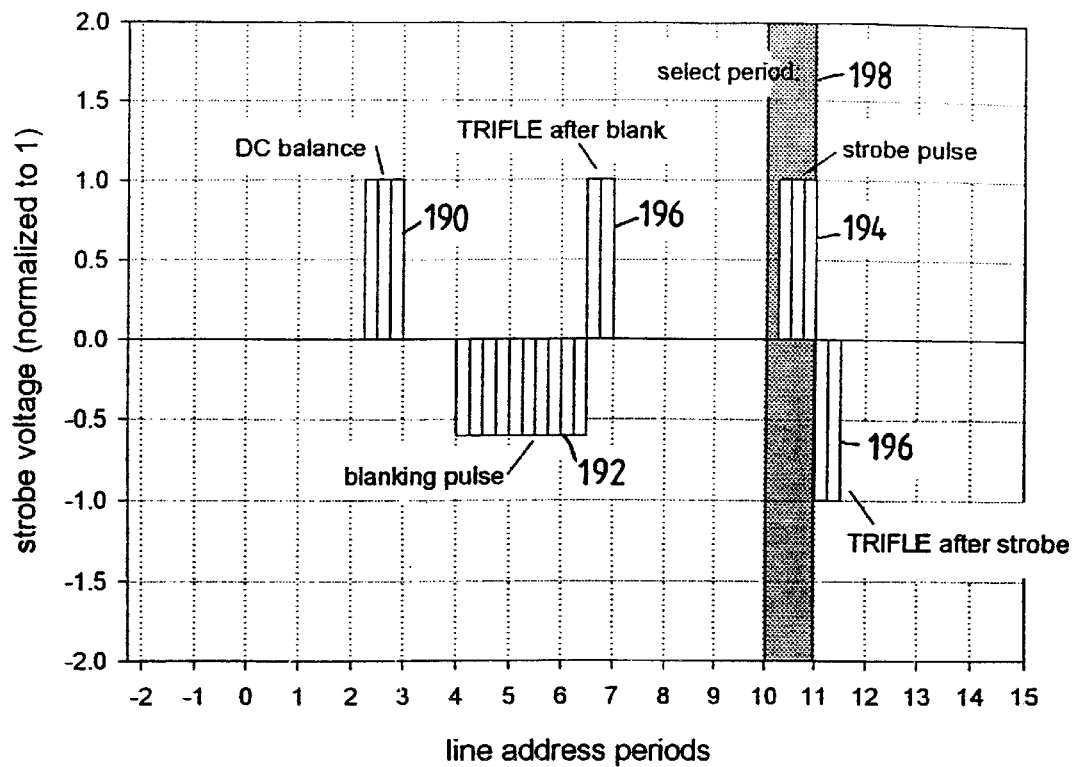
Figure 24B:
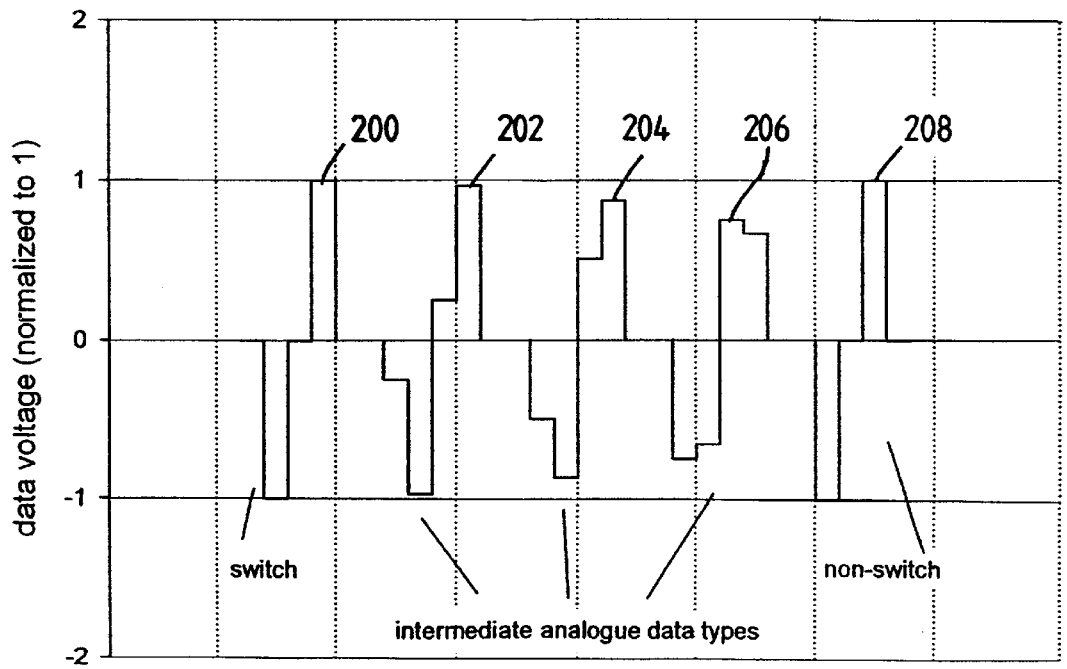
Figure 25A:
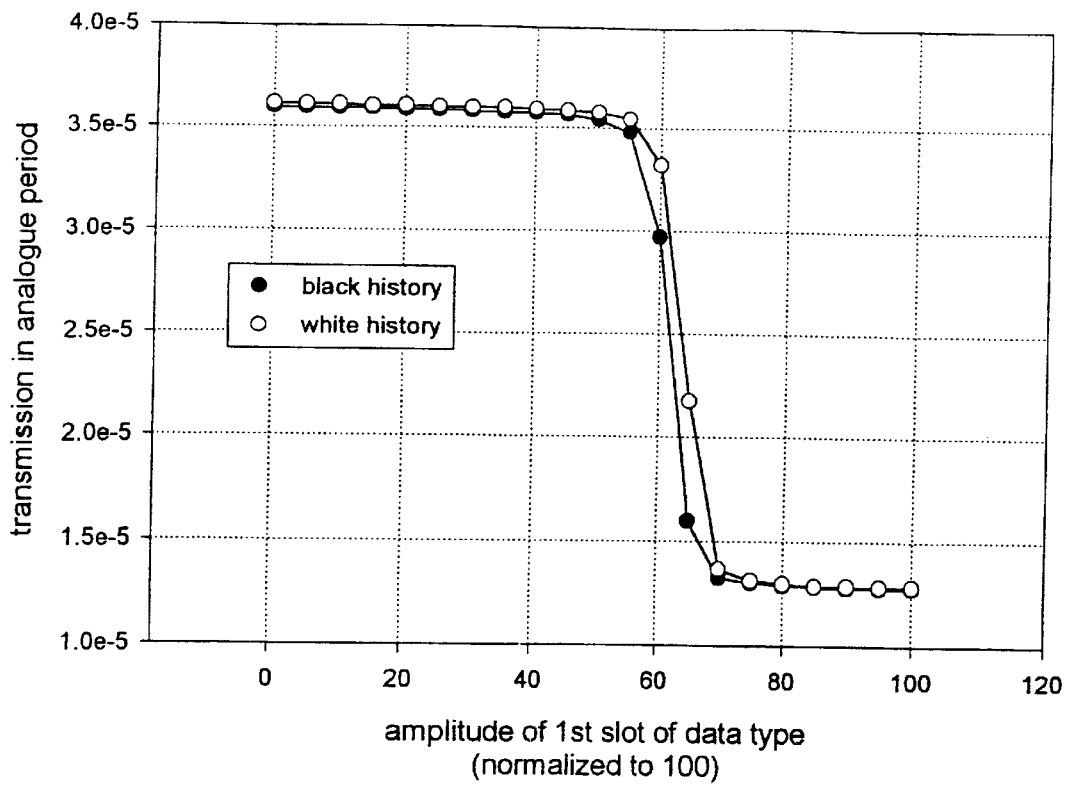

FIGS. 22(a) and 22(b) show the row and data waveforms used to produce FIG. 21(a), and FIGS. 22(c) and (d) show the row and data waveforms used to produce FIG. 21(b);

FIG. 23(a) shows two traces giving the optical response of (undoped) Cell 10 (used in FIG. 21(a)) when the MSB (represented by the first part of the graph) is black and white respectively;

FIG. 23(b) shows two traces giving the optical response of (fast ion doped) Cell 9 (used in FIG. 21(b)) when the MSB (represented by the first part of the graph) is black and white respectively;

FIG. 24(a) shows the row waveform used in an experiment with Cell 11 (containing a fast ion dopant) and Cell 12 (which has no dopant added), the results of which are shown in FIGS. 25(a) and (b) respectively;

FIG. 24(b) shows five 4-slot data types of an infinite set of such 4-slot data types, which can be used as the data waveform with the row waveform of FIG. 24(a); and FIGS. 25(a) and (b) show the results for Cells 11 and 12 respectively where one of the intermediate analogue data types of FIG. 24(b) is preceded by a period at the beginning of which the white or black state was addressed by either the first (switching/white) data type of FIG. 24(b) or the last (non-switching/black) data type of FIG. 24(b).

DESCRIPTION OF THE EMBODIMENTS

Figure 1:
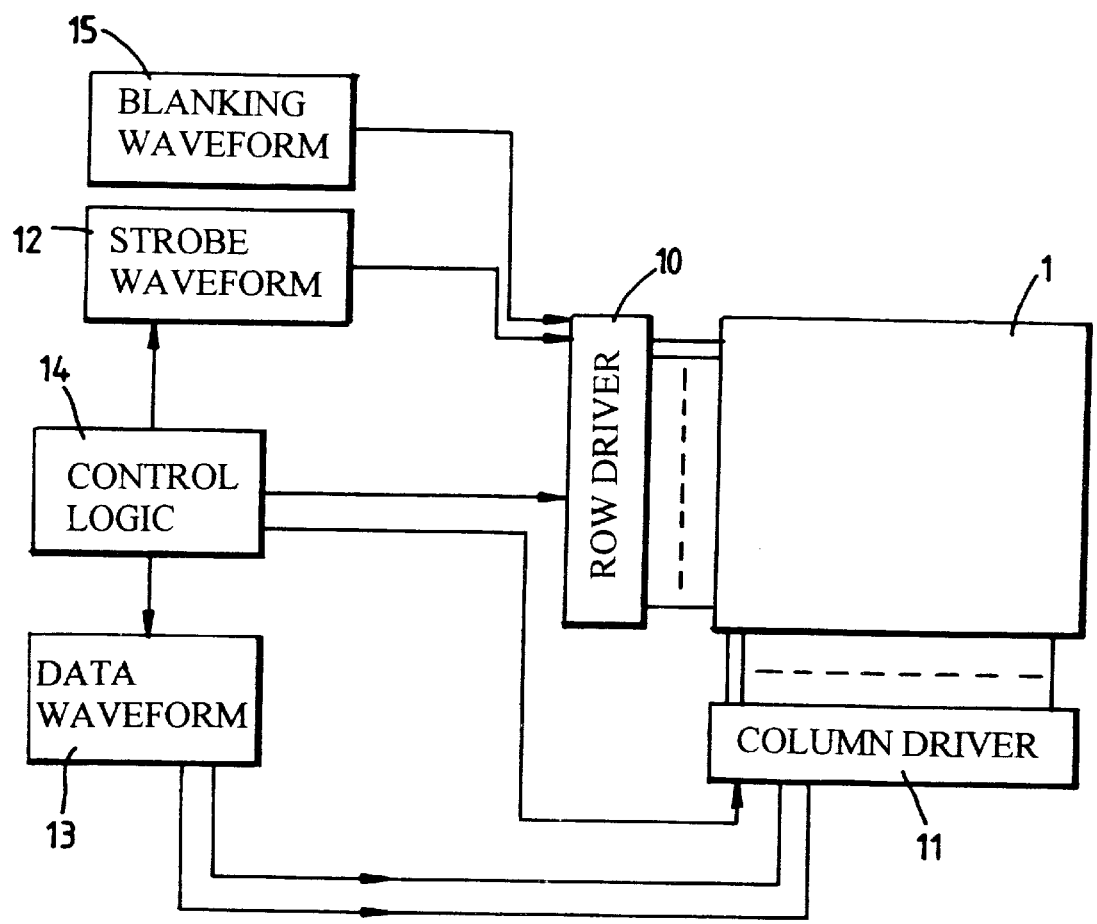
FIG. 1 is a schematic diagram of an FLCD and associated drive circuitry.
Figure 2:
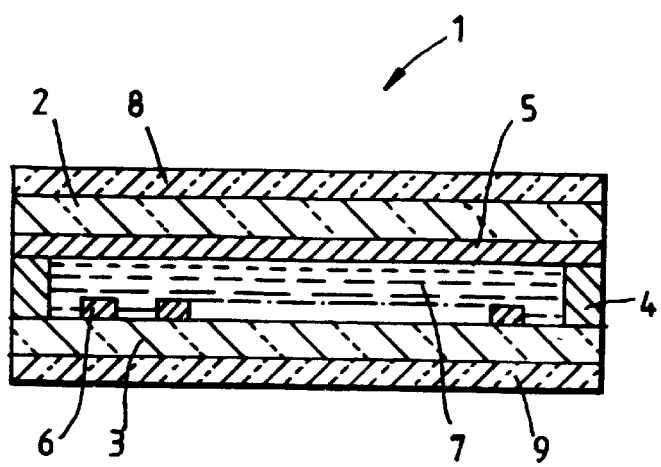
FIG. 2 is a vertical cross-sectional view through the FLCD of FIG. 1.

The FLCD 1 shown in FIGS. 1 and 2 comprises a layer 7 of ferroelectric liquid crystal material contained between two glass substrates 2 and 3 arranged parallel to one another, spaced between 1 μm and 2 μm apart and sealed at their edges by strips 4. Oppositely facing row electrodes 5 and column electrodes 6 of transparent indium tin oxide are applied to the inwardly directed faces of the substrates 2 and 3 and cross one another to form a matrix array. Pixels within the layer 7 at the intersections of the row and column electrodes 5 and 6 are addressable by the application of suitable strobe pulses to the row electrodes 5 and data pulses to column electrodes 6. As is well known, the electrode structures may take other forms in further, non-illustrated embodiments of the invention. For example the electrode structures may be in the form of radial and curved tracks in an r, θ display, or in the form of segments in a numeric display.

Polarizers 8 and 9 are applied to the outer surfaces of the glass substrates 2 and 3, in addition a thin polymer alignment layer (not shown), for example a polyimide alignment layer, is applied to the inwardly directed face of each row and column electrode 5, 6 and is rubbed in a required rubbing direction in the manufacturing process in order to impart a preferred surface alignment direction to the molecules of the layer 7, the rubbing directions of the two alignment layers being parallel or antiparallel to one another.

The switching of the pixels of the display 1 is controlled by row and column drivers 10 and 11, a data pulse generator 13 for supplying ON and OFF data pulses to the column driver 11 so as to apply such pulses in parallel to the column electrodes 6, and a strobe pulse generator 12 for supplying strobe pulses to the row driver 10 so as to apply strobe pulses to the row electrodes 5 sequentially on a line-by-line basis. A blanking pulse generator 15 is provided for supplying blanking pulses to the row driver 10 so as to apply blanking pulses to the row electrodes 5 sequentially on a line-by-line basis, in advance of the strobe pulses. Overall control of timing and display format is provided by a control logic unit 14. It will be understood that the sequential application of the strobe and blanking pulses to the row electrodes 5 on a line-by-line basis may be such that the rows are addressed in any convenient order, i.e. not necessarily with adjacent rows being addressed one after the other across the display.

FIGS. 3 to 25 relate to experiments carried out on twelve cells of the type shown in FIG. 2, some of which have been doped with a fast ion dopant. It should be explained at the outset that two different addressing schemes have been used to address the cells, and these may conveniently be referred to as blanking and the two field schemes. These two schemes will first be briefly described below.

Figure 8:
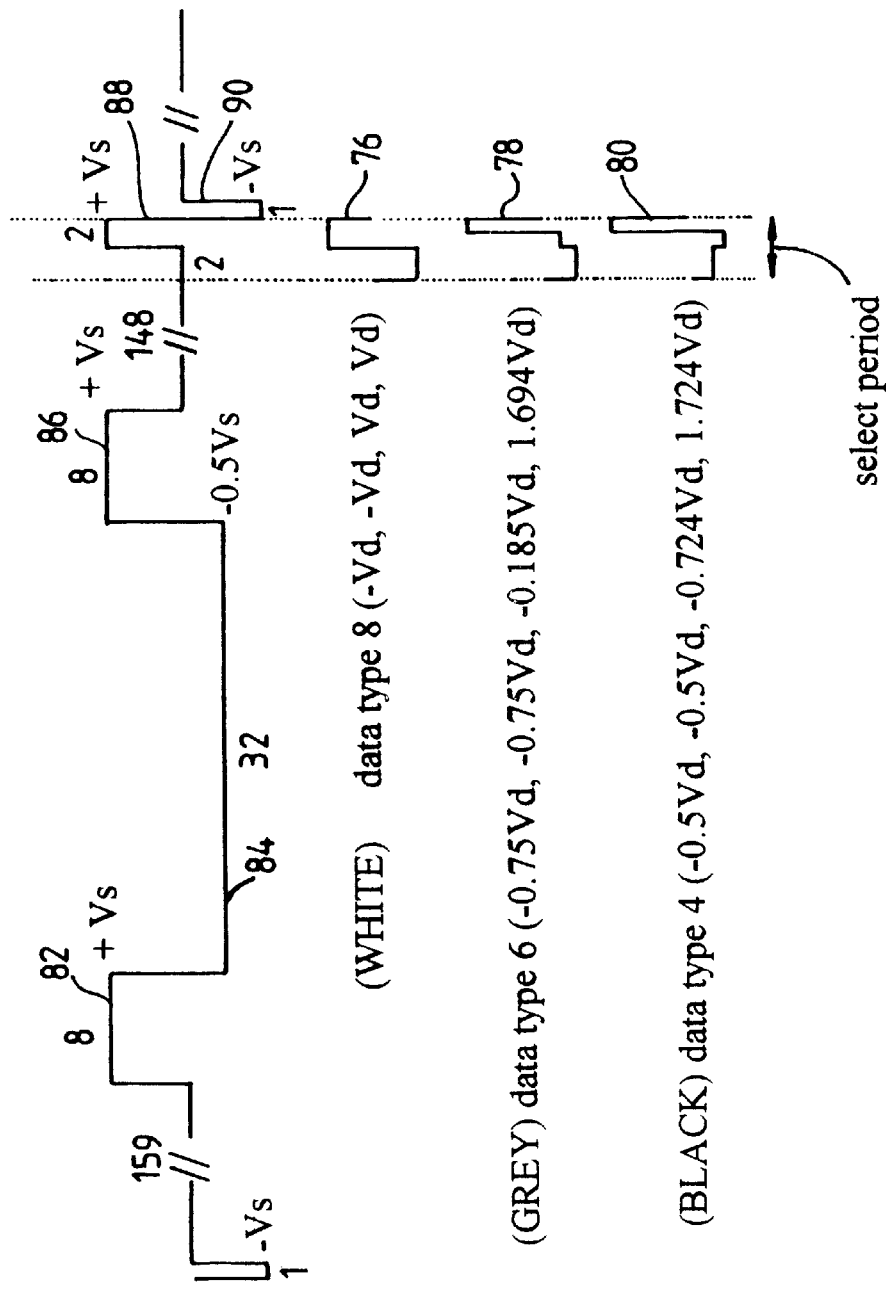
FIG. 8 shows a row waveform applied to row electrodes, and three data waveforms (corresponding to white, gray and black respectively) applied to column electrodes.

In a blanking scheme a blanking pulse is applied to each row of pixels in order to set all of the pixels in that row to a given state, usually black. The blanking pulse is then followed by a strobe pulse which occurs during a select period. During the select period, data pulses are applied to the column electrodes, and these combine with the strobe pulses to form either a "switching resultant" which causes the pixel to switch to the opposite state (usually white) or a "non-switching resultant" which is in sufficient to switch the pixel, so that the pixel remains in the state set by the blanking pulse. Usually the data pulse can be one of a range of different pulses, called "data types", each corresponding to a different gray level. Examples of such data types are shown in FIGS. 8 and 24(b). Another well known data type is the JOERS/Alvey data type, which is described in the prior art reference mentioned above. The (blanking and strobe) pulses applied to the row electrodes are referred to as the row waveform. The data pulses applied to the column electrodes are referred to as the data waveform.

Figure 5:
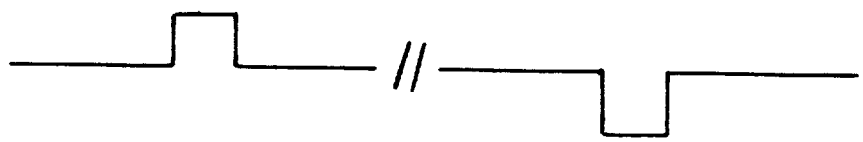
FIG. 5 shows the row electrode waveform used to produce FIG. 4(a)

In a two field scheme there is no blanking pulse. Instead the row waveform usually consists of a single alternating pulse, as shown in FIG. 5. During each row pulse, a data pulse is applied in order to either switch the pixel to the opposite state, or leave the pixel in its existing state. However, each monopolar pulse is capable of switching the pixel in only one direction, and this scheme can therefore result in a switching delay of half a frame..

Figure 3A:
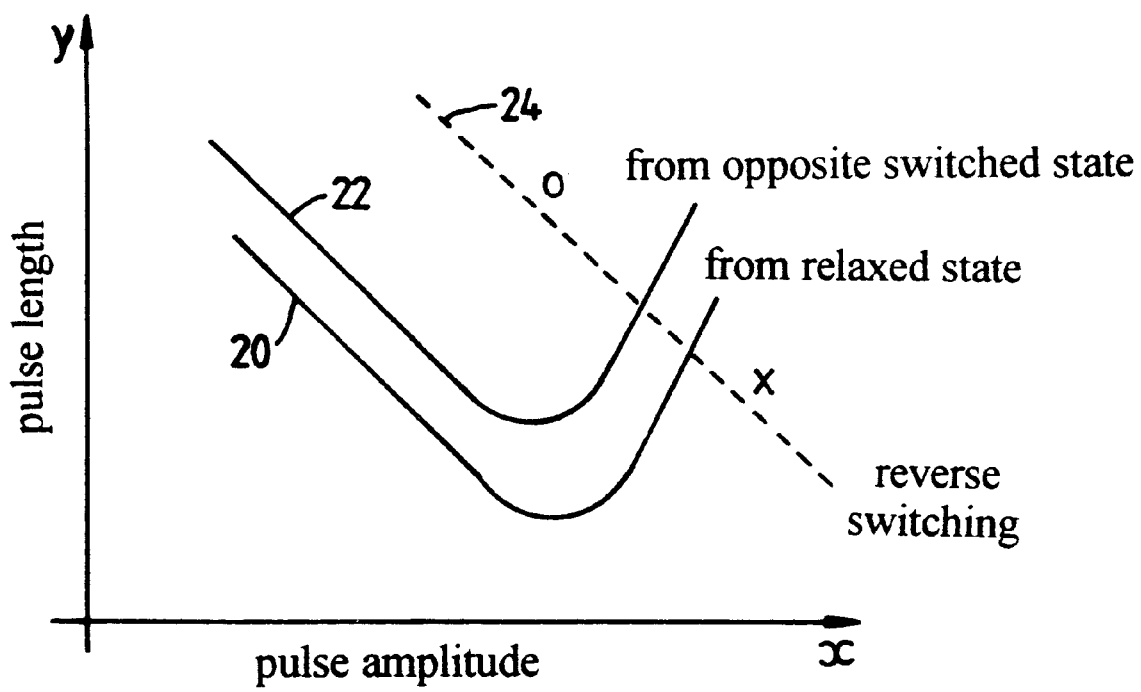
FIG. 3(a) shows the switching and reverse switching curves for a "τ-V min" material.

FIG. 3(a) shows a schematic of the switching time versus applied voltage characteristics for a FLC cell. The x-axis represents the voltage amplitude of a strobe pulse and the y-axis represents the time duration of the strobe pulse. The lower solid curve 20 indicates the pulse duration required to switch the FLC from one state to the opposite state when applying a voltage to the relaxed state. However if the pulse is applied to an elastically stressed state a longer duration pulse is required indicated by the second solid curve 22, referred to herein as the stressed switching curve. Curve 24 is the reverse switching curve. In both cases (ie relaxed and stressed) if a pulse is applied for the duration indicated by the dotted line 24 then a sufficient ionic reversal field exists to destabilize the switched state after the voltage is removed, and the material therefore reverse switches after the strobe pulse. It should be noted that the curves 20, 22 and 24 apply to strobe pulses of either polarity. That is, the strobe pulse amplitude required to switch the material in one direction is the same as that required to switch it in the other direction. The strobe pulse used to produce the graph of FIG. 1 is the alternating strobe pulse shown in FIG. 5.

FLC materials which exhibit switching curves having minimums as shown in FIG. 3(a) and known as "τ-V min" materials, indicating that graphs of the strobe pulse duration (τ) against voltage amplitude (V) has a minimum.

Figure 3B:
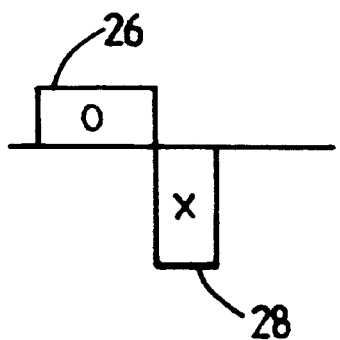
FIG. 3(b) shows a row waveform including a strobe pulse followed by a "TRIFLE" pulse.

FIG. 3(b) is a schematic representation of a row waveform comprising a strobe pulse 26 followed by a TRIFLE (Technique to Reduce the Ionic Field Latching Effect) pulse 28. The use of the TRIFLE pulse 28 will be described below, but for the time being it is sufficient to note that suitable locations for the strobe pulse 26 and TRIFLE pulse 28 are indicated on the graph of FIG. 3(b) by "O" and "X" respectively. In particular, the TRIFLE pulse 28 should lie below the stressed switching curve 22.

Figure 4A:
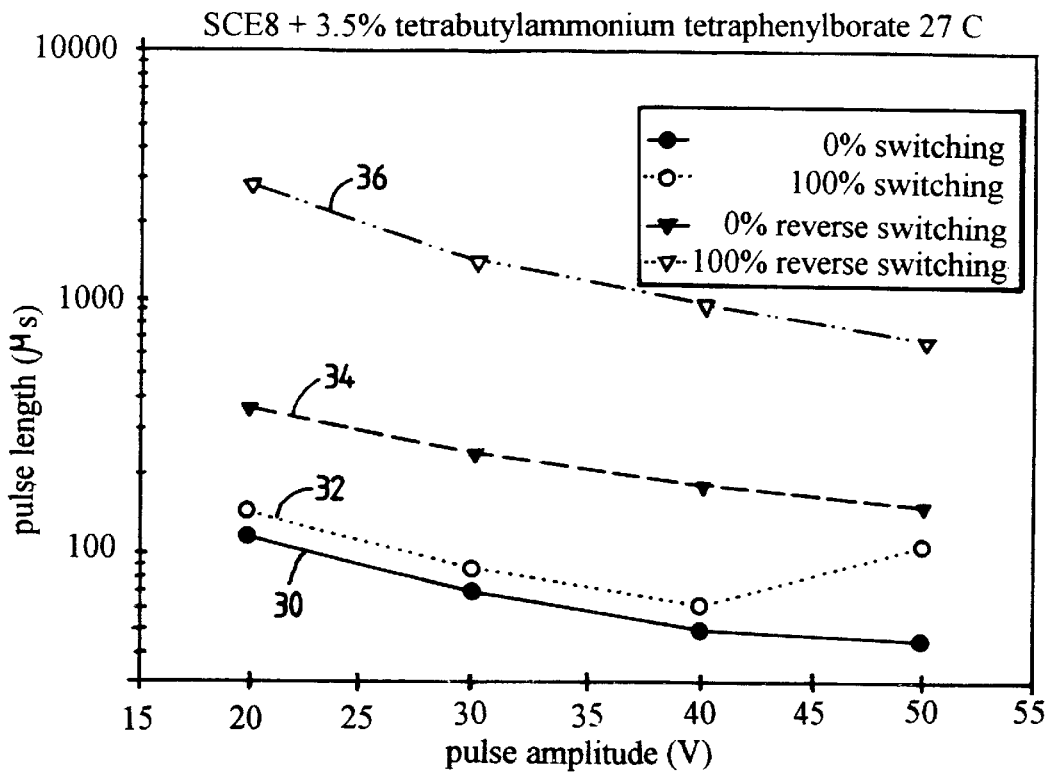
FIG. 4(a) shows the switching and reverse switching curves for Cell 8, which comprises an PLC material containing a fast-ion dopant, when a single (strobe or blanking) pulse is applied to the row electrode.

FIG. 4(a) shows the switching characteristics of Cell 8, which is formed from SCE8+3.5% tetrabutylammonium tetraphenylborate. SCE8 is a τ-V min material, and tetrabutylammonium tetraphenylborate is a fast ion dopant. FIG. 4(a) was produced using the alternating monopolar pulse shown in FIG. 5. From bottom to top, the four curves shown in FIG. 4(a) are the 0% switching curve 30, 100% switching curve 32, the 0% reverse switching curve 34 and the 100% reverse switching curve 36. If a strobe pulse is applied which lies between curves 30 and 32, so called "analogue switching" occurs in which some domains in the FLC material switch but others do not. This results in a "speckle effect" in which areas of the FLC cell are dark while other areas are light. Once curve 32 is reached, 100% of the cell has switched to the opposite state. If pulses of longer duration are applied, then once curve 34 is crossed the external field (ie the strobe pulse) causes sufficient ion movement for reverse switching to begin to occur in some domains. If even longer strobe pulses are applied, then once curve 36 is crossed all domains reverse switch after the strobe pulse is removed. Again, the curves apply to strobe pulses of either polarity.

Figure 4B:
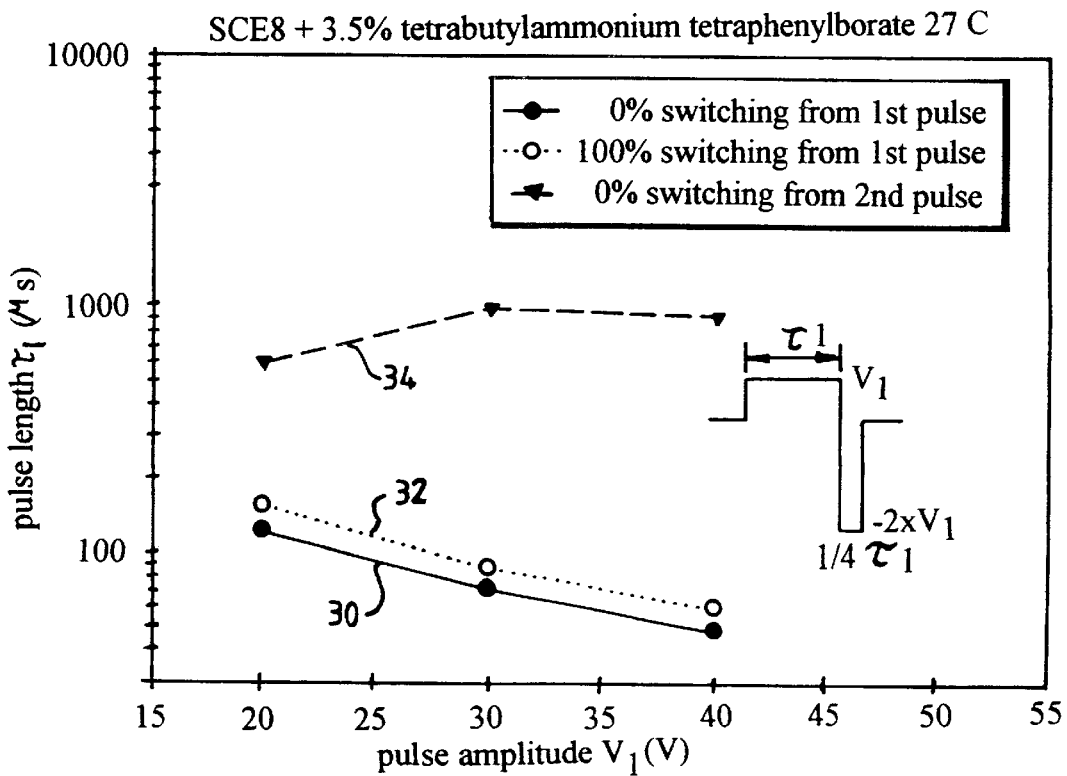
FIG. 4(b) shows the switching curves of FIG. 4(a) when the "TRIFLE" pulse follows the strobe or blanking pulse.

FIG. 4(b) was produced using the row waveform pulse shown on the graph of FIG. 4(b), in which the switching pulse is immediately followed by an opposite polarity TRIFLE pulse of twice the amplitude and ¼ the duration. The top curve 36 has disappeared off the scale of the graph, indicating that when used with a material containing a fast ion dopant, the TRIFLE pulse prevents reverse switching (at least for the pulse durations shown on the graph).

Figure 6A:
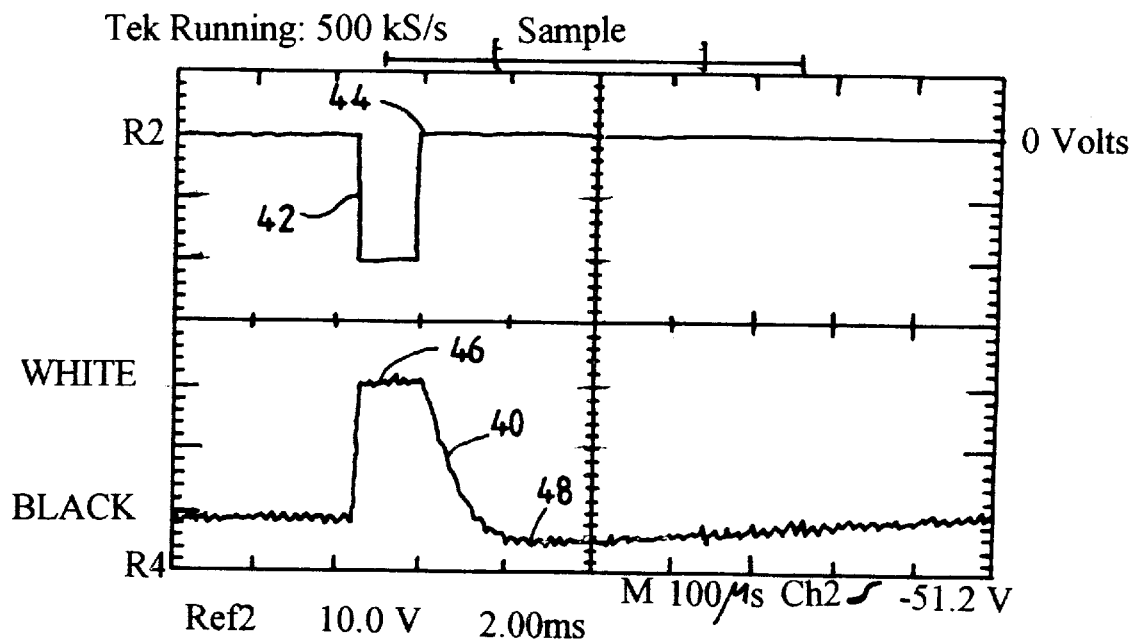
FIG. 6(a) shows, in its lower half, the optical response (photodiode voltage) of Cell 8 to the −20V 1.44 ms row electrode pulse shown in the top half of the figure.
Figure 6B:
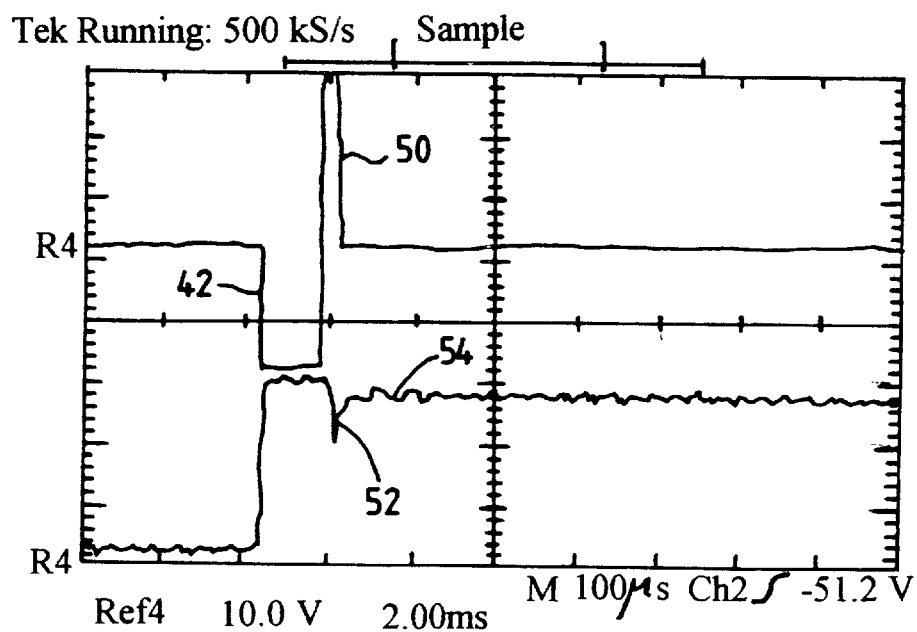
FIG. 6(b) shows, in its lower half, the optical response (photodiode voltage) of Cell 8 to the row electrode pulse shown in the top half of the figure.

Referring now to FIG. 6, the bottom trace in FIG. 6(a) shows the optical response 40 to a −20V, 1.44 ms pulse 42 (top trace). The optical response 40 is actually a photodiode response measured in millivolts, but for the purposes of the graphs in this description can be considered as an optical response in arbitrary units. The switched (white) state, caused by the pulse 42., is indicated at 46. Note that once the switching voltage goes to zero (at 44) the optical response 40 decays back to the non-switch state (black) at 48. In FIG. 6(b) a +56V, 0.36 ms TRIFLE pulse 50 is applied after the −20V, 1.44ms pulse. Note that there is a partial optical response (52) to the TRIFLE pulse 50 but the duration is short enough to prevent latching to the non-switch state. After application of the TRIFLE pulse 50 there is no longer an ionic reversal field and the FLC remains in the switched state 54.

SCE8 is a material which exhibits τ-Vmin characteristics. In typical SCE8 cells the reverse switching is very slow and in many cases full reverse switching does not occur however by adding an ionic dopant to the material the reverse switching threshold can be lowered significantly. Cell 8 with PI2555 alignment layer is filled with a mixture of SCE8+ 3.50% wt tetrabutylammonium tetraphenylborate. The switching characteristics of this cell are shown in FIG. 4(a). In this cell with an ionic dopant added the reverse switching is relatively fast with full reverse switching occurring at a threshold lower than the 0% reverse switching threshold for many SCE8 cells. This lowered reverse switching threshold can cause standard addressing techniques to fail.

In FIG. 4(b) the switching characteristics of Cell 8 are shown for a waveform where the switching pulse is followed by an opposite polarity pulse which is twice the amplitude and ¼ the duration of the switching pulse. This second pulse has very little influence on the switching thresholds of the 1st pulse but does reduce the reverse switching. When reverse switching does occur (top curve 34) it is due to switching from the second pulse rather than from the ionic field due to the 1st pulse. FIG. 6(a) shows the optical (transmission) response to a monopolar pulse of −20V, 1.44 ms. During field application the device switches fully to the white state (at 46). While the field is on the ionic impurities drift and create an opposing internal field. This opposing ionic field is not strong enough to destabilize the switched state while the field is on. When the field is removed however the ionic field remains and the device partially reverse switches back to the black state (at 48). In FIG. 6(b) the optical response to a −20V, 1.44 ms pulse immediately followed by a +56V. 0.36 ms pulse is shown. During the −20V pulse the device switches to the white state. When the +56V pulse is applied the device begins to switch towards the black state. When the field is removed the device remains in the white state because the ionic reversal field from the −20V pulse has been effectively erased by the +56V pulse.

Figure 7A:
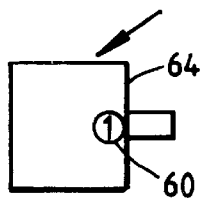
FIGS. 7(a) and (b) show two different locations of Cell 1.
Figure 7B:
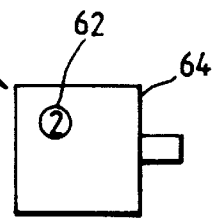
FIGS. 7(c) and 7(d) show the switching and reverse switching characteristics at two different locations of Cell 1 which contain different amounts of fast-ion dopant.
FIGS. 7(e) and 7(f) show the optical response for said two locations of Cell 1 when the row waveform and three data types shown in FIG. 8 are applied to said two locations in the sequence 10 frames white, 10 frames gray, 10 frames black, 10 frames gray.
Figure 7C:
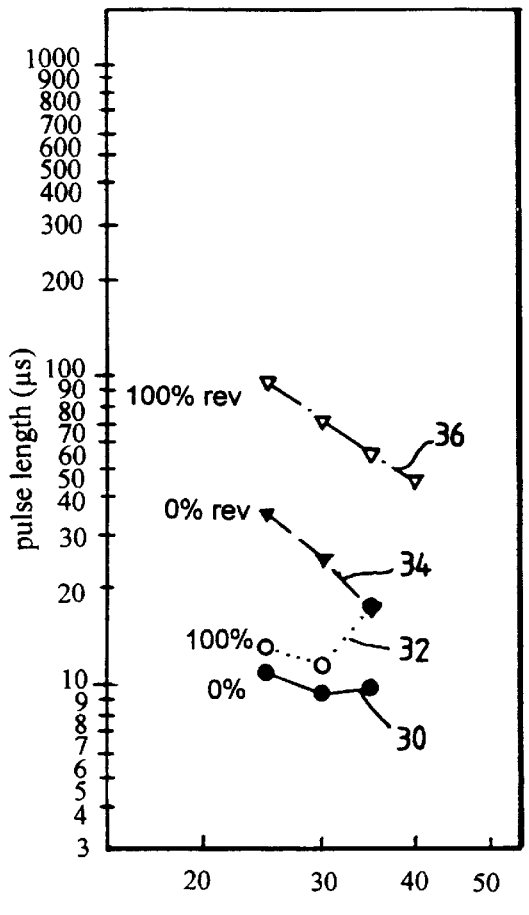
Figure 7D:
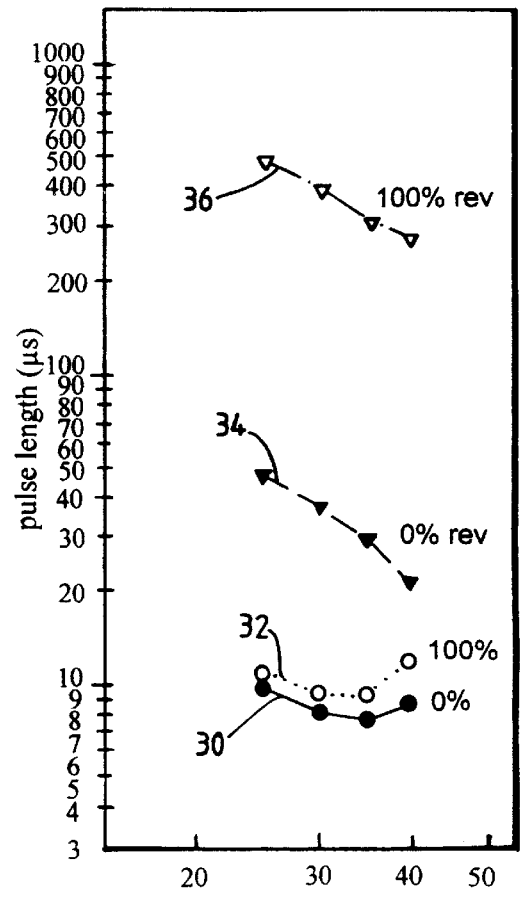
Figure 7E:
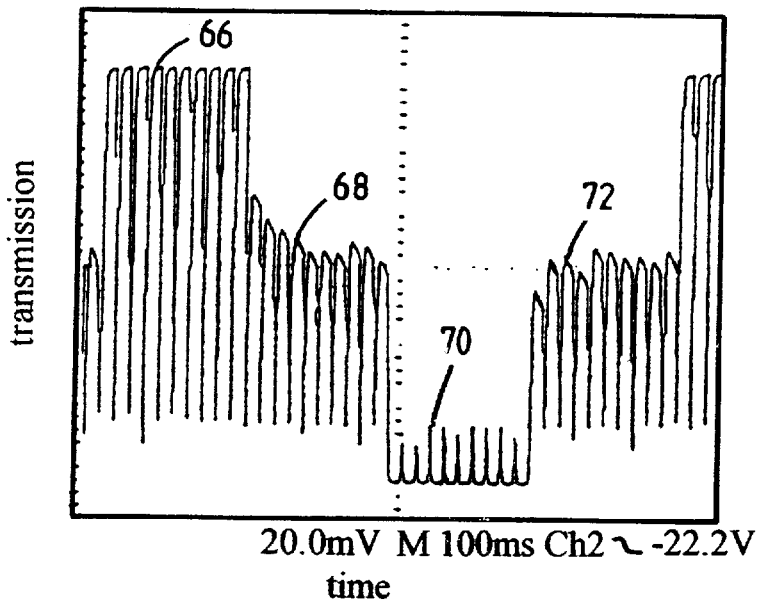

FIGS. 7(a) through (f) show a comparison of analogue multi-domain gray level behavior for two different locations 60 and 62 shown in FIGS. 7(a) and (b) within the same cell 64 having different reverse switching thresholds as a result of non-uniform doping across the cell. The switching and reverse switching curves 30, 32, 34 and 36 of FIGS. 7(c) and (d) have the same meanings as those shown in FIG. 4(a), and were produced using the row waveform of FIG. 5.

Figure 7F:
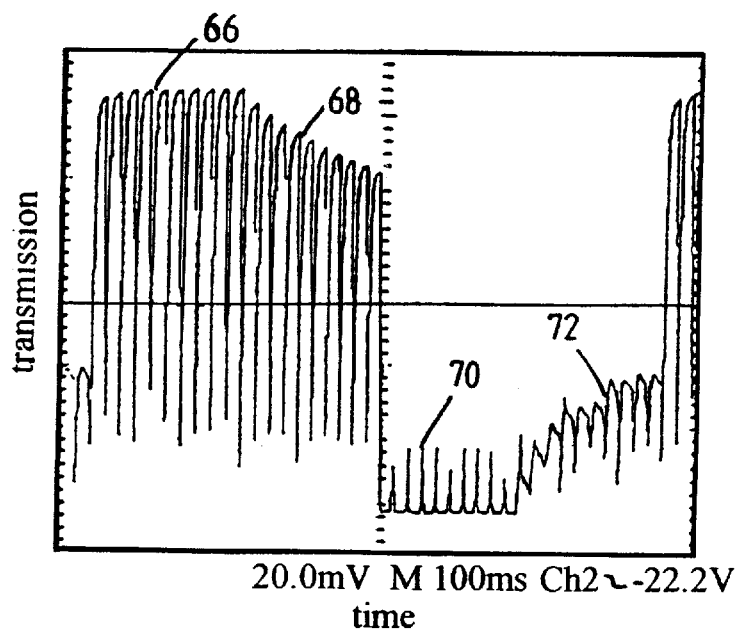

The optical responses shown in FIG. 7(f) were produced using the row and data waveforms shown in FIG. 8, and by applying 10 frames of white data pulses (ie data type 8) (indicated on the optical response at 66), followed by 10 frames of gray data pulses (ie data type 6) (indicated at 68), followed by 10 frames of black data pulses (ie data type 4)

(indicated at 70), followed by 10 frames of gray data pulses. (ie data type 6) (indicated at 72). When the reverse switching threshold (ie curve 36) is high the ionic response time is slower (ie less ionic doping in region 60) and the gray levels are more seriously affected by the previous switched state resulting in a drift over several frame times before reaching equilibrium, as can clearly be seen in FIG. 7(*f*). When the reverse switching threshold (ie curve 36) is low the ionic response time is faster (ie more ionic doping in region 62) and the gray levels are less dependent on the previous switched states resulting in fewer frames of drift before reaching equilibrium, as can clearly be seen in FIG. 7(*e*).

FIG. 8 shows the row waveform 74 and data waveforms 76, 78 and 80 (data types 8, 6 and 4 respectively) used to address white, gray and black gray levels respectively. Following a negative DC balance pulse 81, the first +ve pulse 82 (of value +Vs)of the row waveform 74 is a DC balance pulse. DC balancing of the display is desirable to prevent degradation of the display over time. A blanking pulse 84 (of value −0.5Vs) is then followed by a +ve polarity TRIFLE pulse 86 (of value +Vs) to erase the ionic field built up by the long duration −ve polarity blanking pulse. The strobe pulse 88 (of value +Vs) is followed by a −ve polarity TRIFLE pulse 90 (of value −Vs) to prevent reverse switching after removal of the strobe pulse 88. Three data types are shown: data 8 selects the white state, data 6 selects an intermediate gray level, and data 4 selects the black state.

Cell 1 which is filled with an FLC material exhibits different switching behavior in different regions due to non-uniformity in the ionic impurities over the cell area.

FIGS. 7(*c*) and (*d*) show the switching characteristics in two regions. In region 60 the ionic contamination is high and the reverse switching is faster ($\tau_{100\%rev}/\tau_{0\%sw}$=8.7 @25V, 30° C.) than in region 62 ($\tau_{100\%rev}/\tau_{0\%sw}$=50 @25V, 30° C.). FIGS. 7(*e*) and (*f*) show the gray level stability using the driving waveforms shown in FIG. 8 where data 8 selects the white state, data 4 selects the black state and data 6 selects an intermediate gray state. The row waveform consists of a blanking pulse which finishes with a +ve polarity pulse to erase the ionic field built up by the long duration −ve pulse. The strobe pulse is immediately followed by a −ve polarity pulse to erase the ionic field from the strobe pulse. A frame of each state is repeated 10 times before advancing to the next level in a sequence of data 4, data 6, data 8, data 6. The gray level in region 60 where the reverse switching is faster stabilizes in a few frames while in region 62 the gray level does not stabilize even after 10 frames.

Figure 10:
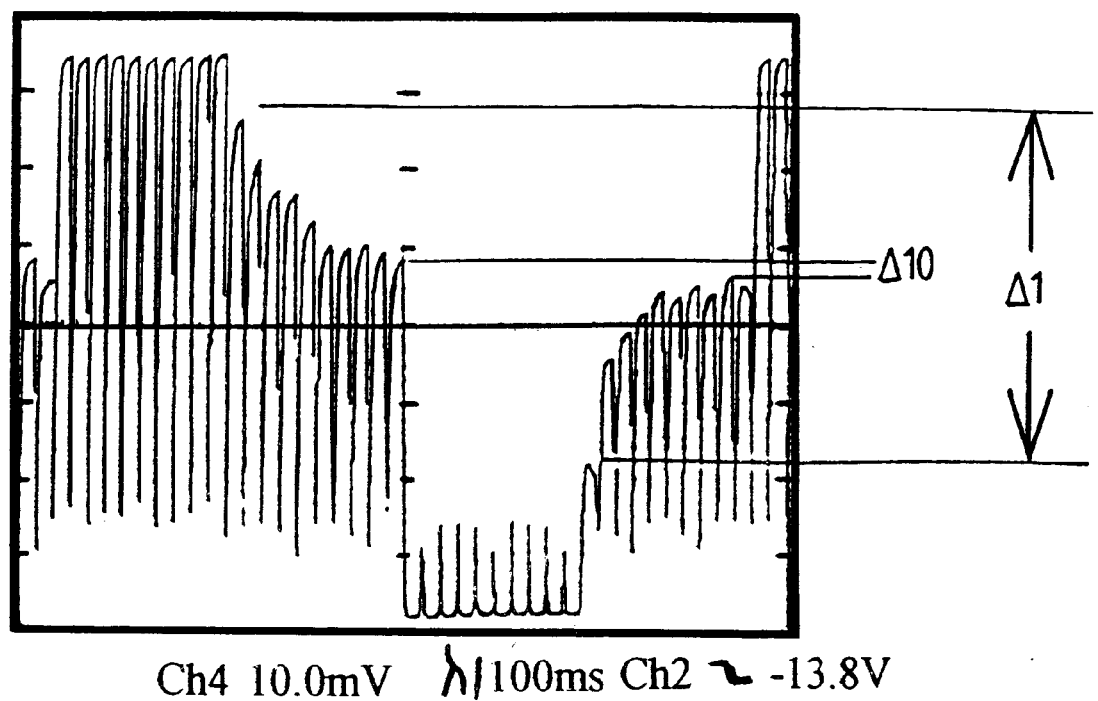
FIG. 10 shows the optical response for Cell 2 Position 1, when the data waveforms of FIG. 8 are applied in the sequence 10 frames white, 10 frames gray, 10 frames black, 10 frames gray.

FIG. 9 shows data for different locations of Cells 1 to 7. Cells 1 to 7 all have nonuniform reverse switching characteristics as a result of non-uniform doping across the cells. The reverse switching threshold was measured at various positions in these cells at 40V, 30° C., represented by locations a to m in FIG. 9. At each position the gray level stability was also assessed by applying the sequence of white, gray, black, gray frames described in relation to FIG. 7. FIG. 10 demonstrates how the difference in the transmission levels are measured and defined. The difference in the transmission of the 1st gray level frame after a black frame versus after a white frame is defined as Δ1 and similarly the difference between the 10th gray level frames is defined as Δ10. These differences in gray level are plotted against the reverse switching threshold in FIG. 9. This shows a trend of decreasing difference in gray level when the reverse switching threshold is lowered. This is what one would expect given that a reducing reverse switching threshold indicates a faster ionic response.

FIGS. 11, 12 an 13 relate to cell 9 which comprises a fast ion dopant, and use a two field addressing scheme. FIG. 11(*a*) shows a drive window 92 (hatched region) bounded by the 100% switching curve 94 for a switching resultant (the 0% switching curve lies below this curve, but is not shown in this figure), the 0% reverse switching curve 96 for a switching resultant (the 100% reverse switching curve lies above this, but is not shown in this figure), and finally the 0% switching curve 98 for a non-switching resultant. The x and y axes represent the voltage amplitude and time duration of the two field strobe pulse shown at the right hand side of FIG. 11(*a*). The data waveform is either a switching or non-switching JOERS/Alvey data pulse. It can be seen from the graph in FIG. 11(*a*) that thresholds for the strobe pulse are different depending on whether the data pulse is switching or non-switching.

The drive window of FIG. 11(*a*) represents the area which can be used for digital switching, ie switching between black and white states, rather than intermediate gray levels, and the drive window is therefore sometimes referred to as a digital drive window. It is desirable to achieve as large a drive window as possible, and to operate close to the center of the drive window. This allows digital switching to be achieved despite inevitable variations and nonuniformities in the characteristics of the FLC material and/or device.

The drive window of FIG. 11(*a*) is cut off by reverse switching from the switching resultant (ie curve 96). In FIG. 11(*e*) a TRIFLE pulse 100 of amplitude −0.25×Vs is applied after the strobe pulses 102. The TRIFLE pulse 100 has the effect of raising both the switching and reverse switching curves 94 and 96 while lowering the non-switch curve thus creating a smaller drive window 92. In FIG. 11(*f*) the duration of the TRIFLE pulse 100 is increased which raises both the non-switch and the reverse switching curves thus increasing the drive window 92 slightly. Referring to FIG. 12, in FIG. 12(*d*) a TRIFLE pulse 104 of amplitude −0.5×Vs is applied after each strobe pulse 106. This pulse 104 has the same V·t product as in FIG. 11(*f*) but is much more effective at increasing the drive window 92 due to its larger amplitude. In FIG. 12(*e*) the V·t product is again the same but the amplitude of the TRIFLE pulse 104 is doubled (now equal to the strobe pulse 106). This removes the cut-off of the drive window 92 by reverse switching (curve 96) entirely at the cost of slightly lowering the switching threshold for a non-switch resultant (curve 98). In FIG. 12(*f*) the amplitude of the TRIFLE pulse 104 is increased to −1.25×Vs. This lowers the non-switch curve 98 even further but also lowers the switching curve 94 allowing slightly faster operation.

In FIGS. 13(*a*), (*b*) and (*c*) the optical response 110 (actually a photodiode voltage as explained above) for three different row waveforms for two-field operation are shown. In all three cases Vs=35V and the line address time, 1.a.t.=16 µs. In FIG. 13(*d*) there is no TRIFLE pulse after the strobe pulses 112. The optical response 110 shows that immediately after the strobe pulses 112 the device almost reverse switches (at points 114). This swing in transmission will obviously reduce the contrast ratio and brightness of the display. In FIG. 13(*e*) the amplitude of the TRIFLE pulses 116 is equal to that of the strobe pulses 112. The effect is to reduce the amount of reverse switching (see points 118) after the strobe pulses 112. By increasing the amplitude of the TRIFLE pulse 116 as shown in FIG. 13(*f*) the swing in transmission is further reduced (see points 120).

Figure 11A:
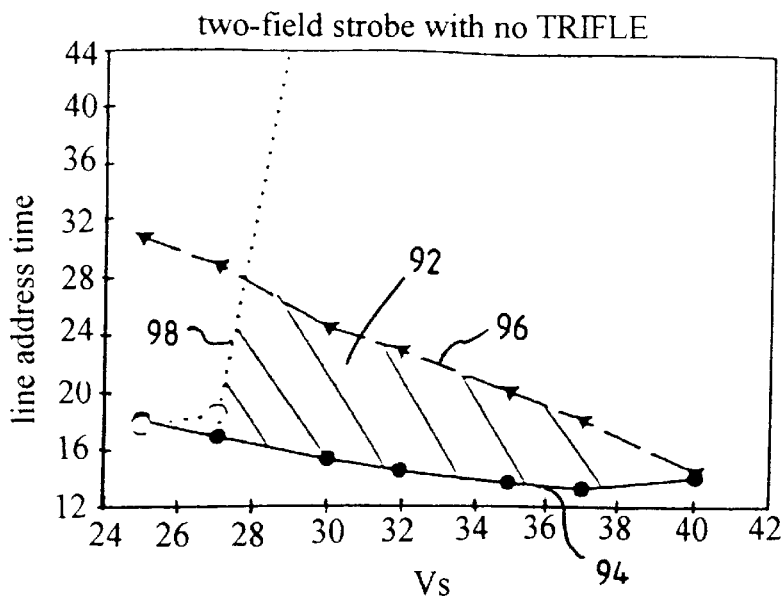
FIGS. 11(a), (b) and (c) show drive windows for Cell 9, which is doped with a fast ion dopant, obtained by application of the (two field) row waveforms (shown in FIGS. 11(d), (e) and (f) to the row electrodes, and JOERS/Alvey data waveforms to the column electrodes.
Figure 11B:
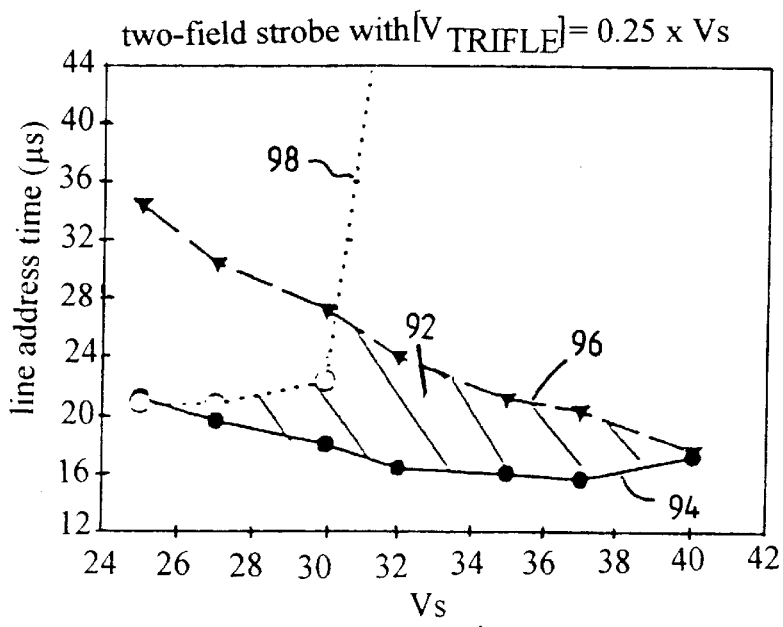
FIGS. 11(d), (e) and (f) show the row waveforms.
Figure 11C:
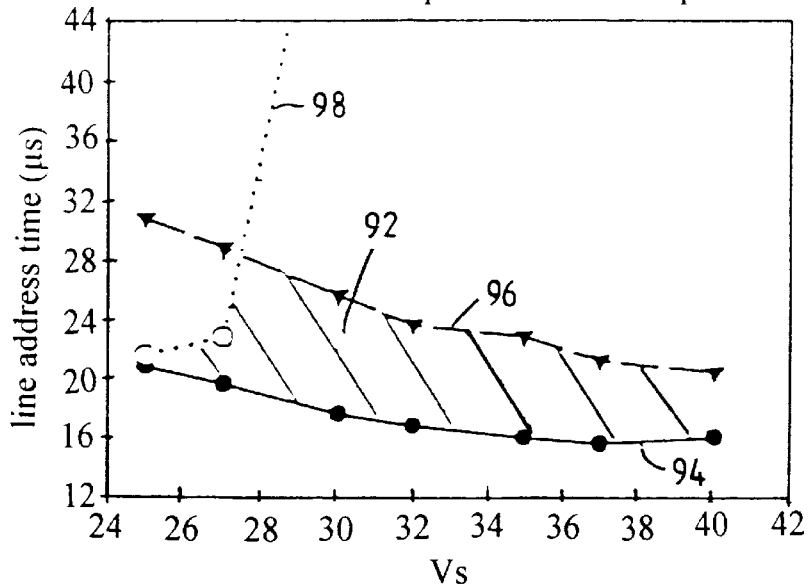
Figure 11D:
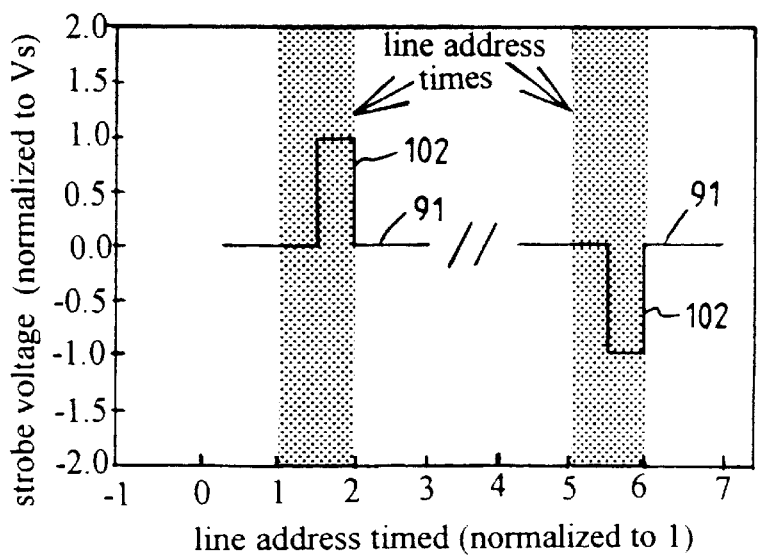
Figure 11E:
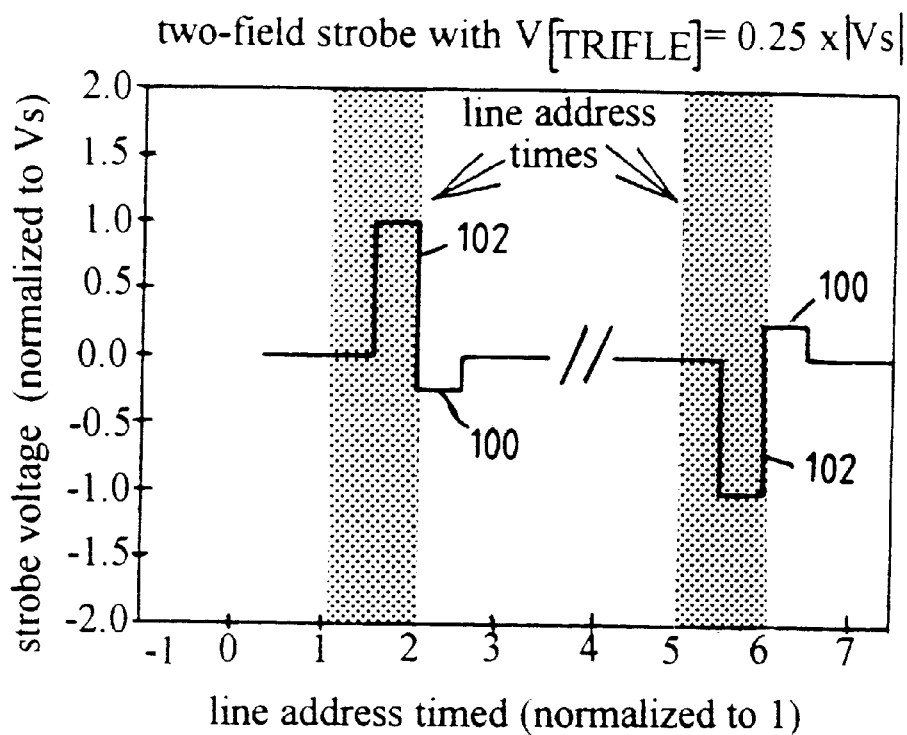
Figure 11F:
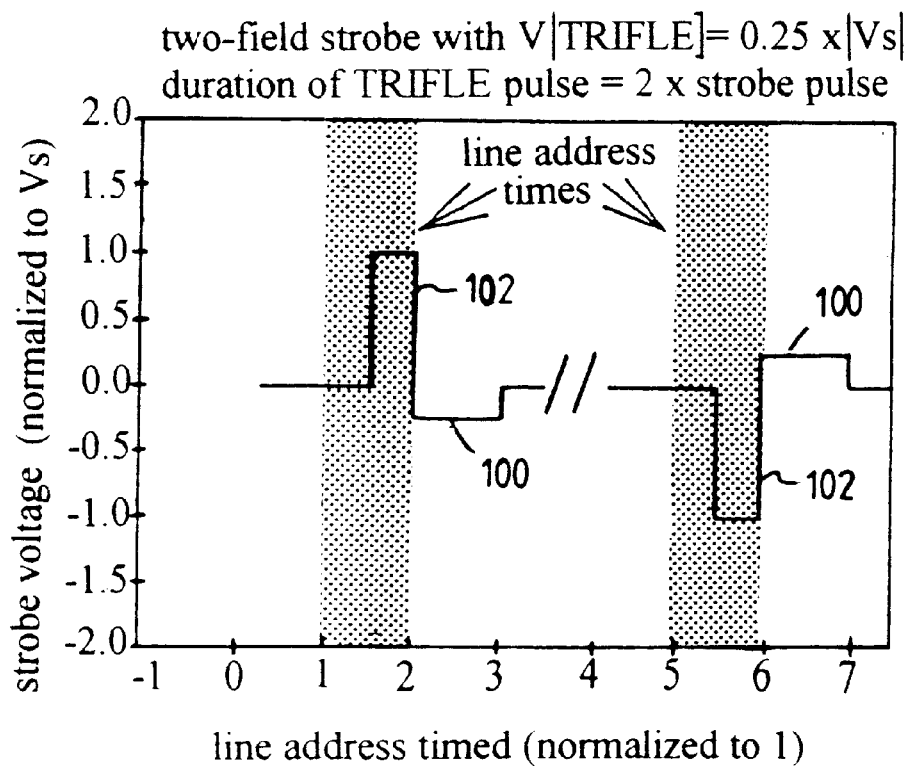
Figure 12A:
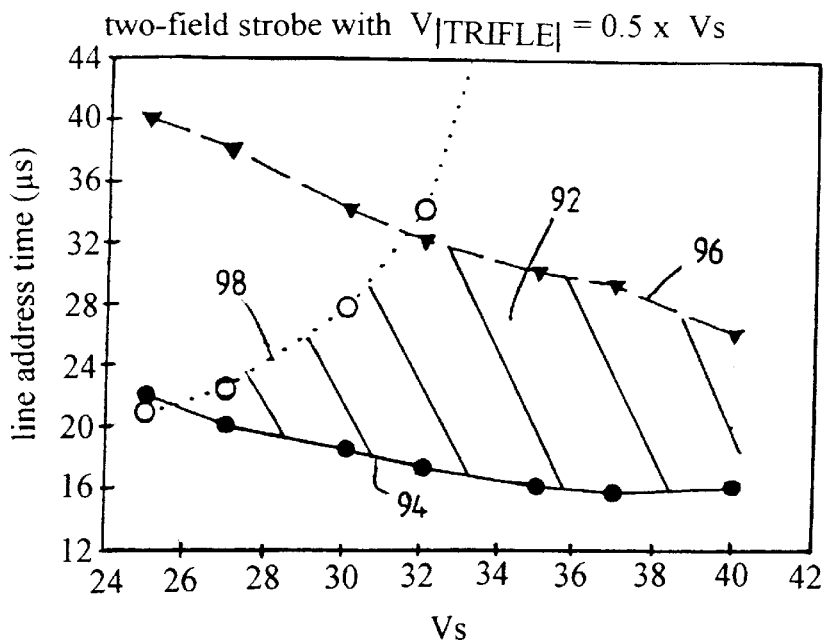
FIGS. 12(a), (b) and (c) show the results for the same cell as FIGS. 11(a), (b) and (c) when the row waveforms (shown in FIGS. 12(d), (e) and (f)) are applied to the row electrodes.
Figure 12B:
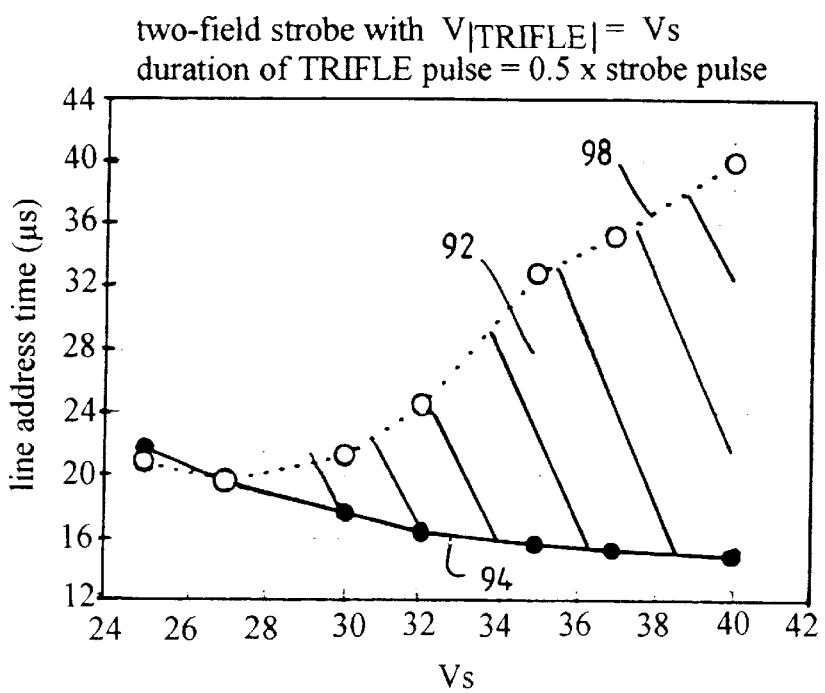
FIGS. 12(d), (e) and (f) show the row waveforms.
Figure 12C:
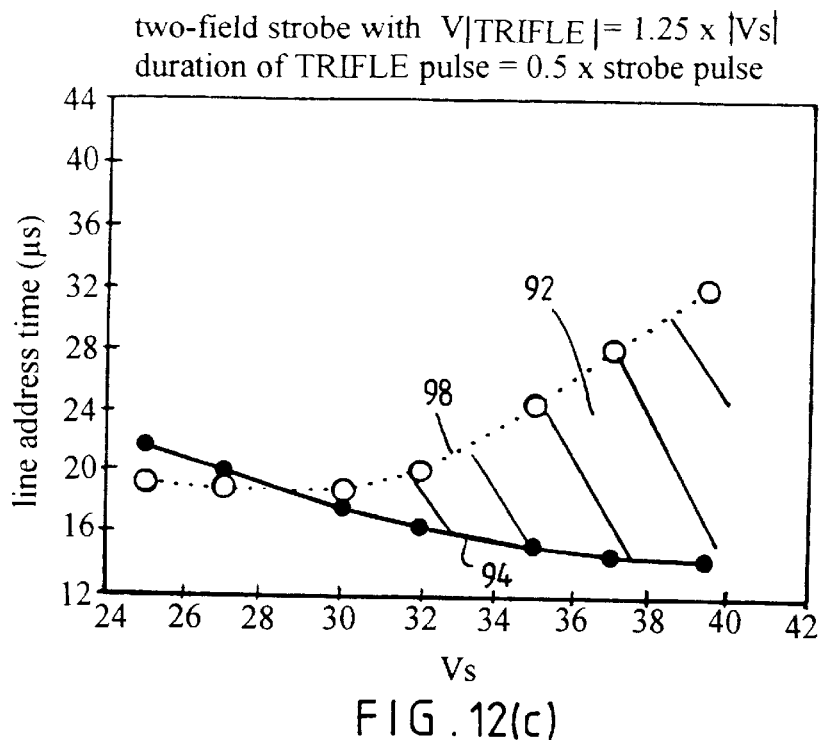
Figure 12D:
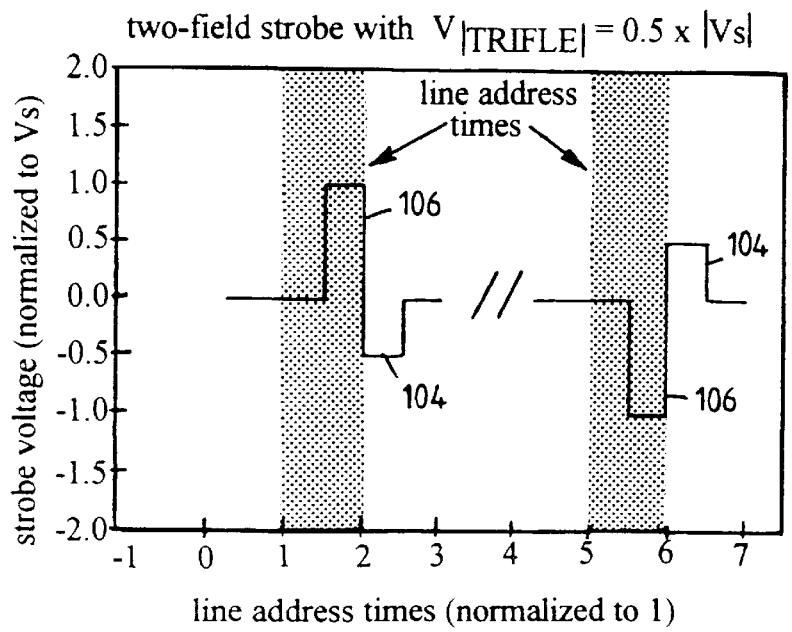
Figure 12E:
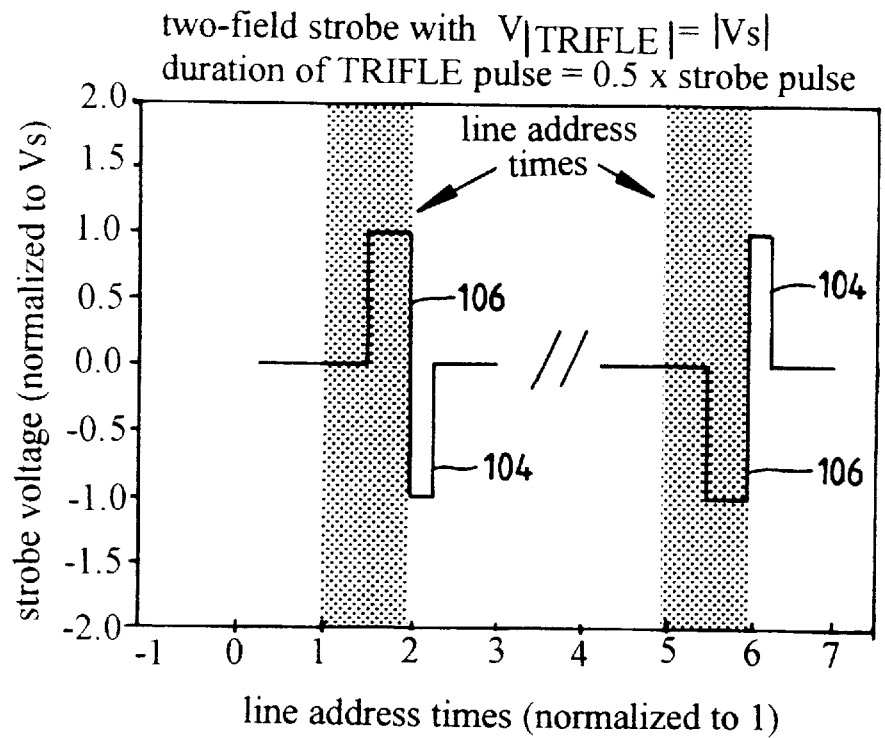
Figure 12F:
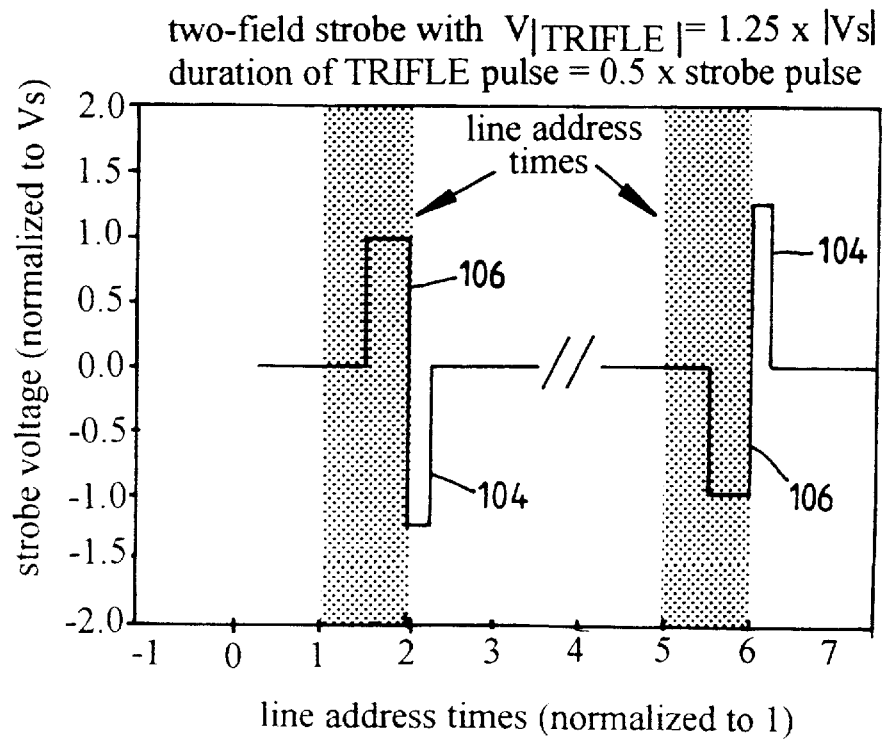
Figure 13A:
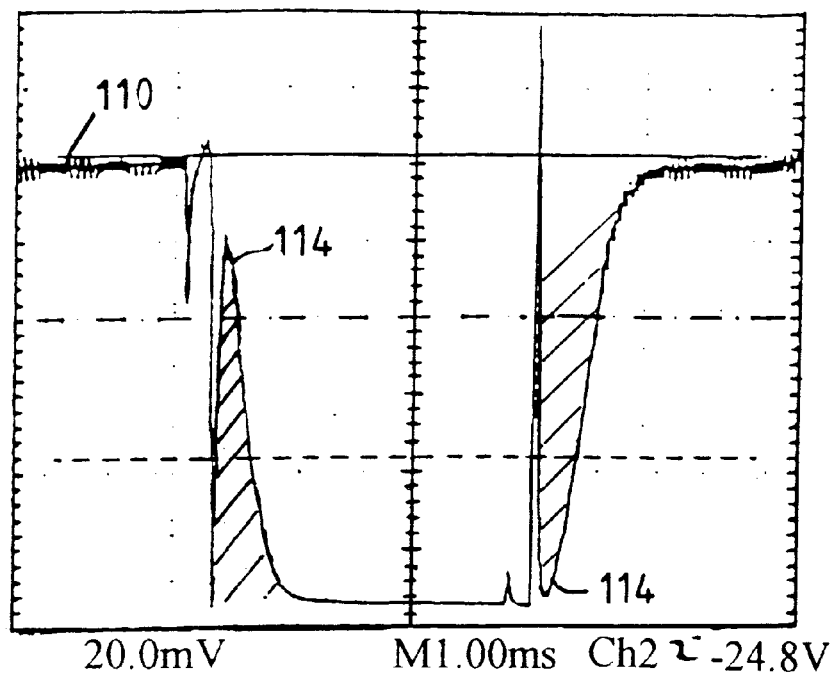
FIGS. 13(a), (b) and (c) show respectively the optical response of Cell 9 when the row waveforms (shown in FIGS. 13(d), (e) and (f)) are applied, these row waveforms being those shown in FIGS. 11(d), 12(e) and 12(f) respectively.
Figure 13B:
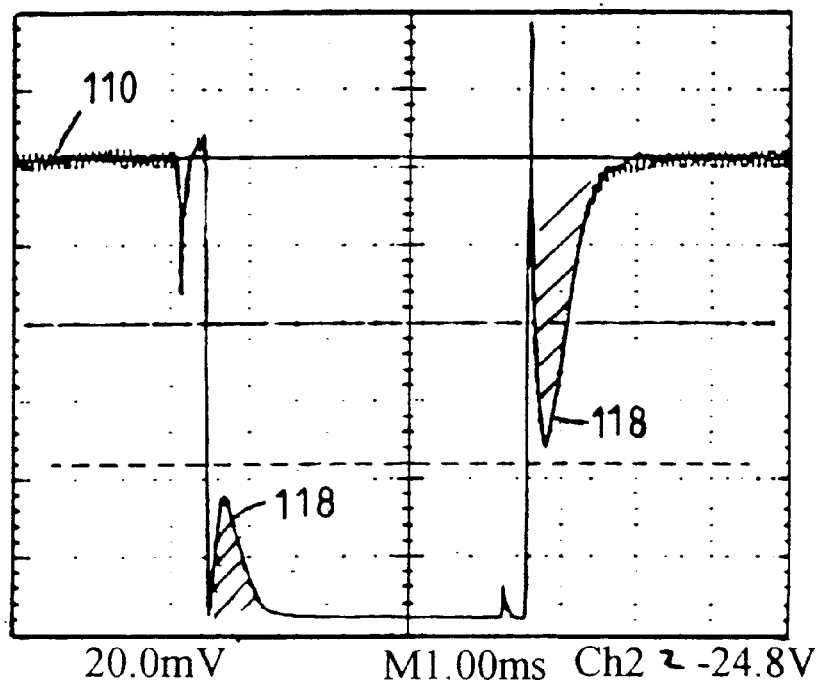
FIGS. 13(d), (e) and (f) show the row waveforms, these waveforms being those shown in FIGS. 11(d), 12(e) and 12(f) respectively.
Figure 13C:
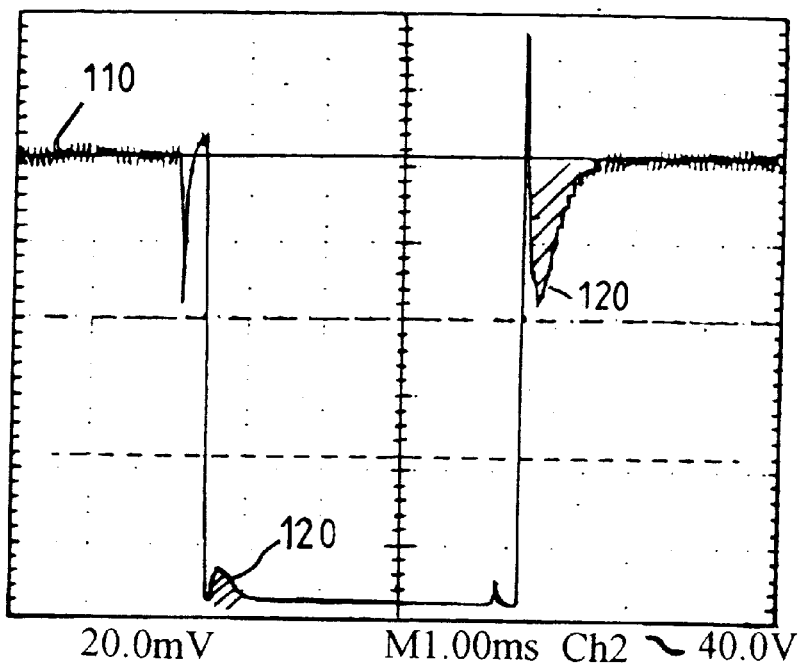
Figure 13D:
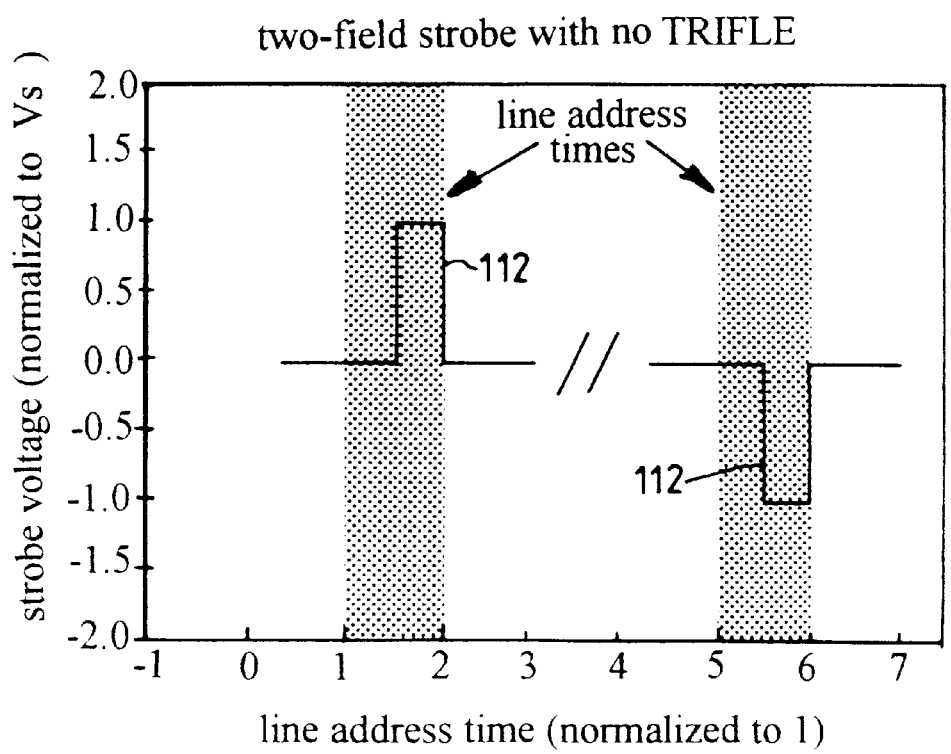
Figure 13E:
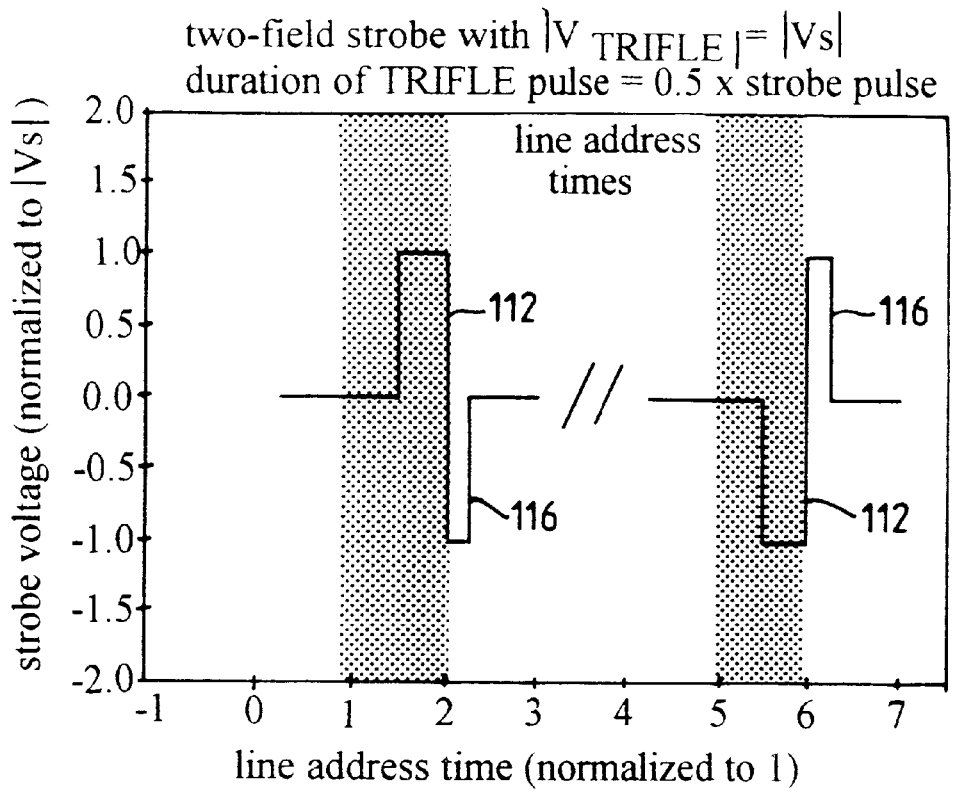
Figure 13F:
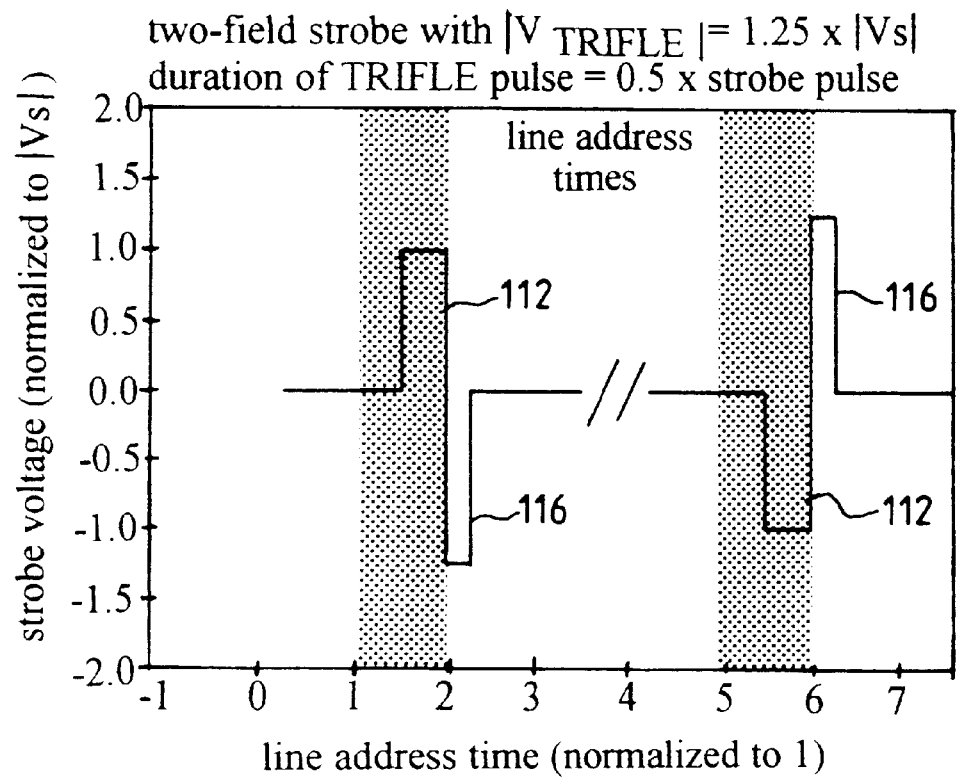

Cell 9 which has a Jals212 alignment layer (available from Japan Synthetic Rubber) doped with 0.5% wt tetrabutylammonium triflouromethylsulfunate is filled with a FLC material. The two-field drive window 92 is measured by applying alternating monopolar pulses as the row waveform and JOERS/Alvey switch and non-switch data as the data waveform. The data voltage is kept fixed at 5Vrms. FIG. 11(d) shows the row waveform 91 and corresponding drive window 92 indicated by the cross-hatched region. Reverse switching from the switching resultant cuts off the drive window 92 with monopolar strobe waveforms. In FIG. 11(e) a TRIFLE pulse 100 of −0.25×Vs is applied immediately after the strobe pulse 102. The effect of this pulse is to raise both the switching curve 94 and the reverse switching curve 96 while lowering the nonswitching curve 98 thus creating a smaller drive window 92. Extending the duration of this TRIFLE pulse 100 raises the non-switching and reverse switching curves 98 and 96 slightly as shown in FIG. 11(c). Increasing the amplitude of the TRIFLE pulse 100 but keeping the same V·t product is more effective at opening the drive window 92 as shown in FIG. 12(a). Further increase of the amplitude of the TRIFLE pulse 100 while keeping the V·t product the same eliminates the cut-off by reverse switching entirely as shown in FIG. 12(b). This has however lowered the non-switching curve 98 slightly. Increasing the amplitude further lowers the non-switching curve 98 even more but also lowers the switching curve which would allow slightly faster operation. In FIGS. 12(a)–(c) it may appear that increasing the amplitude of the TRIFLE pulse 100 eventually decreases performance by decreasing the drive window 92. However FIG. 13 demonstrates that there is less transmission reversal immediately after the select period when the amplitude of the TRIFLE pulse 100 is increased. This improves both contrast and brightness.

Figure 14C:
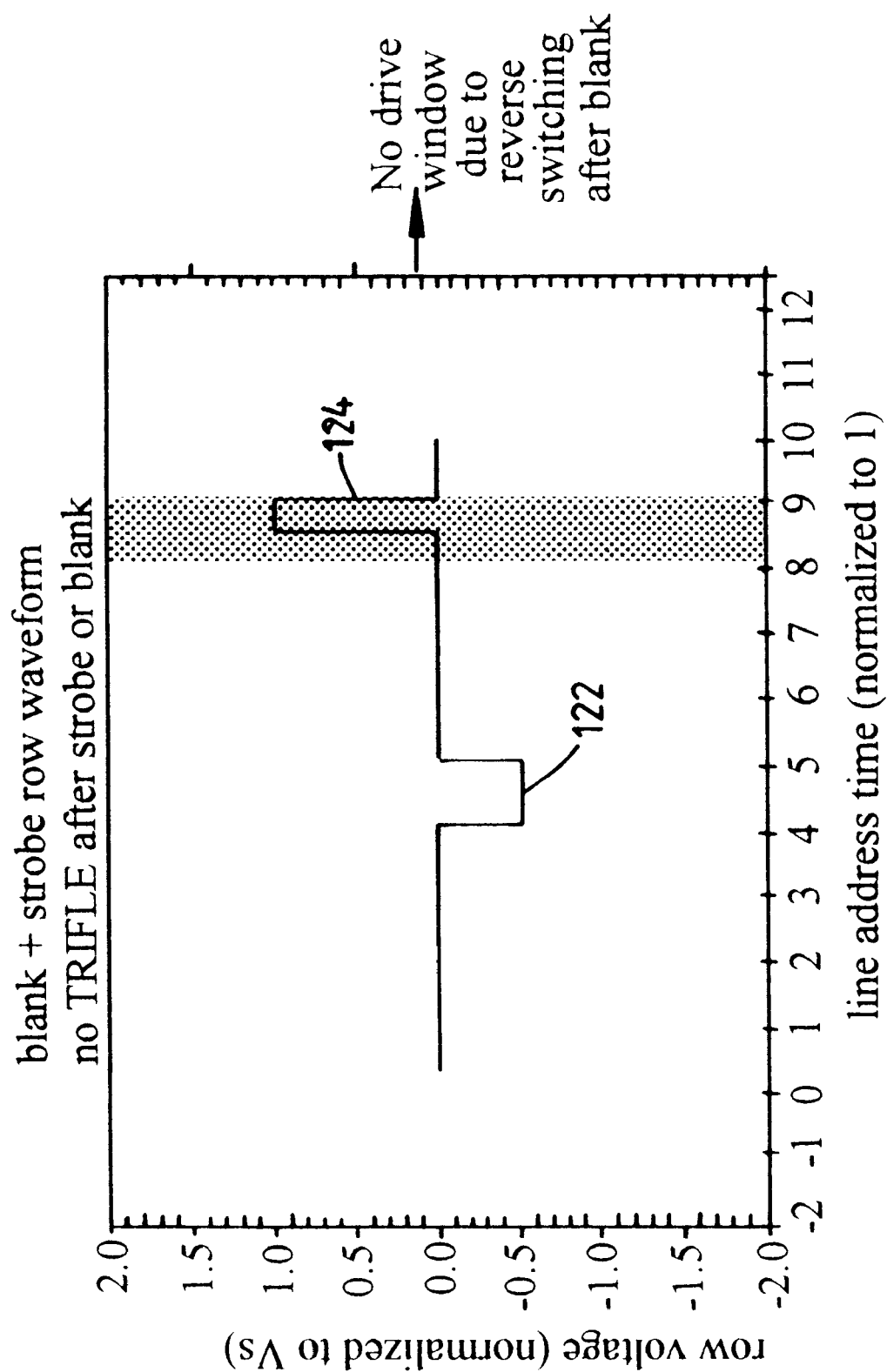

A typical driving scheme with blanking is shown in FIG. 14(c) where the blanking pulse 122 is half the amplitude of the strobe pulse 124 and twice the duration thereof. In this cell, which contains a fast ion dopant, reverse switching from the blanking pulse 122 causes the non-switching resultant to switch such that there is no driving window. This is also the case for the other two schemes shown in FIGS. 14(a) and (b) where a slightly longer duration blanking pulse is used along with suitable DC balance pulses 126.

Figure 15F:
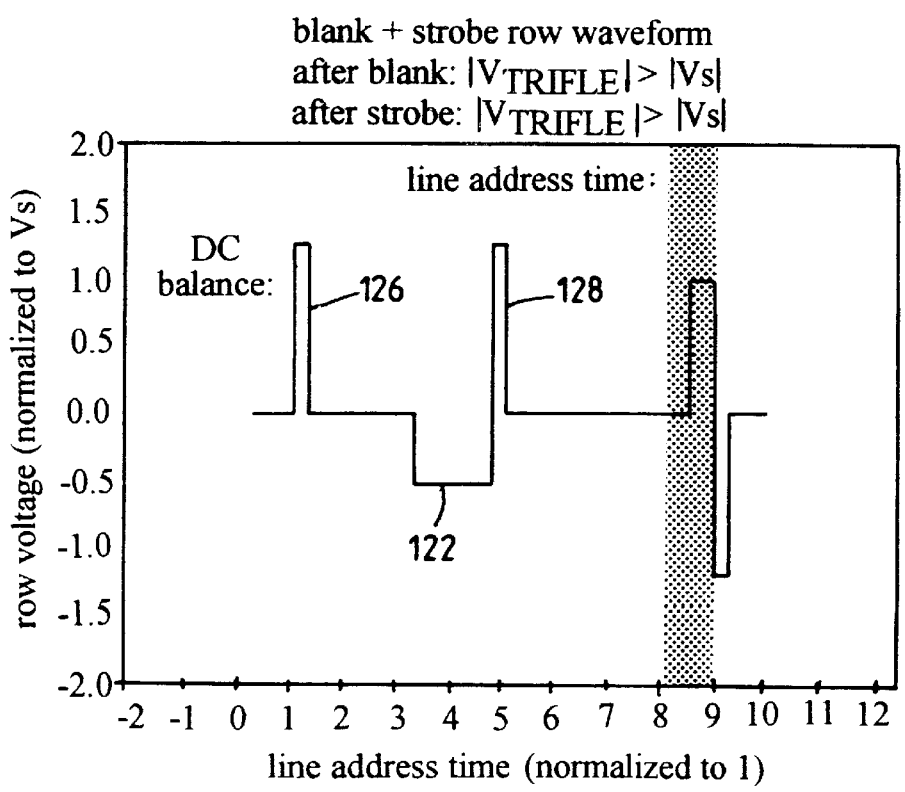

In FIG. 15(d) the blanking pulse 122 is the same as used in FIG. 14(a) & (b) however a TRIFLE pulse 128 is added immediately afterwards. This effectively stops the non-switch resultant from switching (by preventing reverse switching following the blanking pulse 122) and opens up a drive window 130. The curves in FIG. 15 have the same meaning as those in FIG. 12, and the drive window 130 lies between the 100% switching curve 132 for a switching resultant, and the 0% switching curve 134 for a non-switching resultant. In FIG. 15(b) the drive window 130 is further enhanced by adding a TRIFLE pulse 136 after the strobe pulse 124. In FIG. 15(f) the amplitude of both TRIFLE pulses 128 and 136 is increased resulting in an even larger drive window 130.

In FIGS. 16(a), (b) and (c) the optical responses for the three different row waveforms of FIGS. 15(d), (e) and (f) are shown. In all three cases the line address time=15.2 μs and Vs=35V. Note that adding a TRIFLE pulse 136 after the strobe pulse 124 reduces the amount of transmission reversal (at point 140) after switching to white. This improves with increasing amplitude of TRIFLE pulse as does the amount of transmission increase after a non-switching pulse. The amount of transmission reversal in FIGS. 16(b) and (c) is similar, but the row waveform of FIG. 16(f) produces a larger drive window 30 as shown in FIG. 15(c).

In each case in FIGS. 14(a), (b) and (c) a drive window could not be measured due to reverse switching from the blanking pulse 122 causing the non-switching resultant to always switch. FIG. 15(a) shows that by adding a TRIFLE pulse 128 after the blanking pulse 122 the reverse switching from the blanking pulse 122 is reduced and a drive window can be obtained. FIG. 15(b) shows that this drive window 130 can be increased by adding a TRIFLE pulse 128 after the strobe pulse 124. Further increase of the amplitude of both TRIFLE pulses creates an even larger drive window 130. FIG. 16 shows the improvement the TRIFLE pulses 128 make to the optical response. In this case the line address time is 15.2 μs. With the largest amplitude TRIFLE pulse 128 the amount of reversal of transmission after both the switch and the non-switch pulses is reduced significantly.

FIGS. 17 to 20 are shown as a counter example, in that they relate to Cell 10 which is filled with the same FLC material as Cell 9 but no ionic dopant is added. A two-field drive window 142 is shown in FIG. 17(a) with a standard strobe pulse 144 of FIG. 17(c) using JOERS/Alvey data. The reverse switching curve 146 is much higher than for Cell 9 which has an ionic dopant added. The worst cut-off in the drive window 142 is due to switching from the non-switching resultant. In FIG. 17(d) a small amplitude opposite polarity pulse 148 is sufficient to raise the non-switching curve 150 and open up the drive window 142 of FIG. 17(b).

In FIGS. 18(a) and (b) the optical response 152 in Cell 10 is shown for the two strobe waveforms of FIGS. 18(c) and (d) (FIGS. 17(c) and (d)). In each case Vs=37V, Vd=5Vrms and the line address time=16 μs. This cell does not exhibit the extreme transmission reversal after the select period and therefore does not require TRIFLE pulses to remove the reverse switching field.

In FIG. 19(b) a typical blanking driving scheme is shown where the blanking pulse 154 is half the amplitude and twice the duration of the strobe pulse 156. In this cell with no ionic dopant added a drive window 158 (see FIG. 19(a)) does exist with this scheme whereas there was no window with the ion doped cell.

In FIG. 20(a) the optical response 160 of Cell 10 to the drive scheme with blanking in FIG. 20(b) is shown. In this case Vs=37V, Vd=5Vrms and the line address time=19.6 μs.

With Cell 10, which has a Jals212 alignment layer, the two field drive window with monopolar pulses is not cut-off significantly by the reverse switching. This cell therefore does not need TRIFLE pulses to eliminate reverse switching. The effect of the small amplitude opposite polarity pulse (−0.25×Vs) which actually decreased the drive window 142 for Cell 9 is shown in FIG. 17(b). In this case the effect is to increase the drive window by raising the non-switching curve. FIGS. 18(a) and (b) show the optical transmission trace for these two cases. Neither strobe pulse shows the transmission reversal observed in Cell 9 which has an ionic dopant. When a blanking pulse is used before the strobe Cell 9 exhibited no drive window unless TRIFLE pulses were used however Cell 10 does exhibits a drive window without TRIFLE pulses as shown in FIG. 19(b). FIG. 20(a) shows that the optical response is similar to the two-field case and that there is no significant transmission reversal after the select period.

FIG. 21(a) relates to Cell 9 which contains a fast ion dopant, and FIG. 21(b) relates to Cell 10 which contains no ionic dopant. These figures show the transmission levels for 256 gray levels obtained via 4bit TD in the ratios 1:4:16:64 and 2bit SD in the ratio 1:2. In FIGS. 21(a) and 21(c) the cell exhibits slow reverse switching and significant error in the gray levels. In FIGS. 21(b) and 21(d) the cell exhibits fast reverse switching and is suitably addressed such that very little error in the gray levels occurs.

FIG. 22 shows the addressing waveforms used in the example shown in FIG. 21. In FIGS. 22(a) and (b) the strobe and data waveforms used for the slow reverse switching cell are shown respectively. In FIGS. 22(c) and (d) the strobe and data waveforms used for the fast reverse switching cell are shown respectively. The strobe waveform for the fast reverse switching cell includes TRIFLE pulses 170 after both the blanking pulse 172 and the strobe pulse 174.

Referring to FIG. 23 it should first be noted that whereas simple temporal dither uses time intervals in the ratios 1:2:4:8, when temporal dither is combined with 2 bit spatial dither in the ratio 1:2, the temporal ratios become 1:4:16:64.

FIG. 23(a) shows a first trace 176 of transmission (y-axis) against time (x-axis) where the most significant bit (MSB) is white. It will be seen from the figure that the trace is divided into four time periods in the ratios 64:1:4:16. Only middle part of the trace is shown, illustrating the transitions between the four time periods. The second "bit" 182 is black, and the third and fourth bits 184 and 186 are white. FIG. 23(a) also shows a second trace 178 which corresponds to the same addressing as the first trace, except that the MSB is black.

By way of explanation, it is noted that the "noise" on the two traces 176 and 178 is due to the fact that data pulses (corresponding to data on other rows) continue to be applied to the column electrodes between the strobe pulses for any given row.

Because Cell 10 exhibits slow reverse switching it will be seen from FIG. 23(a) that the transmission levels in the subsequent subframes are affected by whether the MSB was black or white. This is the source of the errors in the gray levels in FIG. 21(a), and this is a significant problem of the prior art.

In FIG. 23(a) the cell exhibits slow reverse switching and the source of the error can be clearly seen. When the longest subframe is black the other subframes are less transmissive than when the longest subframe is white. In FIG. 23(b) the cell exhibits fast reverse switching and is addressed as shown in FIGS. 22(c) and (d). The transmission in the smaller subframes is much less dependent on the state of the longest subframe and therefore less error occurs in the gray levels shown in FIG. 21(b).

Cell 9 which has an ionic dopant exhibits fast reverse switching faster ($\tau_{100\%rev}/\tau_{0\%sw}$=5 @22V, 25° C.). FIG. 21(b) shows the 256 digital gray levels obtained in this cell via 4bit TD in the ratios 1:4:16:64 and 2bit spatial dither in the ratio 1:2. The row and data waveforms used are shown in FIGS. 22(c) and (d). A TRIFLE pulse 170 is used after the blanking pulse 172 and after the strobe pulse 174. In FIG. 23(b) the optical response of gray levels 20 and 84 is shown. There is very little difference in the transmission levels of subsequent subframes when the most significant bit (MSB) is black versus white for this cell.

As a counter example Cell 10 which exhibits slow reverse switching ($\tau_{100\%rev}/\tau_{0\%sw}$=131 @22V, 25° C.) shows large digital error when addressed with temporal dither (TD). FIG. 21(a) shows the 256 digital gray levels obtained in this cell via 4bit TD in the ratios 1:4:16:64 and 2bit spatial dither in the ratio 1:2. The row and data waveforms used are shown in FIGS. 22(a) and (b). A TRIFLE pulse 190 is used after the blanking pulse 192 to increase the drive window but no TRIFLE is required after the strobe because this is a slow reverse switching cell. The non-linearity and gray level inversion shown in FIG. 21(a) is due to variation in the transmission levels in each subframe depending on the state of the other subframes. This can be seen in FIG. 23(a) where the optical response of gray levels 20 and 84 are shown. In the ideal case the only difference between these two gray levels is the state of the MSB. However when the MSB is black the transmission levels in the other subframes are lower than when the MSB is white.

Reference will now be made to FIGS. 24 and 25. Cell 11 which has Jals212 alignment doped with 0.5% wt tetrabutylammonium triflouromethylsulfunate (a fast ion dopant) is filled with an FLC material such that $\tau_{100\%rev}/\tau_{0\%sw}$=6 AT20V,40° C.). The effect of switch history on the analogue grayscale in this cell was assessed by addressing a digital level with the row waveform shown in FIG. 24(a) and the digital data (from British Patent Application No. 9718121.8) shown in FIG. 24(b).

The row waveform shown in FIG. 24(a) comprises a DC balance pulse 190, blanking pulse 192, strobe pulse 194 and TRIFLE pulses 196. The select period 198 during which a selected data type is applied, is also shown.

FIG. 24(b) shows five 4-slot data types of an infinite set of such 4-slot data types. The first data type 200 produces a switching resultant when combined with the strobe pulse 194, and thus corresponds to white (a digital level). The last data type 208 produces a non-switching resultant when combined with the strobe pulse 194, and thus corresponds to black (a digital level). The three intermediate (so-called "analogue") data types 202, 204 and 206 shown in FIG. 24(b) produce intermediate gray levels. It will be seen that as the amplitude of the first slot of the data type increases from 0% to 100% the data type moves from a switching data type to a non-switching data type. It is the amplitude of the first slot of the data type which is shown on the x-axes of FIGS. 25(a) and Cb), normalized to 100%.

The black dots on these graphs represent the case where the cell is first switched black (ie digital data type 208 is applied), and then some other data type is applied. The white dots represent the case where the cell is first switched white (ie digital data type 200 is applied), and then some other data type is applied. (It is noted that because of the characteristics of the material the first and last data types 200 and 208 respectively are not the only data types which switch the cell white or black. It is in fact only a small proportion of data types which produce intermediate gray levels.)

A digital data type from this set is applied continuously and the digital level is held for 1000 line address periods. Then the same row waveform shown in FIG. 24(a) is applied and an intermediate analogue data type (from British Patent Application No. 9718121.8) is applied. The analogue level is held for 250 line address periods. The cycle is repeated continuously for 1 second after which time the transmission during the analogue hold period is integrated. FIG. 25(a) shows the integrated transmission as a function of analogue data type for both black and white history. If the effect of switch history is completely erased by the blanking pulse then these two curves will lie coincident with one another.

Figure 25B:
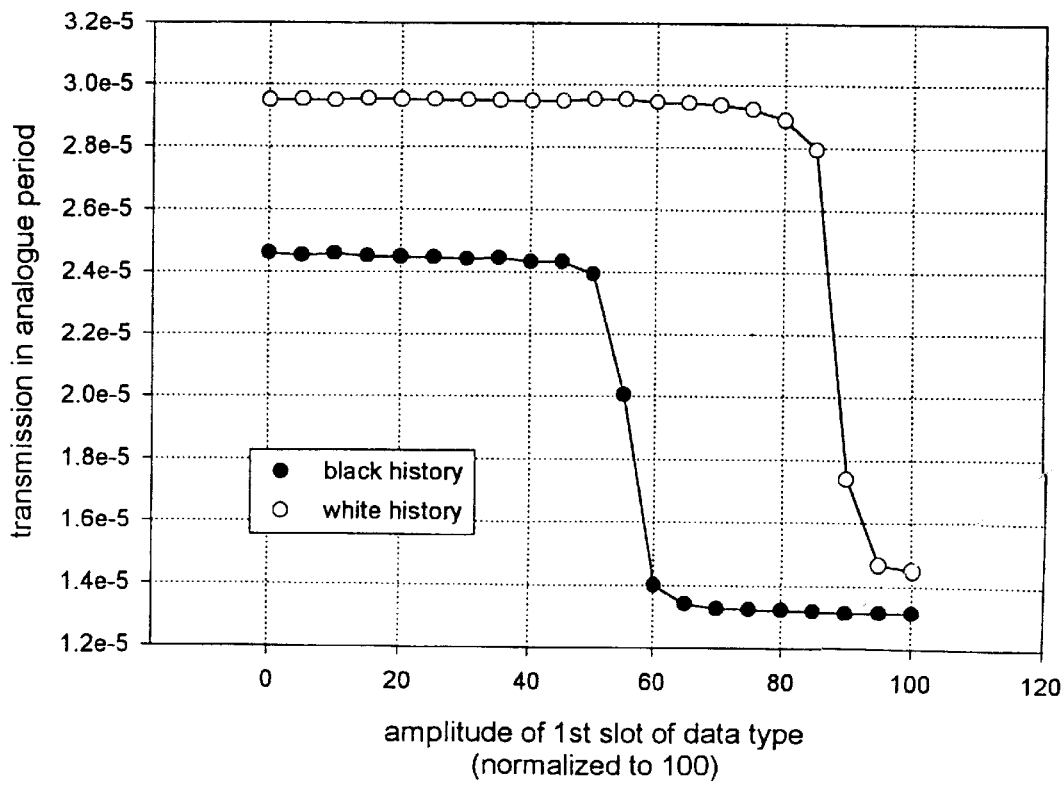

As a counter example FIG. 25(b) shows the results of the same experiment for Cell 12 which has Jals212 alignment layer with no dopant and is filled with the same FLC material such that $\tau_{100\%rev}/\tau_{0\%sw}$=87 at 20V, 40° C. It is clear that the effect of switch history is much greater in the undoped cell. In both cases the temperature was 40° C., the line address time was 20 µs, the data voltage was 5Vrms and the strobe voltage was 40V.

Thus by doping the cell with a fast ion dopant, and following the blanking and strobe pulses with suitable TRIFLE pulses, it is possible to produce consistent gray levels which are virtually independent of switching history.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of reducing the effects of ionic memory in a ferroelectric liquid crystal (FLC) material to which a switching pulse is applied during a select period, the method comprising the steps of:
   a) adding an ionic dopant to the FLC material, the ionic dopant providing ions having a fast response to an applied electric field;
   b) following said switching pulse by a first pulse of opposite polarity to said switching pulse, in such a way that said first pulse reduces any ionic reversal field created by said switching pulse, but does not destabilize the state to which the FLC material is switched by said switching pulse,
   wherein the first pulse is applied outside the select period.

2. The method as defined in claim 1, wherein said first pulse immediately follows said switching pulse.

3. The method as defined in claim 1, wherein the Vt product of said first pulse (being the product of the amplitude and duration thereof) is substantially equivalent to the Vt product of said switching pulse.

4. The method as defined in claim 1, wherein the amplitude of said first pulse is greater than half the amplitude of said switching pulse.

5. The method as defined in claim 1, wherein the amplitude of said first pulse is greater than the amplitude of said switching pulse.

6. The method as defined in claim 1, wherein the amplitude and duration of said first pulse are such that said first pulse lies below the stressed switching curve (as herein defined) of the FLC material containing said dopant.

7. The method as defined in claim 1, wherein said switching pulse is a strobe pulse or blanking pulse.

8. The method as defined in claim 1, wherein said switching pulse is a blanking pulse, and wherein a subsequent strobe pulse is followed by a second pulse of opposite polarity to said strobe pulse, in such a way that said second pulse reduces any ionic reversal field created by said strobe pulse, but does not destabilize the state to which the FLC material is switched by said strobe pulse.

9. The method as defined in claim 1, wherein said ions introduced by said ionic dopant have a faster response than ions in the FLC material due to intrinsic impurities therein.

10. The method as defined in claim 9, wherein said FLC material is a τ-V min material, where the minimum duration of a monopolar voltage pulse which achieves forward switching of said FLC material occurs when the amplitude of said monopolar voltage pulse is Vmin.

11. The method as defined in claim 9, wherein said first pulse immediately follows said switching pulse.

12. The method as defined in claim 9, wherein the Vt product of said first pulse (being the product of the amplitude and duration thereof) is substantially equivalent to the Vt product of said switching pulse.

13. The method as defined in claim 9, wherein the amplitude of said first pulse is greater than half the amplitude of said switching pulse.

14. The method as defined in claim 9, wherein the amplitude of said first pulse is greater than the amplitude of said switching pulse.

15. The method as defined in claim 9, wherein the amplitude and duration of said first pulse are such that said first pulse lies below the stressed switching curve (as herein defined) of the FLC material containing said dopant.

16. The method as defined in claim 9, wherein said switching pulse is a strobe pulse or blanking pulse.

17. The method as defined in claim 9, wherein said switching pulse is a blanking pulse, and wherein a subsequent strobe pulse is followed by a second pulse of opposite polarity to said strobe pulse, in such a way that said second pulse reduces any ionic reversal field created by said strobe pulse, but does not destabilize the state to which the FLC material is switched by said strobe pulse.

18. The method as defined in claim 10, wherein $\tau_{100\%rev}/\tau_{0\%sw}<50$ at a voltage below Vmin, where $\tau_{100\%rev}$ is the minimum duration of a monopolar voltage pulse required to achieve 100% reverse switching of said FLC material containing said dopant, and $\tau_{0\%sw}$ is the duration of a monopolar voltage pulse at which forward switching of said FLC material containing said dopant begins.

19. The method as defined in claim 18, wherein $\tau_{100\%rev}/\tau_{0\%sw}<30$ at a voltage below Vmin.

20. The method as defined in claim 18, wherein said first pulse immediately follows said switching pulse.

21. The method as defined in claim 18, wherein the Vt product of said first pulse (being the product of the amplitude and duration thereof) is substantially equivalent to the Vt product of said switching pulse.

22. The method as defined in claim 18, wherein the amplitude of said first pulse is greater than half the amplitude of said switching pulse.

23. The method as defined in claim 18, wherein the amplitude of said first pulse is greater than the amplitude of said switching pulse.

24. The method as defined in claim 18, wherein the amplitude and duration of said first pulse are such that said first pulse lies below the stressed switching curve (as herein defined) of the FLC material containing said dopant.

25. The method as defined in claim 18, wherein said switching pulse is a strobe pulse or blanking pulse.

26. The method as defined in claim 18, wherein said switching pulse is a blanking pulse, and wherein a subsequent strobe pulse is followed by a second pulse of opposite polarity to said strobe pulse, in such a way that said second pulse reduces any ionic reversal field created by said strobe pulse, but does not destabilize the state to which the FLC material is switched by said strobe pulse.

27. The method as defined in claim 1, wherein said FLC material is a τ-V min material, where the minimum duration of a monopolar voltage pulse which achieves forward switching of said FLC material occurs when the amplitude of said monopolar voltage pulse is Vmin.

28. The method as defined in claim 27, wherein $\tau_{100\%rev}/\tau_{0\%sw}<50$ at a voltage below Vmin, where $\tau_{100\%rev}$ is the minimum duration of a monopolar voltage pulse required to achieve 100% reverse switching of said FLC material containing said dopant, and $\tau_{0\%sw}$ is the duration of a monopolar voltage pulse at which forward switching of said FLC material containing said dopant begins.

29. The method as defined in claim 27, wherein $\tau_{100\%rev}/\tau_{0\%sw}<30$ at a voltage below Vmin.

30. The method as defined in claim 27, wherein said first pulse immediately follows said switching pulse.

31. The method as defined in claim 27, wherein the Vt product of said first pulse (being the product of the amplitude and duration thereof) is substantially equivalent to the Vt product of said switching pulse.

32. The method as defined in claim 27, wherein the amplitude of said first pulse is greater than half the amplitude of said switching pulse.

33. The method as defined in claim 27, wherein the amplitude of said first pulse is greater than the amplitude of said switching pulse.

34. The method as defined in claim 27, wherein the amplitude and duration of said first pulse are such that said first pulse lies below the stressed switching curve (as herein defined) of the FLC material containing said dopant.

35. The method as defined in claim 27, wherein said switching pulse is a strobe pulse or blanking pulse.

36. The method as defined in claim 27, wherein said switching pulse is a blanking pulse, and wherein a subsequent strobe pulse is followed by a second pulse of opposite polarity to said strobe pulse, in such a way that said second pulse reduces any ionic reversal field created by said strobe pulse, but does not destabilize the state to which the FLC material is switched by said strobe pulse.

37. A ferroelectric liquid crystal (FLC) cell comprising:
a layer of FLC material, enclosed between two substrates, to which is added an ionic dopant providing ions having a fast response to an applied electric field;
at least one switching electrode for applying a switching pulse to said layer during a select period; and
at least one data electrode for applying a data pulse to said layer,
wherein said switching pulse is followed by a first pulse of opposite polarity to said switching pulse, the first pulse being applied outside the select period, in such a way that said first pulse reduces any ionic reversal field created by said switching pulse, but does not destabilize the state to which the FLC material is switched by said switching pulse.

38. The FLC cell as defined in claim 37, wherein said first pulse immediately follows said switching pulse.

39. The FLC cell as defined in claim 37, wherein the Vt product of said first pulse (being the product of the amplitude and duration thereof) is substantially equivalent to the Vt product of said switching pulse.

40. The FLC cell as defined in claim 37, wherein the amplitude of said first pulse is greater than half the amplitude of said switching pulse.

41. The FLC cell as defined in claim 37, wherein the amplitude of said first pulse is greater than the amplitude of said switching pulse.

42. The FLC cell as defined in claim 37, wherein the amplitude and duration of said first pulse are such that said first pulse lies below the stressed switching curve (as herein defined) of the FLC material containing said dopant.

43. The FLC cell as defined in claim 37, wherein said ions introduced by said ionic dopant have a faster response than ions in the FLC material due to intrinsic impurities therein.

44. The FLC cell as defined in claim 43, wherein said FLC material is a $\tau$-V min material, where the minimum duration of a monopolar voltage pulse which achieves forward switching of said FLC material occurs when the amplitude of said monopolar voltage pulse is Vmin.

45. The FLC cell as defined in claim 43, wherein said first pulse immediately follows said switching pulse.

46. The FLC cell as defined in claim 43, wherein the Vt product of said first pulse (being the product of the amplitude and duration thereof) is substantially equivalent to the Vt product of said switching pulse.

47. The FLC cell as defined in claim 43, wherein the amplitude of said first pulse is greater than half the amplitude of said switching pulse.

48. The FLC cell as defined in claim 43, wherein the amplitude of said first pulse is greater than the amplitude of said switching pulse.

49. The FLC cell as defined in claim 43, wherein the amplitude and duration of said first pulse are such that said first pulse lies below the stressed switching curve (as herein defined) of the FLC material containing said dopant.

50. The PLC cell as defined in claim 37, wherein said PLC material is a $\tau$-V min material, where the minimum duration of a monopolar voltage pulse which achieves forward switching of said PLC material occurs when the amplitude of said monopolar voltage pulse is Vmin.

51. The FLC cell as defined in claim 50, wherein $\tau_{100\%rev}/\tau_{0\%sw}<50$ at a voltage below Vmin, where $\tau_{100\%rev}$ is the minimum duration of a monopolar voltage pulse required to achieve 100% reverse switching of said PLC material containing said dopant, and $\tau_{0\%sw}$ is the duration of a monopolar voltage pulse at which forward switching of said PLC material containing said dopant begins.

52. The PLC cell as defined in claim 50, wherein $\tau_{100\%rev}/\tau_{0\%sw}<30$ at a voltage below Vmin.

53. The PLC cell as defined in claim 50, wherein said first pulse immediately follows said switching pulse.

54. The PLC cell as defined in claim 50, wherein the Vt product of said first pulse (being the product of the amplitude and duration thereof) is substantially equivalent to the Vt product of said switching pulse.

55. The FLC cell as defined in claim 50, wherein the amplitude of said first pulse is greater than half the amplitude of said switching pulse.

56. The FLC cell as defined in claim 50, wherein the amplitude of said first pulse is greater than the amplitude of said switching pulse.

57. The FLC cell as defined in claim 50, wherein the amplitude and duration of said first pulse are such that said first pulse lies below the stressed switching curve (as herein defined) of the FLC material containing said dopant.

58. A ferroelectric liquid crystal (FLC) device comprising:
a $\tau$-V min FLC material to which is added an ionic dopant providing ions having a fast response to an electric field;
at least one switching electrode for applying a switching pulse; and
at least one data electrode for applying a data pulse, wherein:
a) said FLC material is such that at voltages below Vmin, $\tau_{100\%rev}/\tau_{0\%sw}<50$, where $\tau_{100\%rev}$ is the minimum duration of a monopolar voltage pulse required to achieve 100% reverse switching of said FLC material, and $\tau_{0\%sw}$ is the duration of a monopolar voltage pulse at which forward switching of said FLC material begins; and
b) said switching pulse is followed by a first pulse of opposite polarity to said switching pulse.

59. The FLC device as defined in claim 58, wherein said ions introduced by said ionic dopant have a faster response than ions in the FLC material due to intrinsic impurities therein.

60. The FLC device as defined in claim 58, wherein at voltages below Vmin, $\tau_{100\%rev}/\tau_{0\%sw}<30$.

61. The FLC device as defined in claim 58, and addressing circuitry for addressing said switching and data electrodes.

62. The FLC device as defined in claim 58, wherein said FLC material is in the form of a layer, said switching electrode is one of a plurality of such switching electrodes on one side of said layer, said data electrode is one of a plurality of such data electrodes on the other side of said layer, and a plurality of pixels are defined in said layer at the intersections of said switching and data electrodes.

63. The FLC device as defined in claim 62, wherein at voltages below Vmin, $\tau_{100\%rev}/\tau_{0\%sw}<30$.

64. The FLC device as defined in claim 63, wherein said FLC material is in the form of a layer, said switching electrode is one of a plurality of such switching electrodes on one side of said layer, said data electrode is one of a plurality of such data electrodes on the other side of said layer, and a plurality of pixels are defined in said layer at the intersections of said switching and data electrodes.

65. The FLC device as defined in claim 63, and addressing circuitry for addressing said switching and data electrodes.

66. The FLC device as defined in claim 65, wherein said FLC material is in the form of a layer, said switching electrode is one of a plurality of such switching electrodes on one side of said layer, said data electrode is one of a plurality of such data electrodes on the other side of said layer, and a plurality of pixels are defined in said layer at the intersections of said switching and data electrodes.

* * * * *

UNITED STATES PATENT AND TRADEMARK OFFICE
CERTIFICATE OF CORRECTION

PATENT NO.    : 6,369,789 B1
DATED         : April 9, 2002
INVENTOR(S)   : Diana Cynthia Ulrich, Paul Bonnett, Michael John Towler and Masaaki Kabe It is certified that error appears in the above-identified patent and that said Letters Patent is hereby corrected as shown below:

<u>Title page,</u>
Item [73], Assignee should be -- SHARP KABUSHIKI KAISHA -- and -- THE SECRETARY OF STATE FOR DEFENCE IN HER BRITANNIC MAJESTY'S GOVERNMENT OF THE UNITED KINGDOM OF GREAT BRITAIN AND NORTHERN IRELAND. --

Item [56], References Cited, OTHER PUBLICATIONS, should be titled -- Addressing Cycles for Fast Settling Gray Shades in Ferroelectric Liquid Crystal Matrices --.
-- The Joers/Alvey Ferroelectric Multiplexing Scheme --.
"Electrooptic Characteristics of a..." should read -- pp. L477-L478 --.
-- Electrooptic Bistability of a Ferroelectric Liquid Crystal Device Prepared Using Charge-Transfer Complex-Doped Polymide-Orientation Films -- at "pp. L116-L118".
-- Key Technologies for $\tau V_{MIN}$ Ferroelectric Liquid Crystal Displays --.

Signed and Sealed this

Twenty-second Day of October, 2002

Attest:

Attesting Officer

JAMES E. ROGAN
Director of the United States Patent and Trademark Office